US012695709B1

(12) United States Patent
Gregg et al.

(10) Patent No.: US 12,695,709 B1
(45) Date of Patent: *Jul. 28, 2026

(54) MULTI-TIER RESOURCE, SUBSYSTEM, AND LOAD ORCHESTRATION

(71) Applicant: C/HCA, Inc., Nashville, TN (US)

(72) Inventors: William Gregg, Nashville, TN (US); Annabaker Garber, Nashville, TN (US); Aaron Montlary, Nashville, TN (US); Louis Davis, Nashville, TN (US); Jeffrey Cuthbert, Littleton, CO (US); Brian Weldy, Franklin, TN (US); Cae Swanger, Las Vegas, NV (US); Timothy Beacham, Dawsonville, GA (US); Gabriel O. Perez, Fort Lauderdale, FL (US); Edmund Jackson, Nashville, TN (US); Daniel Hefley, Plano, TX (US); Troy Gifford, Brentwood, TN (US)

(73) Assignee: C/HCA, Inc., Nashville, TN (US)

( * ) Notice: Subject to any disclaimer, the term of this patent is extended or adjusted under 35 U.S.C. 154(b) by 53 days.

This patent is subject to a terminal disclaimer.

(21) Appl. No.: 19/022,264

(22) Filed: Jan. 15, 2025

Related U.S. Application Data

(63) Continuation of application No. 18/608,659, filed on Mar. 18, 2024, now Pat. No. 12,519,738, which is a
(Continued)

(51) Int. Cl.
*H04L 47/762* (2022.01)
*H04L 41/22* (2022.01)
(Continued)

(52) U.S. Cl.
CPC ............ *H04L 47/762* (2013.01); *H04L 41/22* (2013.01); *H04L 43/0882* (2013.01);
(Continued)

(58) Field of Classification Search
CPC ... H04L 67/1029; H04L 67/303; H04L 41/22; H04L 47/125; H04L 47/762; H04L 47/781
See application file for complete search history.

(56) References Cited

U.S. PATENT DOCUMENTS 6,063,028 A    5/2000   Luciano
6,117,073 A    9/2000   Jones et al.
(Continued)

OTHER PUBLICATIONS

Final Office Action mailed on Oct. 7, 2025, in related U.S. Appl. No. 18/608,659, 23 pages.
(Continued)

*Primary Examiner* — Jerry B Dennison
(74) *Attorney, Agent, or Firm* — Kory D. Christensen

(57) ABSTRACT

Electronic communications received via a network from a plurality of electronic devices may include signals of device interactions or data changes that correspond to process performances by process-performing resources, signals of conditions of loads, or signals of processes associated with the process-performing resources and the loads. Data composites may be formed from the electronic communications, with data portions collected and mapped to resource profile records and load profile records that may be updated with the collected data portions. For each load, at least one of the one or more resource profile records and/or the one or more load profile records may be used to map the process-performing resources to the load. Content nodes may be linked in a network of content nodes, including respective linked content, resource specifications or load specifications. Access to the network of content nodes may be allowed via a control interface.

20 Claims, 16 Drawing Sheets

Related U.S. Application Data continuation of application No. 18/176,314, filed on Feb. 28, 2023, now Pat. No. 12,003,426, which is a continuation-in-part of application No. 17/959,116, filed on Oct. 3, 2022, and a continuation-in-part of application No. 17/698,634, filed on Mar. 18, 2022, now abandoned, which is a continuation-in-part of application No. 17/523,190, filed on Nov. 10, 2021, now Pat. No. 12,189,643, and a continuation-in-part of application No. 17/521,689, filed on Nov. 8, 2021, now Pat. No. 11,736,412, and a continuation-in-part of application No. 17/487,934, filed on Sep. 28, 2021, now Pat. No. 12,445,508, and a continuation-in-part of application No. 17/475,647, filed on Sep. 15, 2021, now Pat. No. 12,124,861, said application No. 18/176,314 is a continuation-in-part of application No. 17/364,502, filed on Jun. 30, 2021, now Pat. No. 11,595,320, said application No. 17/698,634 is a continuation-in-part of application No. 17/364,502, filed on Jun. 30, 2021, now Pat. No. 11,595,320, and a continuation-in-part of application No. 17/194,138, filed on Mar. 5, 2021, now Pat. No. 11,422,830, and a continuation-in-part of application No. 17/178,995, filed on Feb. 18, 2021, now Pat. No. 11,908,573, and a continuation-in-part of application No. 17/159,700, filed on Jan. 27, 2021, now Pat. No. 12,080,425, and a continuation-in-part of application No. 17/141,414, filed on Jan. 5, 2021, now abandoned, and a continuation-in-part of application No. 17/137,055, filed on Dec. 29, 2020, now Pat. No. 11,901,080, and a continuation-in-part of application No. 17/061,851, filed on Oct. 2, 2020, now Pat. No. 11,374,847, and a continuation-in-part of application No. 17/020,586, filed on Sep. 14, 2020, now Pat. No. 11,283,690, said application No. 17/521,689 is a continuation of application No. 16/883,765, filed on May 26, 2020, now Pat. No. 11,201,835, said application No. 17/698,634 is a continuation-in-part of application No. 16/883,858, filed on May 26, 2020, now Pat. No. 12,412,669, said application No. 17/475,647 is a continuation of application No. 16/849,193, filed on Apr. 15, 2020, now Pat. No. 11,126,445, said application No. 17/487,934 is a continuation of application No. 16/782,042, filed on Feb. 4, 2020, now Pat. No. 11,146,599, said application No. 17/061,851 is a continuation of application No. 16/709,248, filed on Dec. 10, 2019, now Pat. No. 10,797,987, said application No. 17/698,634 is a continuation-in-part of application No. 16/700,010, filed on Dec. 2, 2019, now Pat. No. 11,462,322, said application No. 17/959,116 is a continuation of application No. 16/700,010, filed on Dec. 2, 2019, now Pat. No. 11,462,322, said application No. 17/698,634 is a continuation-in-part of application No. 16/586,376, filed on Sep. 27, 2019, now Pat. No. 11,539,817, said application No. 16/849,193 is a continuation of application No. 16/545,998, filed on Aug. 20, 2019, now Pat. No. 10,628,180.

(60) Provisional application No. 63/113,025, filed on Nov. 12, 2020, provisional application No. 63/047,022, filed on Jul. 1, 2020, provisional application No. 62/985,497, filed on Mar. 5, 2020, provisional application No. 62/978,155, filed on Feb. 18, 2020, provisional application No. 62/966,727, filed on Jan. 28, 2020, provisional application No. 62/958,794, filed on Jan. 9, 2020, provisional application No. 62/955,146, filed on Dec. 30, 2019, provisional application No. 62/900,050, filed on Sep. 13, 2019, provisional application No. 62/853,500, filed on May 28, 2019, provisional application No. 62/851,887, filed on May 23, 2019, provisional application No. 62/800,990, filed on Feb. 4, 2019, provisional application No. 62/777,615, filed on Dec. 10, 2018, provisional application No. 62/776,786, filed on Dec. 7, 2018, provisional application No. 62/737,482, filed on Sep. 27, 2018, provisional application No. 62/720,022, filed on Aug. 20, 2018.

(51) Int. Cl.

| | |
|---|---|
| *H04L 43/0882* | (2022.01) |
| *H04L 47/125* | (2022.01) |
| *H04L 47/78* | (2022.01) |
| *H04L 67/303* | (2022.01) |

(52) U.S. Cl.
CPC .......... *H04L 47/125* (2013.01); *H04L 47/781* (2013.01); *H04L 67/303* (2013.01)

(56) References Cited

U.S. PATENT DOCUMENTS

| | | | |
|---|---|---|---|
| 7,174,381 | B2 | 2/2007 | Gulko et al. |
| 7,707,289 | B1 | 4/2010 | Skene et al. |
| 7,734,479 | B2 | 6/2010 | Rosow et al. |
| 7,743,303 | B2 | 6/2010 | Nobunaga et al. |
| 7,890,349 | B2 | 2/2011 | Cole et al. |
| 8,949,082 | B2 | 2/2015 | Farooq et al. |
| 9,754,335 | B2 | 9/2017 | Jourdan et al. |
| 9,805,163 | B1 | 10/2017 | Panch et al. |
| 9,880,881 | B1 * | 1/2018 | Perez .................... G06F 9/5083 |
| 10,231,085 | B1 | 3/2019 | Kumar et al. |
| 10,303,519 | B1 | 5/2019 | Perez et al. |
| 10,319,056 | B1 | 6/2019 | Perez et al. |
| 10,652,164 | B2 | 5/2020 | Garcia et al. |
| 10,817,342 | B1 | 10/2020 | Perez et al. |
| 10,847,261 | B1 | 11/2020 | Neumann |
| 11,201,835 | B1 * | 12/2021 | Roberts ................ H04L 47/781 |
| 11,283,690 | B1 * | 3/2022 | Mosier .................... H04L 41/22 |
| 11,283,726 | B1 | 3/2022 | Houston et al. |
| 11,317,292 | B1 | 4/2022 | Feldmann et al. |
| 11,381,506 | B1 | 7/2022 | Jindal et al. |
| 11,422,830 | B1 | 8/2022 | Hefley |
| 11,595,320 | B1 | 2/2023 | Gregg et al. |
| 11,836,664 | B2 | 12/2023 | Ackerman et al. |
| 12,003,426 | B1 | 6/2024 | Gregg et al. |
| 12,189,643 | B1 | 1/2025 | Montlary et al. |
| 2002/0178246 | A1 | 11/2002 | Mayer |
| 2003/0229645 | A1 | 12/2003 | Mogi et al. |
| 2004/0122702 | A1 | 6/2004 | Sabol et al. |
| 2005/0075902 | A1 | 4/2005 | Wager et al. |
| 2006/0112247 | A1 | 5/2006 | Ramany et al. |
| 2007/0005257 | A1 | 1/2007 | Cheng et al. |
| 2008/0154691 | A1 | 6/2008 | Wellman et al. |
| 2008/0154712 | A1 | 6/2008 | Wellman |
| 2008/0155386 | A1 | 6/2008 | Jensen |
| 2008/0164998 | A1 | 7/2008 | Scherpbier et al. |
| 2010/0036903 | A1 | 2/2010 | Ahmad et al. |
| 2010/0332583 | A1 | 12/2010 | Szabo |
| 2011/0199214 | A1 | 8/2011 | Gawlick |
| 2011/0238949 | A1 | 9/2011 | Archer et al. |
| 2011/0295621 | A1 | 12/2011 | Farooq et al. |
| 2011/0313788 | A1 | 12/2011 | Amland et al. |
| 2012/0065987 | A1 | 3/2012 | Farooq et al. |
| 2012/0303827 | A1 | 11/2012 | Neystadt et al. |
| 2013/0144641 | A1 | 6/2013 | Bessette |
| 2013/0191158 | A1 | 7/2013 | Fillmore |
| 2014/0108033 | A1 | 4/2014 | Akbay et al. |
| 2014/0108034 | A1 | 4/2014 | Akbay et al. |

(56)  References Cited

U.S. PATENT DOCUMENTS

| 2014/0172459 | A1 | 6/2014 | De Vries et al. |
| 2014/0297301 | A1 | 10/2014 | Rock |
| 2014/0350967 | A1 | 11/2014 | Geleijnse et al. |
| 2016/0013990 | A1 | 1/2016 | Kulkarni et al. |
| 2016/0026762 | A1 | 1/2016 | Radhakrishnan et al. |
| 2016/0042135 | A1 | 2/2016 | Hogan et al. |
| 2016/0094410 | A1 | 3/2016 | Anwar et al. |
| 2016/0125168 | A1 | 5/2016 | Aagesen et al. |
| 2016/0277255 | A1 | 9/2016 | Dasgupta et al. |
| 2017/0054758 | A1 | 2/2017 | Maino et al. |
| 2017/0083626 | A1 | 3/2017 | Kensel et al. |
| 2017/0169173 | A1 | 6/2017 | Snow, Jr. et al. |
| 2017/0310605 | A1 | 10/2017 | Garcia et al. |
| 2017/0364043 | A1 | 12/2017 | Ganti et al. |
| 2018/0075108 | A1 | 3/2018 | Park et al. |
| 2018/0182471 | A1 | 6/2018 | Yelton et al. |
| 2018/0225311 | A1 | 8/2018 | Bandopadhyay et al. |
| 2018/0314802 | A1 | 11/2018 | Dreyer |
| 2019/0180868 | A1 | 6/2019 | Makram et al. |
| 2019/0231280 | A1 | 8/2019 | Tudor |
| 2019/0378619 | A1 | 12/2019 | Meyer et al. |
| 2020/0013490 | A1 | 1/2020 | Rumoro |
| 2020/0296053 | A1 | 9/2020 | Garcia et al. |
| 2020/0382617 | A1 | 12/2020 | Trapane et al. |
| 2021/0168455 | A1 | 6/2021 | Campbell et al. |
| 2022/0385581 | A1 | 12/2022 | Delos Reyes et al. |
| 2026/0004181 | A1* | 1/2026 | Paul ...................... G06N 20/00 |

OTHER PUBLICATIONS

Non-Final Office Action mailed on Apr. 18, 2025, in U.S. Appl. No. 18/176,311, 29 pages.

Notice of Allowance mailed on Dec. 8, 2025, in U.S. Appl. No. 18/608,659, 7 pages.

Non-Final Office Action mailed on Apr. 18, 2025 in U.S. Appl. No. 18/176,311, 28 pages.

Non-Final Office Action mailed on Jul. 10, 2025, in related U.S. Appl. No. 18/608,659, 37 pages.

Notice of Allowance mailed on Jul. 29, 2025, in related U.S. Appl. No. 18/176,311, 10 pages.

* cited by examiner

ACCESS MANAGEMENT
LAYER
310

508

RECORD DATA
STORAGE
518

GENERAL
DATA
STORAGE
520

OPERATIONAL
DATA
STORAGE
522

ENTITY-BASED
DATA
STORAGE
524

STREAMING
CACHING
STORAGE
526

INTEROPERABILITY ENGINE 502

TAGGING ENGINE 510

REPORTS ENGINE 512

RULES ENGINE 514

APPLICATION ENGINE 516

DATA STORAGE
INTEGRITY ENGINE
506

TRANSACTION
COLLECTION
ENGINE
504

528

TO
TMP

ACTIVE UNIFIED
DATA LAYER
308

INTERFACE LAYER 316

AGENCY ENGINE 624

AGENCY ACCESS LAYER 314

AUTHENT. ACCESS ENGINE 604

LOGIN ENGINE 606

USER PREFERENCE ENGINE 608

SECURITY ENGINE 610

ANALYTICS & SEARCH ENGINE 612

DATA ACCESS ENGINE 614

ACCESS LOG ENGINE 622

UPDATE ENGINE 616

DATA STREAMING ENGINE 618

BILLING ENGINE 620

ACCESS MANAGEMENT ENGINE 602

AUDIT/COMPLIANCE LAYER 312

ACCESS MANAGEMENT LAYER 310

FIG. 13

MULTI-TIER RESOURCE, SUBSYSTEM, AND LOAD ORCHESTRATION

CROSS REFERENCES TO RELATED APPLICATIONS

This application is a continuation of U.S. patent application Ser. No. 18/608,659, filed Mar. 18, 2024, which is a continuation of U.S. patent application Ser. No. 18/176,314, filed Feb. 28, 2023, now U.S. Pat. No. 12,003,426, which is a continuation-in-part of U.S. patent application Ser. No. 17/364,502, filed Jun. 30, 2021, now U.S. Pat. No. 11,595,320, which claims the benefit of and priority to U.S. Provisional Application No. 63/047,022, filed Jul. 1, 2020, which is hereby incorporated by reference in its entirety for all purposes. Said U.S. patent application Ser. No. 18/176,314 is also a continuation-in-part of U.S. patent application Ser. No. 17/959,116, filed Oct. 3, 2022, which is a continuation of U.S. patent application Ser. No. 16/700,010, filed Dec. 2, 2019, now U.S. Pat. No. 11,462,322, which claims the benefit of and priority to U.S. Provisional Application No. 62/776,786, filed Dec. 7, 2018. Said U.S. patent application Ser. No. 18/176,314 is also a continuation-in-part of U.S. patent application Ser. No. 17/698,634, filed Mar. 18, 2022, which is a continuation-in-part of U.S. patent application Ser. No. 17/521,689, filed Nov. 8, 2021, now U.S. Pat. No. 11,736,412, which is a continuation of U.S. patent application Ser. No. 16/883,765, filed May 26, 2020, now U.S. Pat. No. 11,201,835, which claims the benefit of and priority to U.S. Provisional Application No. 62/851,887, filed May 23, 2019. Said U.S. patent application Ser. No. 17/698,634 is also a continuation-in-part of U.S. patent application Ser. No. 16/700,010, filed Dec. 2, 2019, now U.S. Pat. No. 11,462,322, which claims the benefit of and priority to U.S. Provisional Application No. 62/776,786, filed Dec. 7, 2018. Said U.S. patent application Ser. No. 17/698,634 is also a continuation-in-part of U.S. patent application Ser. No. 17/487,934, filed Sep. 28, 2021, which is a continuation of U.S. patent application Ser. No. 16/782,042, filed Feb. 4, 2020, now U.S. Pat. No. 11,146,599, which claims the benefit of and priority to U.S. Provisional Application No. 62/800,990, filed Feb. 4, 2019. Said U.S. patent application Ser. No. 17/698,634 is also a continuation-in-part of U.S. patent application Ser. No. 17/141,414, filed Jan. 5, 2021, which claims the benefit of and priority to U.S. Provisional Application No. 62/958,794, filed Jan. 9, 2020. Said U.S. patent application Ser. No. 17/698,634 is also a continuation-in-part of U.S. patent application Ser. No. 17/475,647, filed Sep. 15, 2021, which is a continuation of U.S. application Ser. No. 16/849,193, filed Apr. 15, 2020, now U.S. Pat. No. 11,126,445, which is a continuation of U.S. patent application Ser. No. 16/545,998, filed Aug. 20, 2019, now U.S. Pat. No. 10,628,180, which claims the benefit of and priority to U.S. Provisional Application No. 62/720,022, filed Aug. 20, 2018. Said U.S. patent application Ser. No. 17/698,634 is also a continuation-in-part of U.S. patent application Ser. No. 17/061,851, filed Oct. 2, 2020, now U.S. Pat. No. 11,374,847, which is a continuation of U.S. patent application Ser. No. 16/709,248, filed Dec. 10, 2019, now U.S. Pat. No. 10,797,987, which claims the benefit of and priority to U.S. Patent Application No. 62/777,615, filed Dec. 10, 2018. Said U.S. patent application Ser. No. 17/698,634 is also a continuation-in-part of U.S. application Ser. No. 16/586,376, filed Sep. 27, 2019, now U.S. Pat. No. 11,539,817, which claims the benefit of and priority to U.S. Provisional Application No. 62/737,482, filed Sep. 27, 2018. Said U.S. patent application Ser. No.

17/698,634 is also a continuation-in-part of U.S. patent application Ser. No. 17/020,586, filed Sep. 14, 2020, now U.S. Pat. No. 11,283,690, which claims the benefit of and priority to U.S. Provisional Application No. 62/900,050, filed Sep. 13, 2019. Said U.S. patent application Ser. No. 17/698,634 is also a continuation-in-part of U.S. patent application Ser. No. 16/883,858, filed May 26, 2020, which claims the benefit of and priority to U.S. Provisional Application No. 62/853,500, filed May 28, 2019. Said U.S. patent application Ser. No. 17/698,634 is also a continuation-in-part of said U.S. patent application Ser. No. 17/364,502, filed Jun. 30, 2021, now U.S. Pat. No. 11,595,320. Said U.S. patent application Ser. No. 17/698,634 is also a continuation-in-part of U.S. patent application Ser. No. 17/178,995, filed Feb. 18, 2021, now U.S. Pat. No. 11,908,573, which claims the benefit of and priority to U.S. Provisional Application No. 62/978,155, filed Feb. 18, 2020. Said U.S. patent application Ser. No. 17/698,634 is also a continuation-in-part of U.S. patent application Ser. No. 17/137,055, filed Dec. 29, 2020, now U.S. Pat. No. 11,901,080, which claims the benefit of and priority to U.S. Provisional Application No. 62/955,146, filed Dec. 30, 2019. Said U.S. patent application Ser. No. 17/698,634 is also a continuation-in-part of U.S. patent application Ser. No. 17/523,190, filed Nov. 10, 2021, which claims the benefit of and priority to U.S. Provisional Application No. 63/113,025, filed Nov. 12, 2020. Said U.S. patent application Ser. No. 17/698,634 is also a continuation-in-part of U.S. patent application Ser. No. 17/194,138, filed Mar. 5, 2021, now U.S. Pat. No. 11,422,830, which claims the benefit of and priority to U.S. Provisional Application No. 62/985,497, filed Mar. 5, 2020. Said U.S. patent application Ser. No. 17/698,634 is also a continuation-in-part of U.S. patent application Ser. No. 17/159,700, filed Jan. 27, 2021, which claims the benefit of and priority to U.S. Provisional Application No. 62/966,727, filed Jan. 28, 2020. Each of the foregoing applications is hereby incorporated by reference in its entirety for all purposes.

FIELD

Disclosed embodiments according to the present disclosure relate generally to load handling and in particular to systems and methods for multi-tier resource, subsystem, and load orchestration.

BACKGROUND

Performance of various processes frequently requires use of specialized resources. Quantities, capacities, and capabilities of resources such as reliability, speed, efficiency, and accuracy may be limited and varied, however, which may limit an extent to which resources may be available for handling of a process with respect to various loads. Such limitations may result in sub-optimal process performance and results.

Therefore, there is a need in the art for improvements that address such limitations and technical challenges. This and other needs are addressed by the present disclosure.

BRIEF SUMMARY

Certain embodiments according to the present disclosure relate generally to load handling and in particular to systems and methods for multi-tier resource, subsystem, and load orchestration.

In one aspect, a system to control process-performing resources with respect to particular loads is disclosed. The system may include one or more interfaces that receive a set of electronic communications via a network from a plurality of electronic devices. The set of electronic communications may include one or more of signals of device interactions or data changes that correspond to process and/or process performances by process-performing resources, signals of conditions of loads, and/or signals of processes associated with the process-performing resources and the loads. The system may include one or more processors and one or more non-transitory, computer-readable storage media containing instructions which, when executed on the one or more processors, cause the one or more processors to perform one or a combination of the following operations. A plurality of data composites may be formed from the set of electronic communications at least in part by, for each electronic communication of the set of electronic communications: processing the electronic communication to identify one or more digital identifiers mapped to one or more of the process-performing resources and/or loads, and extracting and caching a data portion from the electronic communication. The data portions may be collected and mapped to one or more resource profile records and/or one or more load profile records that are stored in one or more resource data storages and/or one or more load data storages. The one or more resource profile records and/or one or more load profile records may be updated with the collected data portions. For each load, at least one of the one or more resource profile records and/or the one or more load profile records may be used to map a subset of one or more of the process-performing resources to the load. Based at least in part on the mapping, content nodes may be linked in a network of content nodes where each content node of the network of content nodes may include respective linked content, the respective linked content comprising a subset of resource specifications and/or a subset of load specifications corresponding to at least one of the one or more resource profile records and/or the one or more load profile records. Access to a plurality of subsets of resource specifications and a plurality of subsets of load specifications of the network of content nodes may be allowed to at least one of the one or more electronic devices via a control interface.

In another aspect, one or more non-transitory, machine-readable media may store executable instructions that, when executed by one or more processing devices, cause the one or more processing devices to perform one or a combination of the following operations. A set of electronic communications received via a network from a plurality of electronic devices may be processed. The set of electronic communications may include one or more of signals of device interactions or data changes that correspond to process and/or process performances by process-performing resources, signals of conditions of loads, and/or signals of processes associated with the process-performing resources and the loads. A plurality of data composites may be formed from the set of electronic communications at least in part by, for each electronic communication of the set of electronic communications: processing the electronic communication to identify one or more digital identifiers mapped to one or more of the process-performing resources and/or loads, and extracting and caching a data portion from the electronic communication. The data portions may be collected and mapped to one or more resource profile records and/or one or more load profile records that are stored in one or more resource data storages and/or one or more load data storages. The one or more resource profile records and/or one or more load profile records may be updated with the collected data portions. For each load, at least one of the one or more resource profile records and/or the one or more load profile records may be used to map a subset of one or more of the process-performing resources to the load. Based at least in part on the mapping, content nodes may be linked in a network of content nodes where each content node of the network of content nodes may include respective linked content, the respective linked content comprising a subset of resource specifications and/or a subset of load specifications corresponding to at least one of the one or more resource profile records and/or the one or more load profile records. Access to a plurality of subsets of resource specifications and a plurality of subsets of load specifications of the network of content nodes may be allowed to at least one of the one or more electronic devices via a control interface.

In yet another aspect, a method to control process-performing resources with respect to particular loads may include one or a combination of the following. A set of electronic communications received via a network from a plurality of electronic devices may be processed. The set of electronic communications may include one or more of signals of device interactions or data changes that correspond to process and/or process performances by process-performing resources, signals of conditions of loads, and/or signals of processes associated with the process-performing resources and the loads. A plurality of data composites may be formed from the set of electronic communications at least in part by, for each electronic communication of the set of electronic communications: processing the electronic communication to identify one or more digital identifiers mapped to one or more of the process-performing resources and/or loads, and extracting and caching a data portion from the electronic communication. The data portions may be collected and mapped to one or more resource profile records and/or one or more load profile records that are stored in one or more resource data storages and/or one or more load data storages. The one or more resource profile records and/or one or more load profile records may be updated with the collected data portions. For each load, at least one of the one or more resource profile records and/or the one or more load profile records may be used to map a subset of one or more of the process-performing resources to the load. Based at least in part on the mapping, content nodes may be linked in a network of content nodes where each content node of the network of content nodes may include respective linked content, the respective linked content comprising a subset of resource specifications and/or a subset of load specifications corresponding to at least one of the one or more resource profile records and/or the one or more load profile records. Access to a plurality of subsets of resource specifications and a plurality of subsets of load specifications of the network of content nodes may be allowed to at least one of the one or more electronic devices via a control interface.

In various embodiments, the electronic devices may correspond to one or more client devices, one or more operation-performing devices, and/or one or more sensors couplable to the one or more interfaces. In various embodiments, a graphical representation formatted to represent at least a portion of the network of content nodes may be created, and visualization data corresponding to the graphical representation may be communicated to the at least one of the one or more client devices to facilitate the control interface. In various embodiments, the mapping may correspond to assignment of the subset of one or more of the process-performing resources to the load. In various embodiments, the control interface may include one or more interface elements that are user-selectable to allow the access to the plurality of subsets of resource specifications and the plurality of subsets of load specifications of the network of content nodes. In various embodiments, a communication received from the at least one of the one or more client devices that corresponds to a selection of a particular interface element of the one or more interface elements of the control interface may be processed. Responsive to the communication, access to at least a subset of the plurality of subsets of resource specifications and/or the plurality of subsets of load specifications may be allowed. In various embodiments, a communication received from the at least one of the one or more client devices that corresponds to a selection of a particular interface element of the one or more interface elements of the control interface may be processed. Responsive to the communication, at least part of the plurality of subsets of resource specifications and/or the plurality of subsets of load specifications may be changed.

In various embodiments, the control interface may be adapted as a function of one or more resource specifications mapped to a user at least in part by authenticating the user of the at least one of the one or more client devices, identifying and mapping the one or more resource specifications to the user, and creating the graphical representation and the visualization data as a function of the one or more resource specifications mapped to the user. In various embodiments, one or more effective allocations of at least one of the process-performing resources with respect to at least one of the loads may be identified based at least in part on recognition of instances where the at least one of the process-performing resources has been allocated to one or more of the loads having attributes, load conditions, and/or load outcomes in common with the at least one the loads.

In various embodiments, a plurality of resource profile records and a plurality of load profile records may be used to model process-performing resources and loads. Based at least in part on the modeling, patterns of effective allocations of the process-performing resources and the loads may be learned. In various embodiments, the learned patterns of effective allocations may be used to determine a resource subsystem allocation to a particular load, and one or more nonconformities of the resource subsystem with respect to one or more of the learned patterns may be identified. In various embodiments, a pool of the process-performing resources may be determined, and one or more candidate resources to address the one or more nonconformities may be identified. One or more allocation instructions and/or signals regarding the identified one or more candidate resources may be generated. In various embodiments, the identified one or more candidate resources may be allocated to the particular load.

In various embodiments, load specifications from one or more sensor devices that are configured to detect the phenomena corresponding to respective loads of a plurality of loads may be monitored, where the one or more data changes correspond to the load specifications detected consequent to the monitoring. A trigger event may be recognized from the load specifications, where the trigger event corresponds to one or more state changes of a particular load of the plurality of loads. A pool of the process-performing resources may be determined, and one or more candidate resources may be identified as a function of the trigger event. One or more allocation instructions and/or signals regarding the identified one or more candidate resources may be generated. In various embodiments, the identified one or more candidate resources may be allocated to the particular load.

In various embodiments, the signals of device interactions or data changes that correspond to the process and/or the process performances by the process-performing resources may be monitored, and the signals of processes and/or tasks associated with the process-performing resources and the loads may be monitored. Based at least in part on the monitoring, a particular process-performing resource may be identified, and a resource subsystem allocation to a particular load with respect to the particular process-performing resource may be determined. A nonconformity of the resource subsystem with respect to the particular process-performing resource may be identified, and, consequent to the identifying the nonconformity, one or more allocation instructions and/or signals regarding the particular process-performing resource may be generated. In various embodiments, the particular process-performing resource may be allocated to the particular load.

In various embodiments, signals of data changes that correspond to the process-performing resources may be monitored. A trigger event may be recognized from the signals of data changes, where the trigger event corresponds to the one or more state changes of a particular process-performing resource of the process-performing resources. A pool of the process-performing resources may be determined, and one or more candidate resources may be identified as a function of the trigger event. One or more allocation instructions and/or signals regarding the identified one or more candidate resources may be generated. In various embodiments, the identified one or more candidate resources may be allocated to the particular load.

In various embodiments, a communication from a client device of the one or more client devices that indicates a particular process-performing resource and a location specified for the particular process-performing resource may be processed. Responsive to the communication, the particular process-performing resource may be allocated to one or more of the loads based at least in part on the specified location. In various embodiments, a trigger event may be recognized and mapped to a particular load. Based at least in part on the network of content nodes, a resource subsystem allocated to the particular load may be identified, and one or more notifications may be transmitted to one or more subsets of process-performing resources of the resource subsystem in accordance with rules that provide for hierarchically scaled notifications.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be described in conjunction with the following appended figures.

7

8

Figure 3:
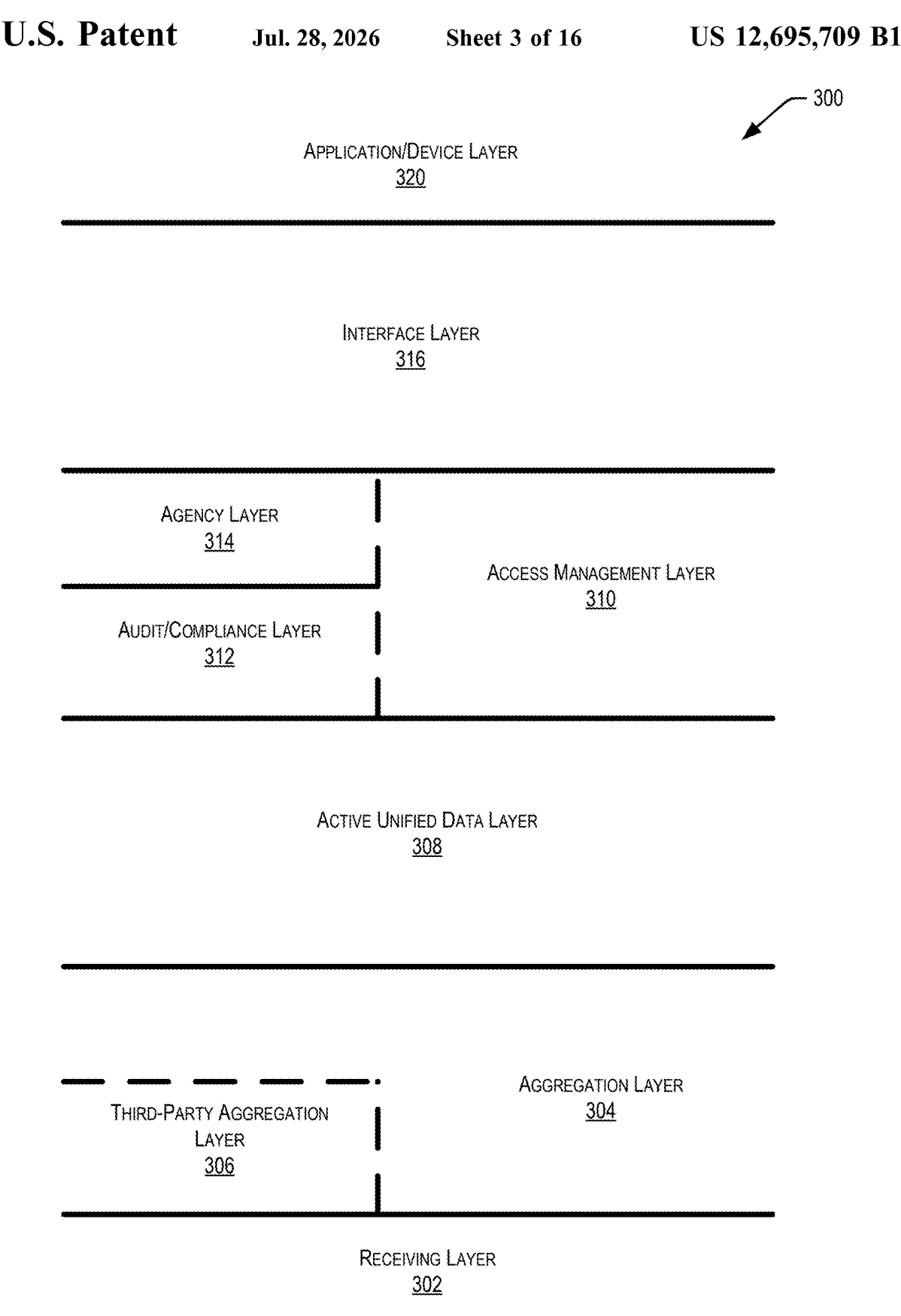

FIG. 3 illustrates a block diagram of an architecture stack of the control system, in accordance with embodiments of the present disclosure.

Figure 4:
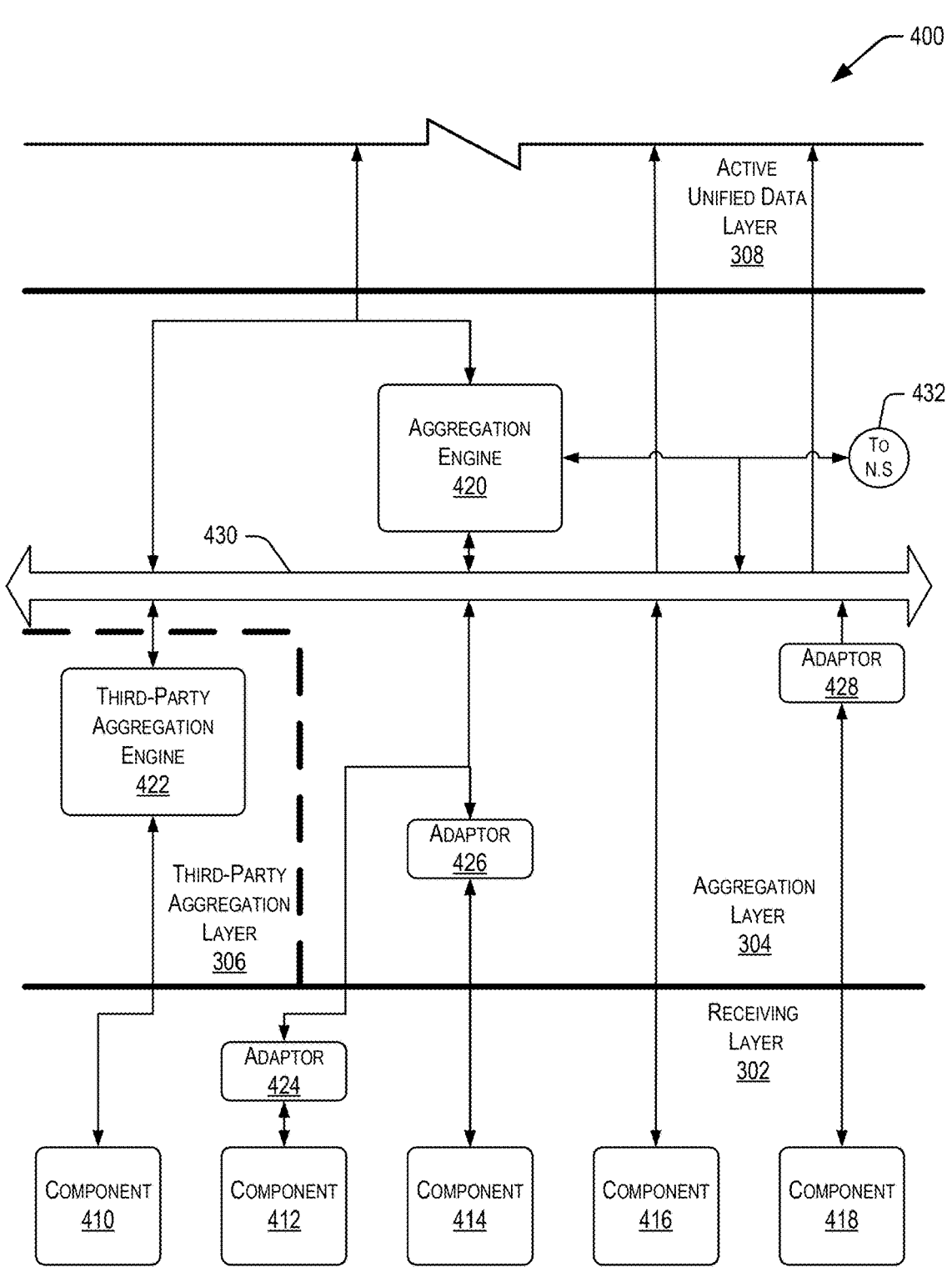

FIG. 4 illustrates a block diagram of a portion of the architecture stack, in accordance with embodiments of the present disclosure.

Figure 5:
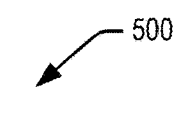

FIG. 5 illustrates a block diagram of a portion of the architecture stack, in accordance with embodiments of the present disclosure.

Figure 6:

FIG. 6 illustrates a block diagram of a portion of the architecture stack, in accordance with embodiments of the present disclosure.

Figure 7:
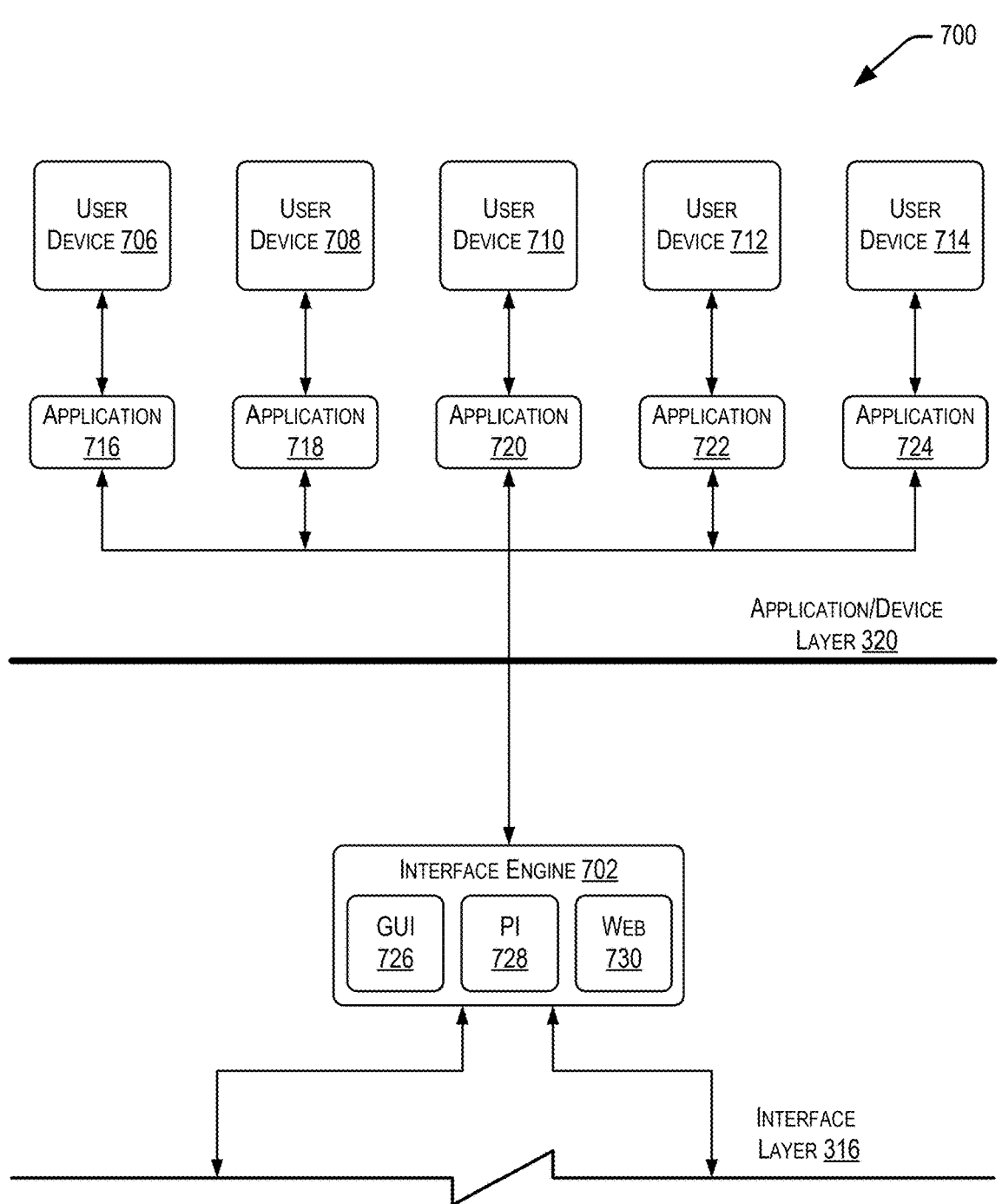

FIG. 7 illustrates a block diagram of a portion of the architecture stack, in accordance with embodiments of the present disclosure.

Figure 8:
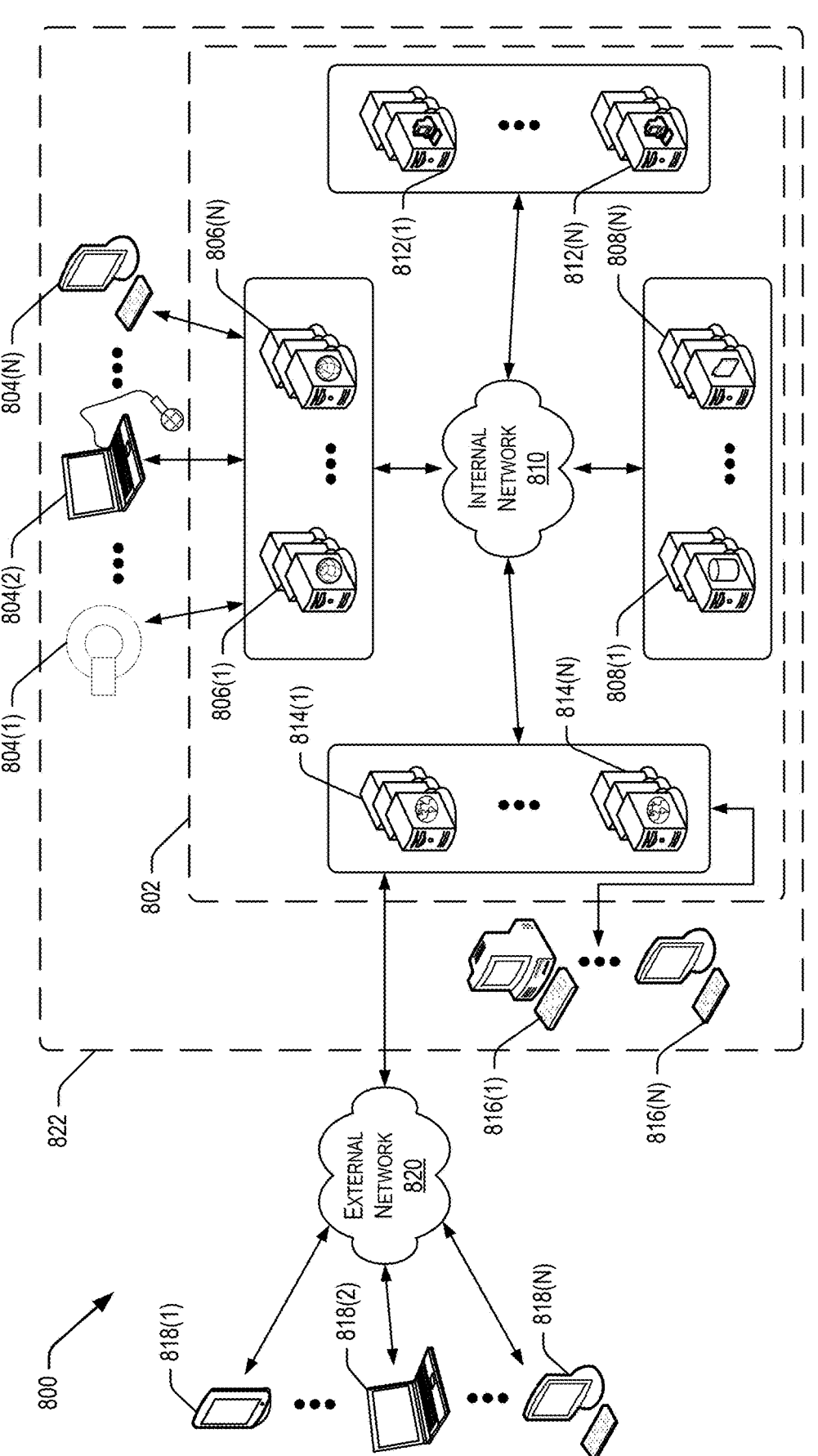

FIG. 8 illustrates an example schematic architecture of the interaction system, in accordance with embodiments of the present disclosure.

Figure 9:
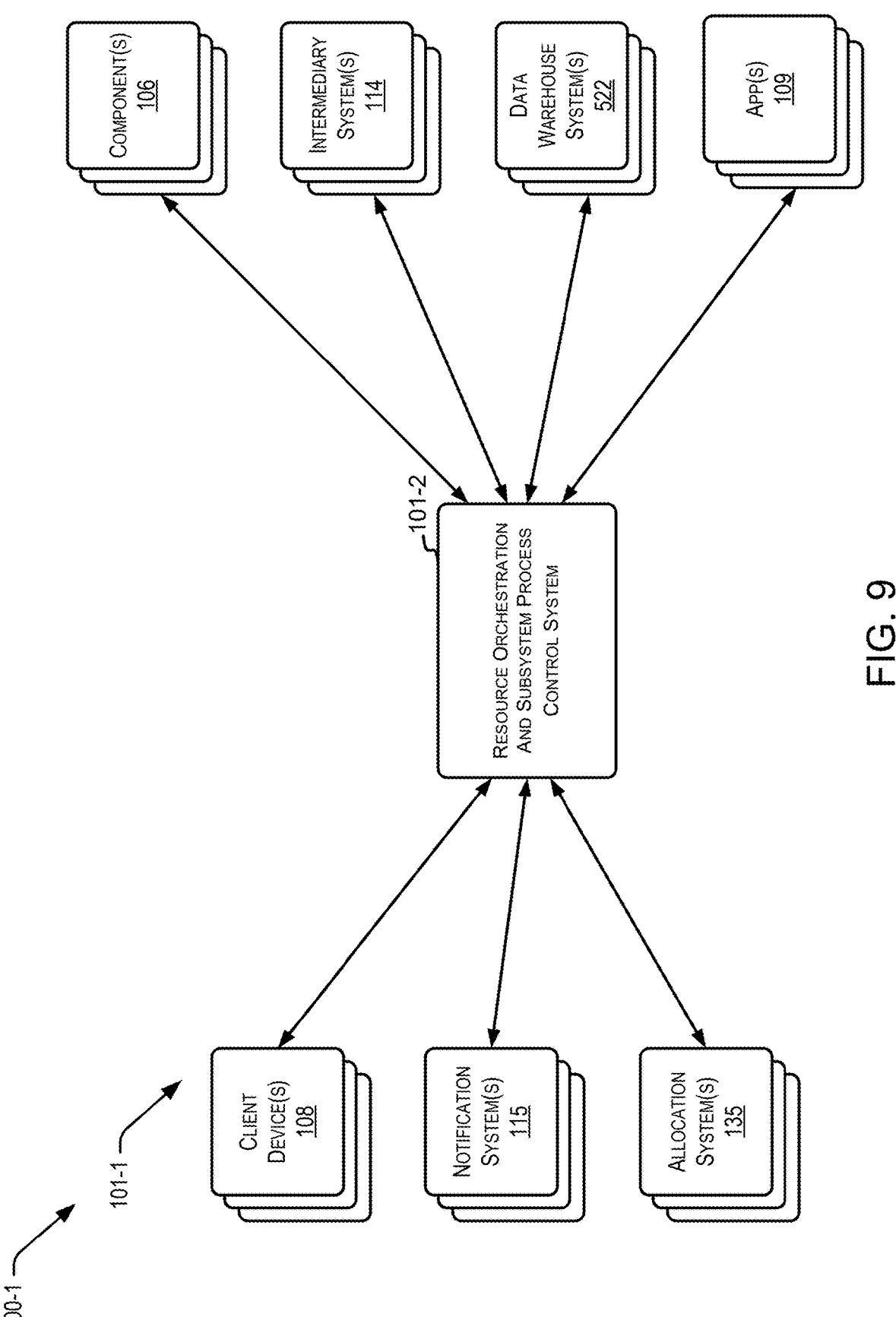

FIG. 9 illustrates a simplified diagram of aspects of the network for implementing embodiments of the resource orchestration system, in accordance with embodiments of the present disclosure.

Figure 10:
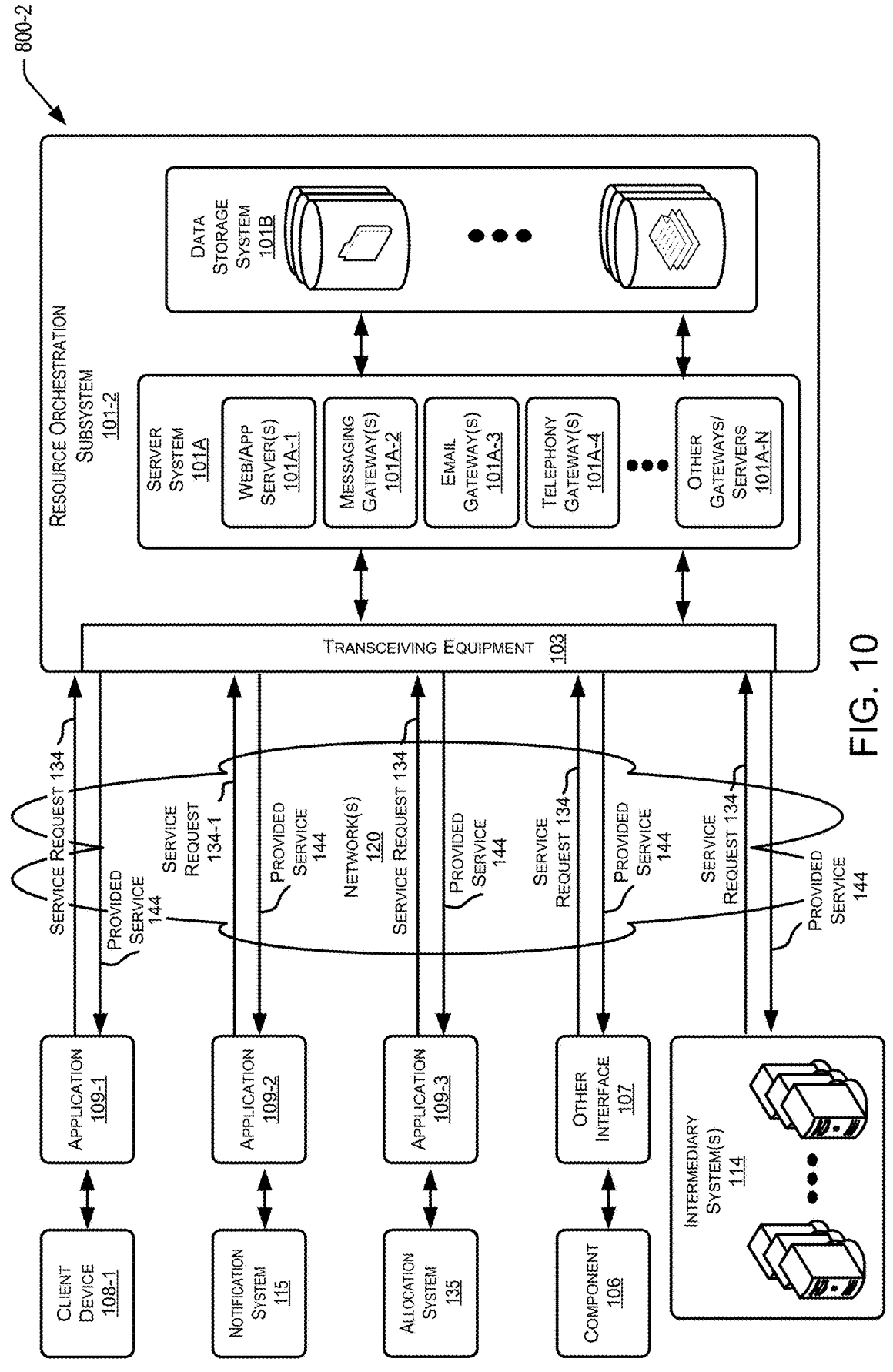

FIG. 10 illustrates another simplified diagram of the network for implementing embodiments of the resource orchestration subsystem, in accordance with embodiments of the present disclosure.

Figure 11:
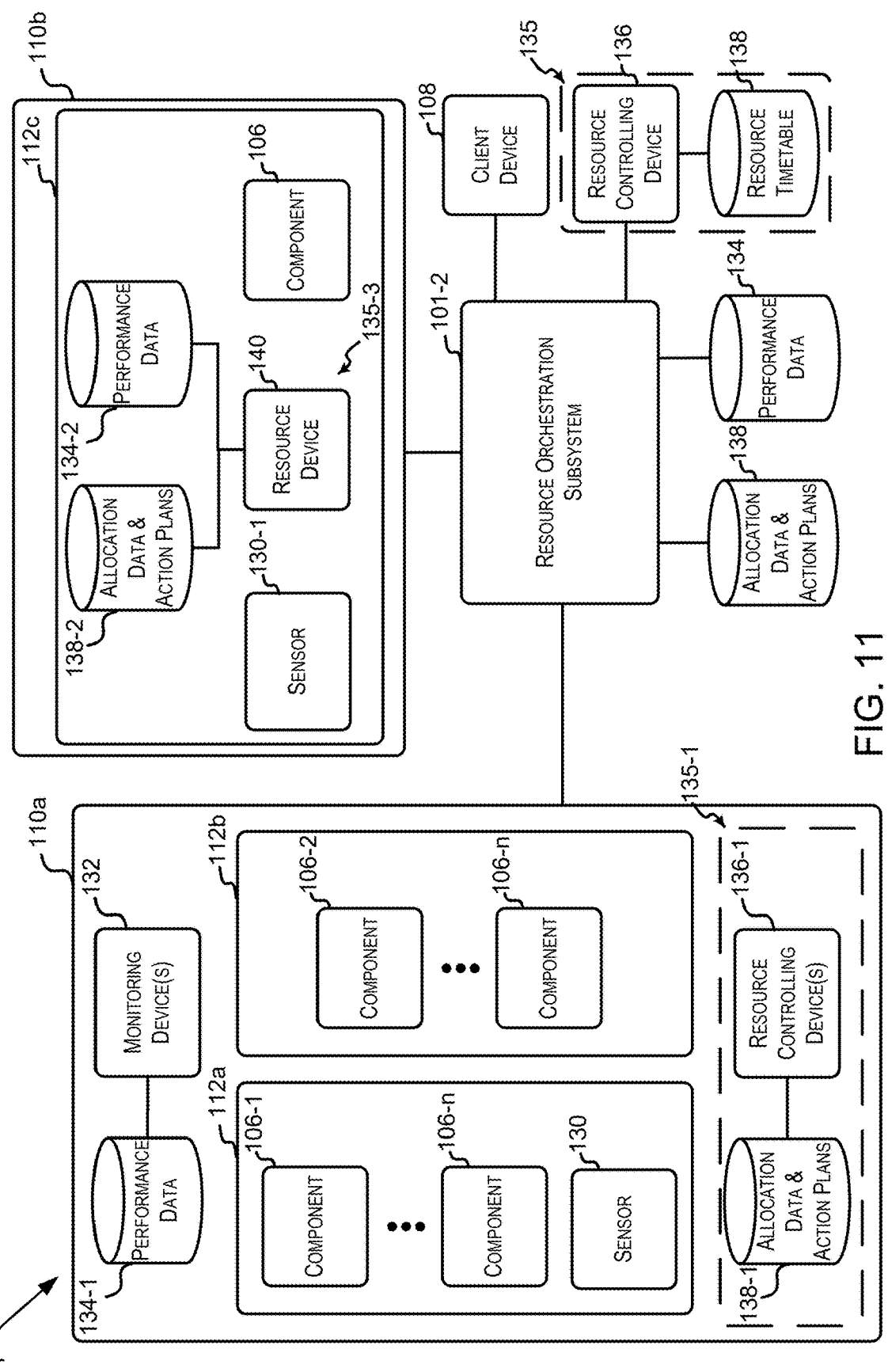

FIG. 11 illustrates a block diagram further elaborating on aspects of a system of the interaction system, in accordance with embodiments of the present disclosure.

Figure 12:
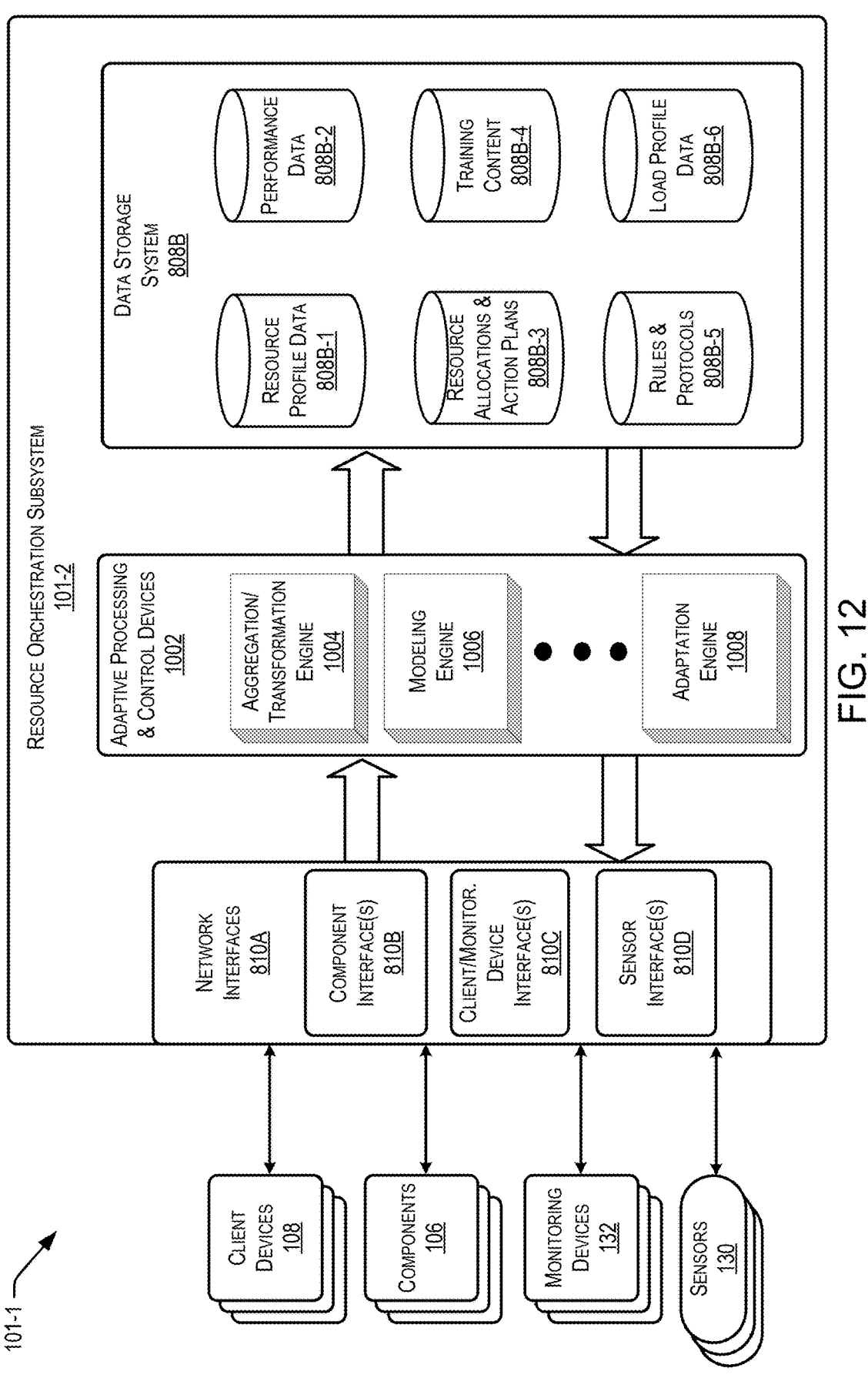

FIG. 12 illustrates a diagram of aspects of a resource orchestration subsystem, in accordance with embodiments of the present disclosure.

Figure 13:
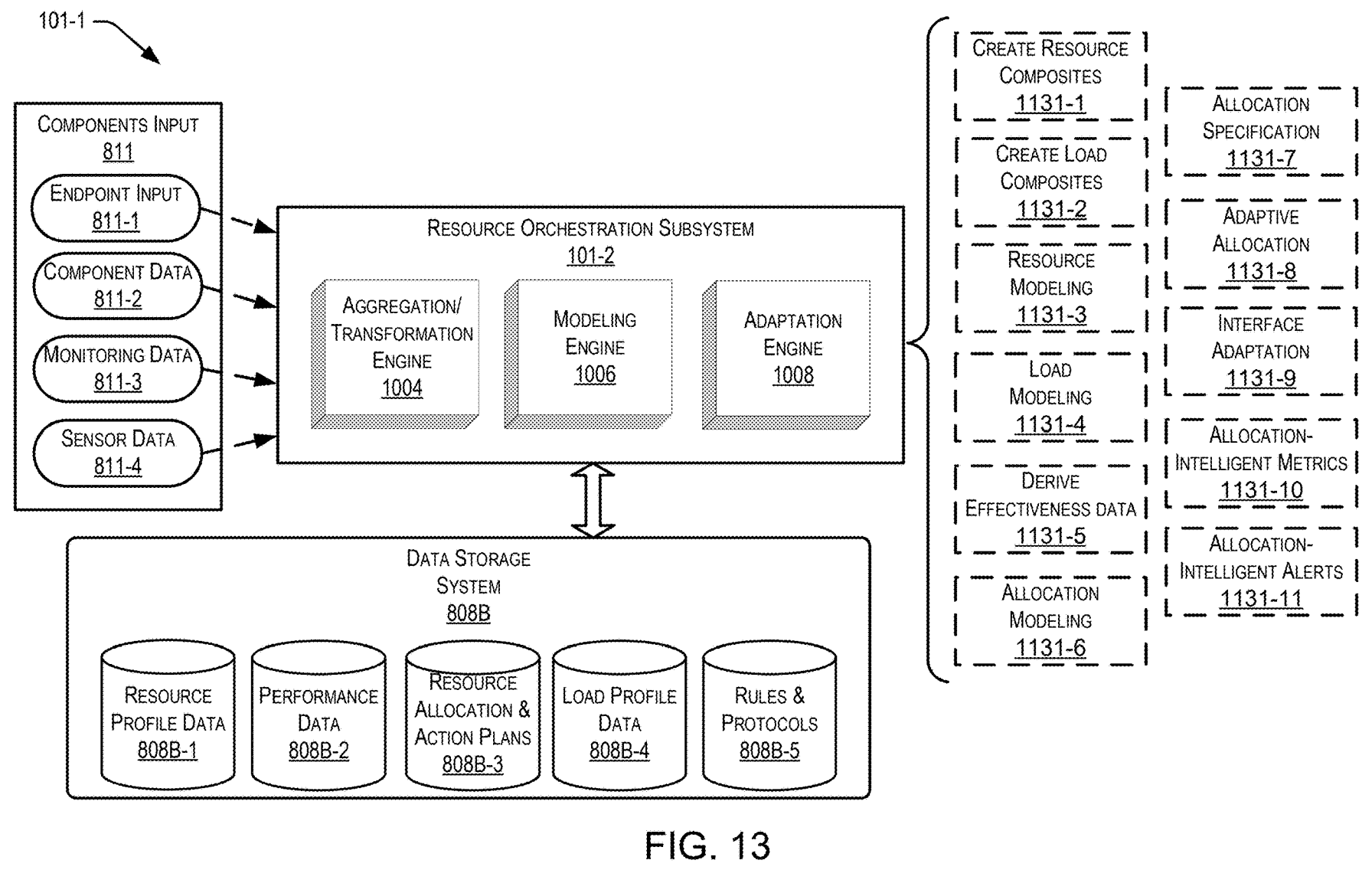

FIG. 13 illustrates a functional diagram of aspects of the resource orchestration subsystem, in accordance with embodiments of the present disclosure.

Figure 14:
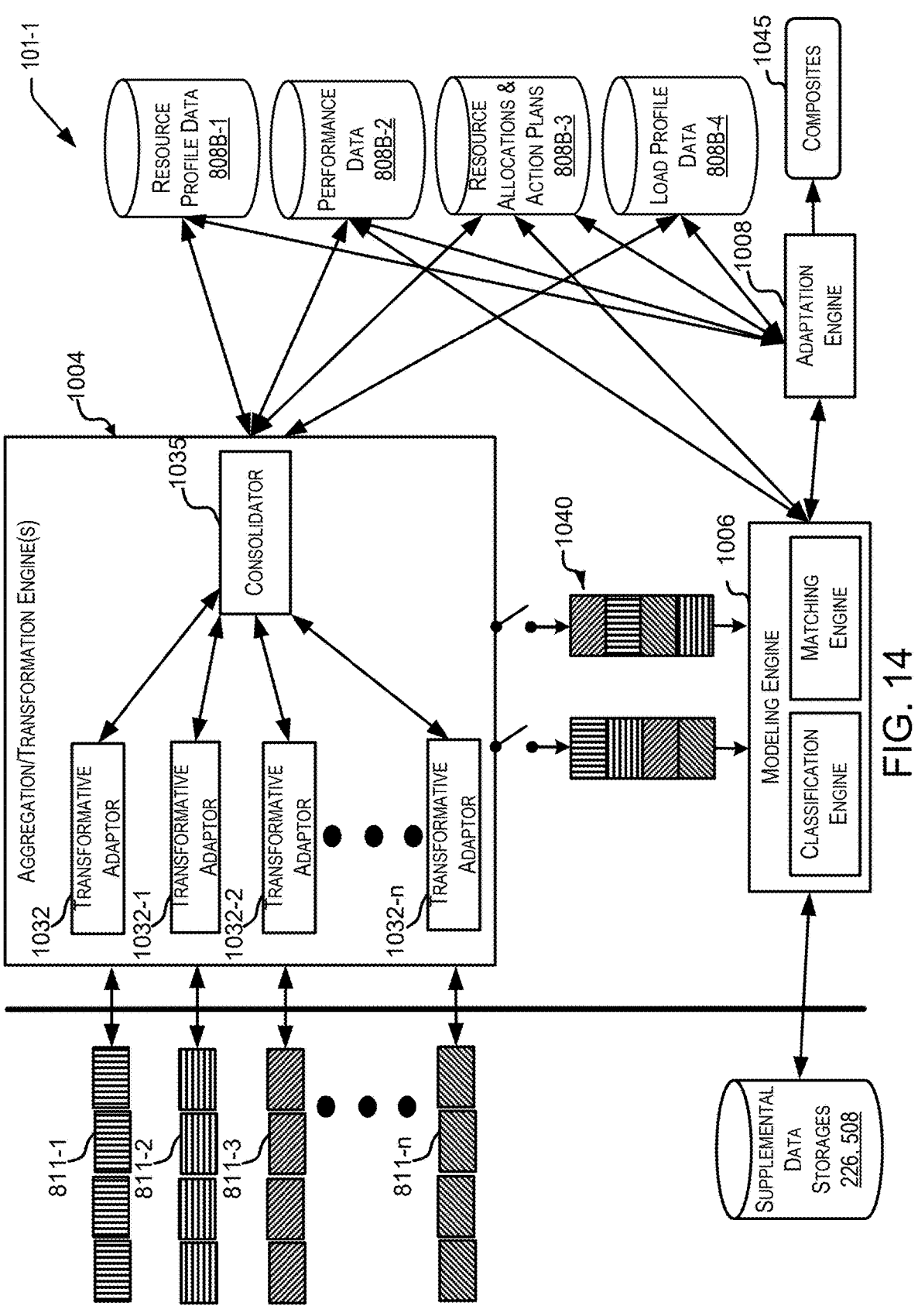

FIG. 14 illustrates a diagram that depicts a portion of the resource orchestration subsystem including further aspects of aggregation, transformation, and modeling engines, in accordance with embodiments of the present disclosure.

Figure 15:
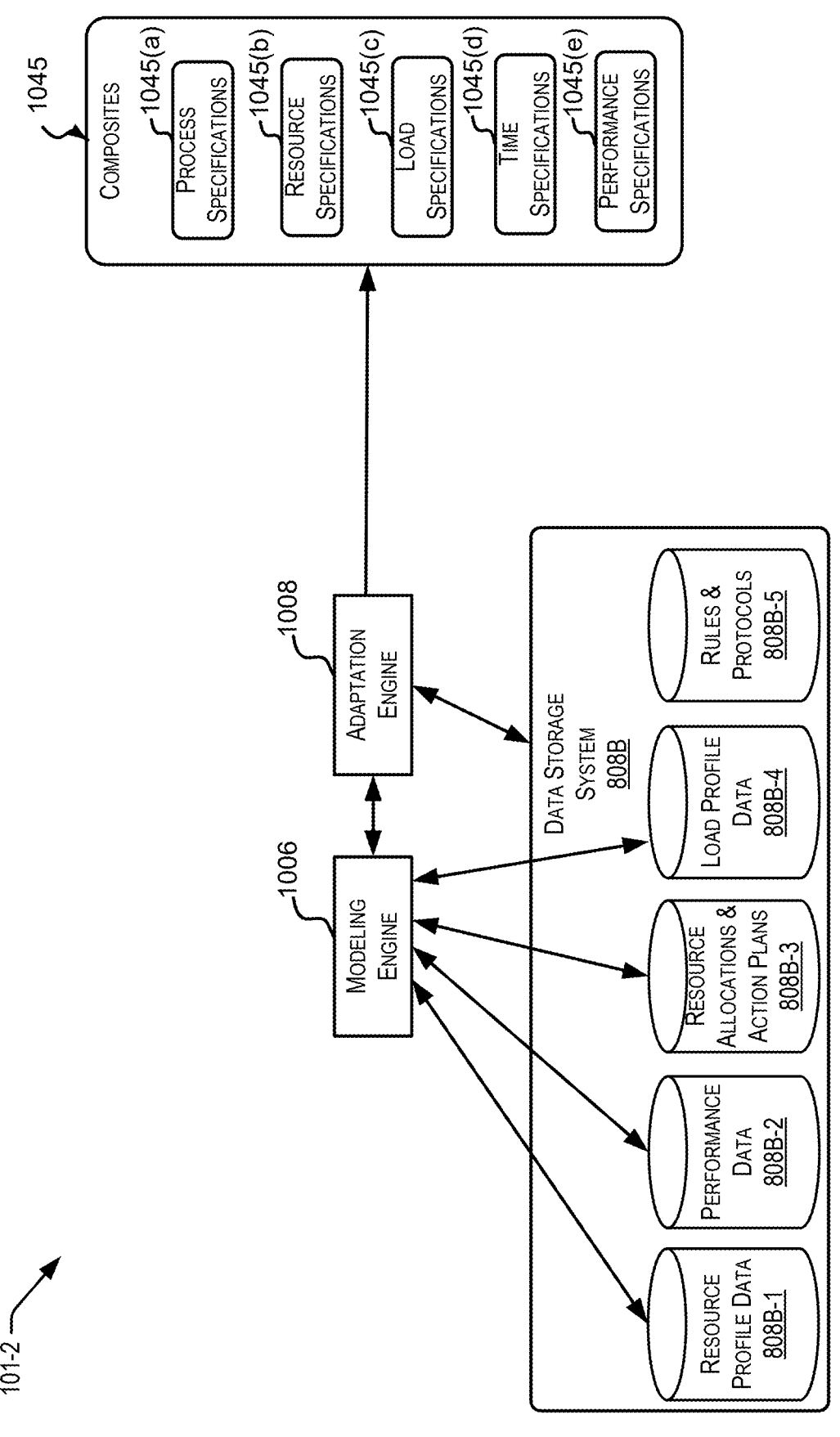

FIG. 15 illustrates a diagram that depicts a portion of the resource orchestration subsystem including further aspects of composite generation, in accordance with embodiments of the present disclosure.

Figure 16:
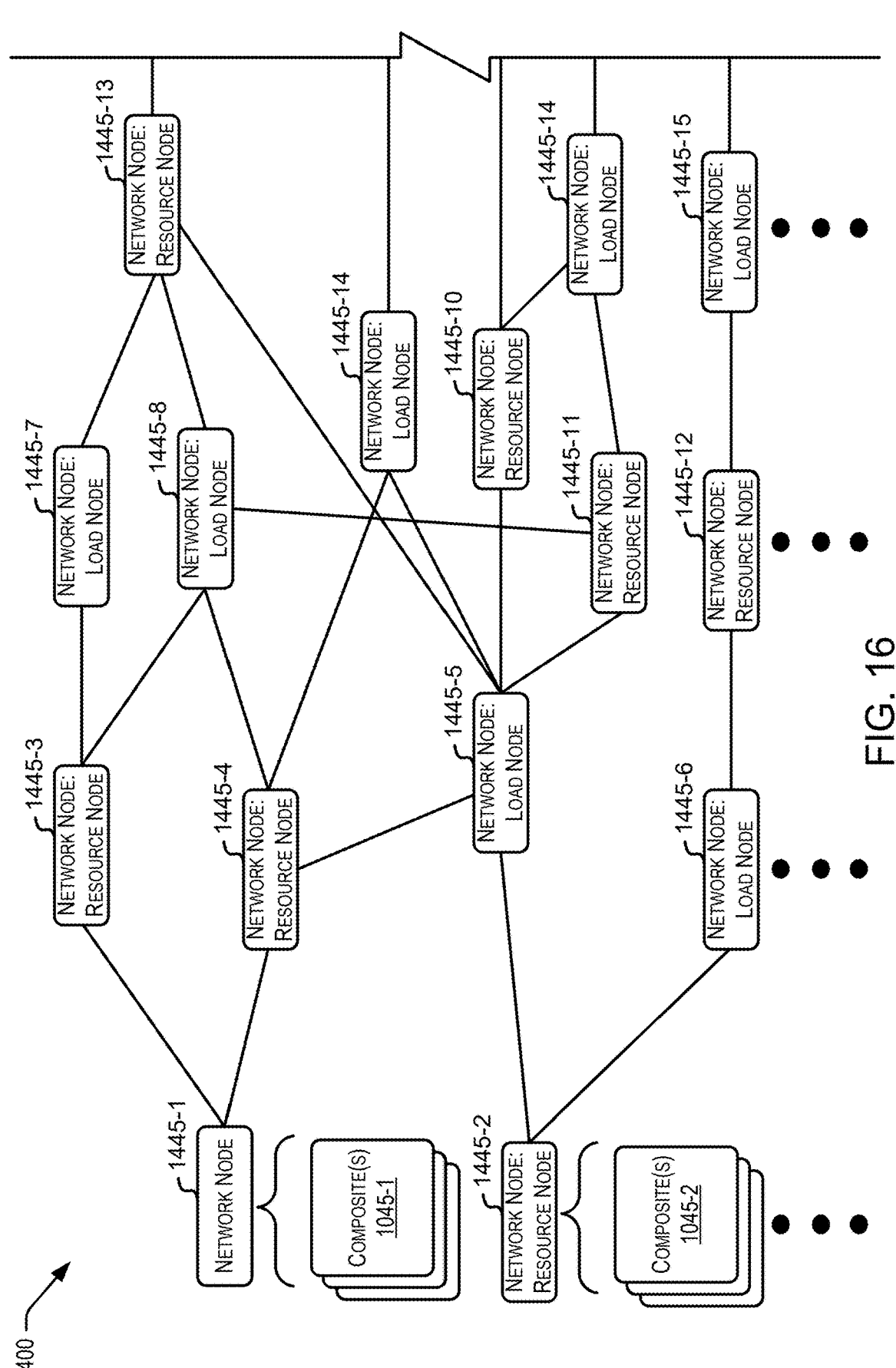

FIG. 16 illustrates a diagram of a node network, in accordance with embodiments of the present disclosure.

In the appended figures, similar components and/or features may have the same reference label. Further, various components of the same type may be distinguished by following the reference label by a dash and a second label that distinguishes among the similar components. If only the first reference label may be used in the specification, the description may be applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
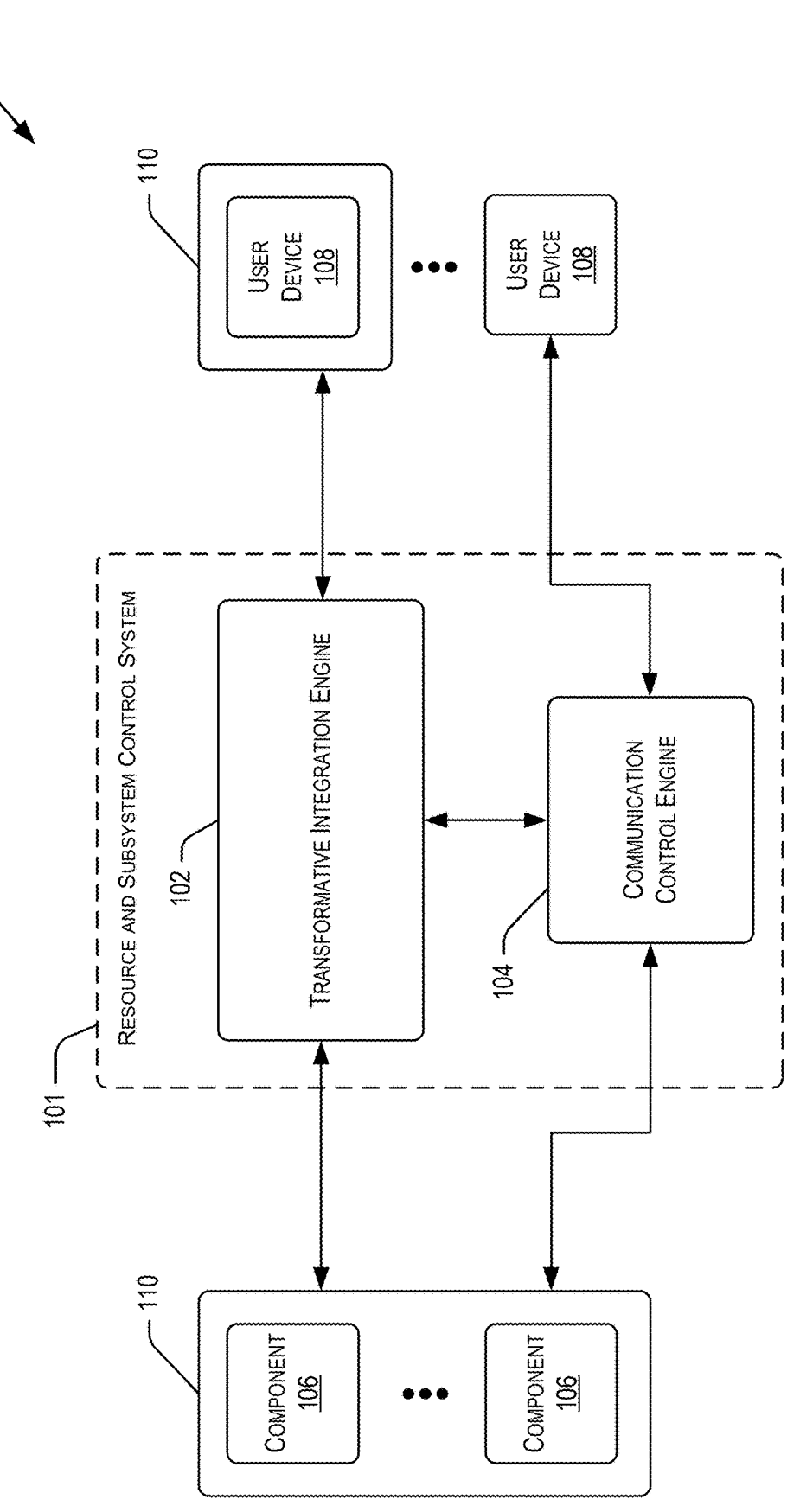
FIG. 1 illustrates a block diagram of aspects of an interaction system with a control system, in accordance with embodiments of the present disclosure.

FIG. 1 depicts a block diagram of an embodiment of an interaction system 100 with a resource and subsystem control system 101 (also referenced herein as the adaptive system 101) is illustrated. In various embodiments, the adaptive system 101 may at least partially include one or both of a transformative processing engine 102 and a communication control engine 104. Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, web-server premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provided to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102. Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client, client agent, and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Figure 2:
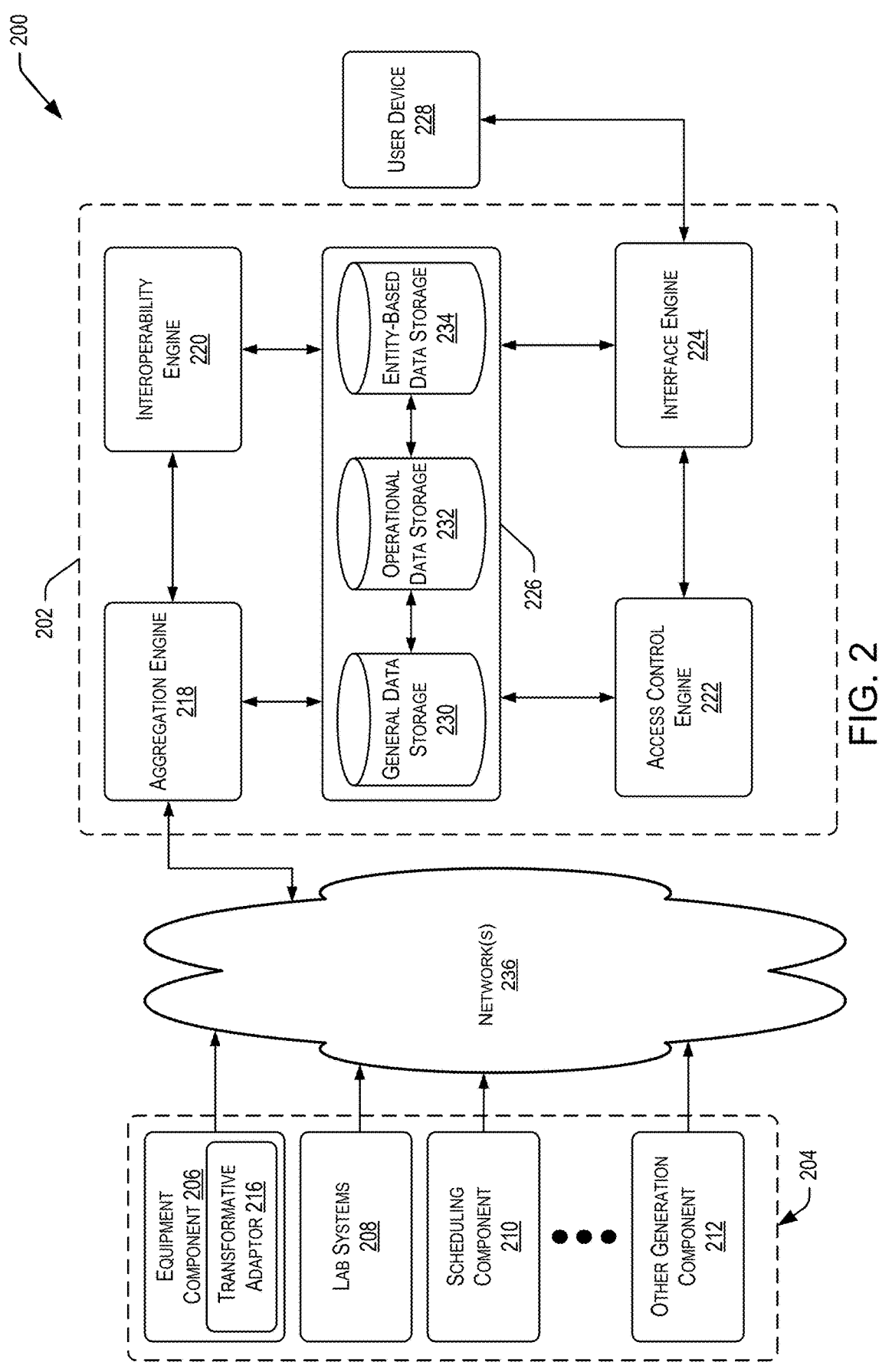
FIG. 2 illustrates a block diagram of aspects of the interaction system, in accordance with embodiments of the present disclosure.

Referring next to FIG. 2, a block diagram of an example of an interaction system 200 is shown. Interaction system 200 may correspond to interaction system 100 illustrated in FIG. 1 and may include a transformative engine 202. Transformative engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation components 212. One or more generation components 204 are examples of one or more components 106 discussed with reference to other drawings herein.

Generally, one or more generation components 204 may include any suitable device or system capable of generating data in the context of an interaction system. For example, the other generation components 212 may include a sensor on a door, and equipment component 206 may include a sophisticated computer-controlled laser device. In either case, each generation component generates some type of data. For example, the data provided by the sensor may be used to address security concerns or determining heating, ventilating, and air conditioning (HVAC). The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative engine 202 in accordance with techniques described herein may achieve this design-making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, implant, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-defined or learned. Transformative engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative engine 202.

Specification component 210 may include any suitable computing devices used for operations-related purposes with respect to interaction system 200. For example, specification component 210 may be configured to temporally specify a resource for allocation for a particular entity during a particular time slot. Specification component 210 may monitor a temporal specification for the resource and may identify one or more available time slots that may be secured by a particular entity. Upon receiving a specification indication, specification component 210 may update a temporal specification of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

In some embodiments, the transformative engine 202 may be configured to monitor data (e.g., messages) that is passed over the one or more networks 236 and, from the monitored data, select certain portions to provide to one or more authorized users via chat rooms/channels. For example, as disclosed herein, one or more agents may monitor data passed over the one or more networks 236. The one or more agents may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. Thus, in some embodiments, one or more bots may be configured as listeners, and agent engine 118C may, in some embodiments, correspond to the bot engine 118D, which are disclosed herein.

The transformative processing engine 202 may include an aggregation engine 218, an interoperability engine 220, an access management engine 222, an interface engine 224, and a data storage 226. The interface engine 224 may be configured to retrieve the data from the data storage 226 and provide one or more interfaces for interacting with elements of the transformative processing engine 202. For example, the interface engine 224 may include an interface by which an application running on user device 228 may access portions of data within the data storage 226. Generally, aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data storage 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data storage 226. Data storage 226 (and any other data storage discussed herein) may include one or more data storages, which may be distributed throughout two or more different locations (e.g., present on different devices, which may include devices of different entities and/or a cloud server). In some examples, data storage 226 may include a general data storage 230, an operational data storage 232, and an entity-based data storage 234. Within each of the data storages 230, 232, and 234 is stored data. Depending on the structure of the particular data storage, certain data storages may include rules for reading and writing. The data storages 230, 232, and 234 may include records, tables, arrays, and the like, which may be relational or non-relational. Depending on the data storage, records for individual entities, operational and analytics information, output data from one or more generation components 204, and the like may be retained. The data within the data storages 230, 232, and 234 include elements or tags such that a particular data (e.g., for a single entity, protocol, etc.) may be retrieved.

Access control engine 222 is configured to control access to features of transformative engine 202, including access to the data retained in data storage 226. For example, access control engine 222 may verify that a user device such as user device 228 is authorized to access data storage 226. To verify the user device 228, access control engine 222 may require that a user of the user device 228 input a username and password, have a profile associated with the interaction system, and the like. Access control engine 222 may also verify that the user device 228 has an IP address or geographical location that corresponds to an authorized list, that the user device 228 may include a plug-in for properly accessing data storage 226, that the user device 228 is running certain applications required to access data storage 226, and the like. Further embodiments and details are disclosed in U.S. patent application Ser. No. 17/061,851, filed Oct. 2, 2020; U.S. patent application Ser. No. 16/709,248, filed Dec. 10, 2019; and U.S. Provisional Application No. 62/777,615, filed Dec. 10, 2018; the disclosures of each of which applications are incorporated by reference herein in their entireties for all purposes, as if fully set forth herein.

Turning next to FIG. 3, an architecture stack 300 of the control system 101 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a temporal specification, or in any other suitable manner. In some examples, data of aggregation layer 304 may be aggregated according to input and/or rules and may aggregate across records pertaining to, e.g., a premises, entity, time period, characteristic, outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data storages accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308. Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow an entity access to some elements within architecture stack 300. This may be achieved by providing the entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data storage integrity engine 506, and a data storage 508 (e.g., data storage 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data storage 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used for unique identification of the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data storage 508. A plurality of sub-engines 510-516 of the interoperability engine 502 may be configured to perform operations relating to storing data in the data storage 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data storages of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data storages of data storage 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the like. Finally, interoperability engine 502 may include an application engine 516 configured to provide service-oriented architecture web services.

Data storage 508 may include an electronic/digital record information data storage 518 ("record data storage 518"), a general data storage 520, an operational data storage 522, an entity-based data storage 524, and a streaming caching storage 526. While data storage 508 is illustrated as including a fixed number of data storages and storage elements, it is understood that data storage 508 may include any suitable number of data storages and storage elements, including more than illustrated or less than illustrated.

In some examples, a data query script is provided to query a first data storage and/or to obtain data for populating a data storage. Such script could query a data storage described herein (e.g., data storage 508) and/or could be used to obtain data to populate a data storage described herein (e.g., data storage 508). In one instance, the script is configured to be repeatedly executed, so as to repeatedly draw data from a source data storage. The retrieved data may then be formatted, filtered, sorted and/or processed and then stored, presented and/or otherwise used. In this manner, the script may be used to produce streaming analytics.

In some instances, the data query script, when executed, identifies each of the data storages of interest. Identifying the data storages of interest may include identifying at least a portion of data from the data storages simultaneously and/or sequentially. For example, the script may identify corresponding data storages (e.g., or components of a single data storage or multiple data storages) that pertain to one or more similar variables but that differ in one or more other variables. Once the portion of the data from the data storages is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data storage 518 is retained data including electronic record information. In some examples, the information within record data storage 518 is organized according to entity identifying information. Thus, record data storage 518, in some examples, may include individually identifiable information. But it may also include de-identified information.

Within general data storage 520 is retained data. The data may be stored in a relational database format or in any other suitable format. Thus, the data within general data storage 520 may be retained in a data structure that may include one or more tables capable of accessing each other. In some examples, general data storage 520 may include a subset of the information that is included in operational data storage 522.

Within operational data storage 522 is retained data in a relational database format. Thus, the data within operational data storage 522 may be retained in a data structure that may include one or more data structures (e.g., tables) capable of accessing each other. Operational data storage 522 is an example of an operational data warehouse system. In operational data storage 522 is joined many different types of data. In some examples, the operational data ware house 522 may include data pertaining to decision making as discussed herein and other data typically used by conventional operational concerns.

Within entity-based data storage 524 is retained data in a non-relational database format. Thus, the data within entity-based data storage 524 may be retained in a structure other than tables. Such structure may be appropriate for large and complex data sets. In some examples, entity-based data storage 524 (or any other data storage) may be a unified system, which may include: a document-centric, schema-agnostic, structure-aware, clustered, interactional, secure, database server with built-in search and a full suite of application services. An example of such a unified system may be Marklogic. Entity-based data storage 524 may support data aggregation, data structuring, data indexing, data tagging and mapping to semantic standards, concept matching, concept extraction, machine learning algorithms, concept discovery, concept mining, and transformation of record information. In some examples, entity-based data storage 524 may include data pertaining to decision making (similar to general data storage 520) as discussed that is organized and accessed in a different manner. For example, the data within entity-based data storage 524 may be optimized for providing and receiving information over one or more information exchanges. In some examples, entity-based data storage 524 may include a subset of the information that is included in operational data storage 522.

Finally, in some examples, streaming caching storage 526 is a streaming data cache data storage. As discussed previously, certain components of components 410-418 may support streaming data to other components or user devices.

Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data storage integrity engine 506. In some examples, data storage integrity engine 506 is configured to ensure integrity of the information within data storage 508. For example, data storage integrity engine 506 applies one or more rules to decide whether information within all or part of data storage 508 should be scrubbed, removed, or adjusted. In this manner, confidence is increased that the information within data storage 508 is accurate and current.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data storage 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data storage 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

The security engine 610 evaluates the rules and conditions for ensuring the security of access to the elements of the interaction system. In some examples, these rules and conditions are determined by administrators of the interaction system. In some examples, the security engine 610 provides a plurality of computer virus protection services. These services can be called up and implemented when accessing the interaction system or accessing applications associated with the interaction system. For example, because the interaction system may include sensitive data, the security engine 610 may enforce a domain-based rule that protects certain sensitive information (e.g., identifying information).

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data storage 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data storage 508. In some examples, these rules and conditions are user-defined or learned over time. For example, data access engine 614 may indicate the routines, subroutines, or other logic needed for an application to access certain portions of data storage 508. For example, while authentication access engine 604 and login engine 606 may control which users may access parts of the interaction system, data access engine 614 may control how authenticated users access data within data storage 508. To this end, data access engine 614 may enforce and/or evaluate certain rules managing how users access different components of the interaction system. In some examples, data access engine 614 may be used to actually access data within data storage 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data storage 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by an agency and/or to provide report instances of defined types of events. Thus, in some examples, an agency uses agency engine 624 to collect data pertaining to compliance of the interaction system with one or more statutes or regulations. In some examples, agency engine 624 may identify one or more entities (e.g., agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are adapted for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are adapted to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and predictive modeling. Such operational information may include data because such data may impact operations, programming, predictive modeling, and the like. Accordingly, application 724 may present de-identified information in the form of one or more metrics, indicators, or the like as they pertain to operational intelligence.

Applications 716 and 718 shown in connection with interface engine 702 are applications developed by third parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Turning now to FIG. 8, an interaction system 800 is shown in accordance with embodiments of the present disclosure. Interaction system 800 may correspond to interaction systems 100, 200 and may include an internal system 822 including a transformative engine 802. The transformative engine 802 is an example of transformative engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N).

Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The systems, environments, devices, components, models, and the like of FIGS. 1-8 may be at least partially used to provide a multi-tier resource orchestration/control system corresponding to the system 101. The resource orchestration system 101 may provide a singular, unifying platform with the system 101 for controlling resources and subsystems of federated resources to service loads in accordance with various disclosed embodiments. Among things, the system 101 may provide a resource subsystem control platform that facilitates identification of resources, creation and development of resource specifications, identification of loads, creation and development of load specifications, determining assignments of resources to particular loads, determining resource subsystems assigned to particular loads, assigning resources to particular loads, modification of existing assignments of resources to particular loads, creating and modifying resource subsystems assigned to particular loads, and/or the like. Further, among other things, the platform may provide for a single source of truth regarding resource data, subsystem data, load data, and assignment data that may be shared with and facilitate mobile solutions and notification platforms to provide resource subsystem members with intelligently filtered, context-specific information. For example, this may allow for the direction of new or changing resources responsive to detected changes in the load's condition, which may include the system 101 automatically adding new resources to a resource subsystem mapped to the load and/or instructing the resource subsystem members as a function of the detected changes. Further, the resource orchestration system 101 may include a process control subsystem configured to instruct resources to perform specified processes with specified loads. Various embodiments of the resource orchestration system 101 may provide for various allocation features based at least in part on auto-adaptation to changes in loads, load conditions, load locations, resources, resource conditions, and/or the like disclosed herein. The following further illustrates additional aspects of such a platform and multi-tier resource orchestration system 101. Further, the environments, systems, networks, models, and the like of all the figures disclosed herein may be used to implement the techniques described herein and techniques described in U.S. Ser. No. 17/020,586, filed on Sep. 14, 2020; U.S. Provisional Application No. 62/900,050, filed on Sep. 13, 2019; U.S. patent application Ser. No. 17/070,101, filed Oct. 14, 2020; U.S. patent application Ser. No. 16/545,122, filed Aug. 20, 2019; U.S. patent application Ser. No. 16/181,226, filed Nov. 5, 2018; U.S. patent application Ser. No. 15/917,446, filed Mar. 9, 2018; U.S. Provisional Application No. 62/470,672, filed Mar. 13, 2017; U.S. Patent Application No. U.S. Ser. No. 15/620,607, filed Jun. 12, 2017; U.S. patent application Ser. No. 14/287, 408, filed on May 27, 2014; U.S. Provisional Application No. 61/827,466, filed on May 24, 2013; U.S. patent application Ser. No. 17/698,634, filed Mar. 18, 2022; U.S. patent application Ser. No. 17/521,689, filed Nov. 8, 2021; U.S. patent application Ser. No. 16/883,765, filed May 26, 2020; and U.S. Provisional Application No. 62/851,887, filed May 23, 2019; the disclosures of each of which applications are incorporated by reference herein in their entireties for all purposes, as if fully set forth herein.

As disclosed herein, the system 101 may provide for a resource allocation and control interface ("orchestration interface") that may allow for global access to the analytics, models, visualizations, profiles, and node network in order to facilitate resource allocation and control. The control interface may allow for assignments and instructions, transfers, and the like of particular resources in view of the various types of information presented. For example, the control interface may allow for node-based visibility into various tiers, for example, to have visibility into node-level effectiveness, patterns, trends, metrics, allocation changes and resource control instructions, identification of various categories of resources and the like. In some embodiments, system-generated suggestions and/or automatic instructions for specific resource allocations may be viewed, modify, rejected, overridden, remanded, or approved.

FIG. 9 illustrates a simplified diagram of aspects of the network 800-1 for implementing embodiments of the resource orchestration system, in accordance with the present disclosure. The system 101-1 may include a resource orchestration and subsystem process control system 101-2 ("resource orchestration subsystem 101-2") communicatively coupled with one or more of the user devices 108, one or more of the components 106, one or more intermediary systems 114, one or more notification systems 115, one or more resource-allocation systems 135, one or more data warehouse systems 522, and/or one or more applications 109, one or a combination of which, in various embodiments, may be included in the system 101-1 or may be remotely located from the system 101. The resource orchestration subsystem 101-2 may be communicatively coupled with one or a combination of the aforesaid via one or more networks 810 and/or 820 and one or more APIs and other programming connections disclosed herein. In various embodiments, the user devices 108, the components 106, the intermediary systems 114, one or more notification systems 115, one or more resource-allocation systems 135, and/or the applications 109 may correspond to, for example, one or a combination of common notification platforms, notification and call systems using proprietary client messaging applications, mobile apps, smartTVs, smart speakers, short message service (SMS), a multimedia message service (MMS), an instant messaging service, text-to-voice, text-to-conference, text-to-chat, iMobile, Mobile Heartbeat, email, fax, voice, chat, and/or the like.

The resource orchestration subsystem 101-2 may correspond to a process control subsystem configured to coordinate with resource-allocation systems 135 to instruct resources to perform specified processes with specified loads. In addition or alternative, the resource orchestration subsystem 101-2 may include or otherwise be configured as a resource-allocation system 135, as well as be communicatively coupled to one or more resource-allocation systems 135. For example, in various instances, one or more of the resource-allocation systems 135 may be internal to a premises and/or one or more of the resource-allocation systems 135 may be external to the premises.

The system 101 may be configured to provide the resource control platform, for example, by way of the resource orchestration subsystem 101-2, which may function as a control system that controls resources. Accordingly, the resource orchestration subsystem 101-2 may control and manage allocations and assignments of resources and subsystems of resources for the entire system 101. Further, the resource orchestration subsystem 101-2 may function as a hub for sharing assignment data for resources and resource subsystems with other systems, subsystems, interfaces, applications, and components-which may, for example, correspond to endpoints such as one or a combination of the user devices 108, the components 106, the intermediary systems 114, the notification systems 115, the resource-allocation systems 135, the data storage systems 522, and/or the applications 109.

The resource orchestration subsystem 101-2 may receive and process inputs from multiple data sources, for example, an HL7 ADT feed, among other communications from one or a combination of endpoints (e.g., the user devices 108, the components 106, the intermediary systems 114, the notification systems 115, the resource-allocation systems 135, and/or the applications 109). In some instances, for example, user-specified assignments of resources to particular loads and/or subsystems may be selected by one or more users of one or more of the user devices 108 and/or applications 109 having authenticated role-based access to the resource orchestration subsystem 101-2. The user-specified assignments may be transmitted from the one or more user devices 108 and/or applications 109 to the resource orchestration subsystem 101-2. Likewise, ADT feeds and/or augmented control data indicative of assignments of resources to particular loads and/or subsystems may be transmitted from one or more of the notification systems 115 and/or the resource-allocation systems 135 to the resource orchestration subsystem 101-2. Based at least in part on one or more of such inputs, the resource orchestration subsystem 101-2 may identify resources, identify loads, determine assignments of resources to particular loads, determine resource subsystems assigned to particular loads, assign resources to particular loads, and/or build or modify resource subsystems assigned to particular loads. Such assignment data may be stored by the system 101, for example, in the data storage systems 522. Further, the resource orchestration subsystem 101-2 may transmit (by way of pushing and/or transmission in response to requests/queries) location assignment specifications, assignment reporting data, and other assignment data to the user devices 108, the components 106, the intermediary systems 114, the notification systems 115, the resource-allocation systems 135, and/or the applications 109.

In providing the platform, the subsystem 101-2 may use a canonical data model for the assignment data and then use translation services and/or adaptors, such as one or a combination of the adaptors disclosed herein, on the edge to translate to downstream service needs, which may include, for example, REST APIs, socket connections, XML, translating from one queue technology to another queue technology, and/or the like. The subsystem 101-2 may at least partially use the transformative integration engine 202 to adapt to and integrate with the other systems, subsystems, interfaces, applications, and components, which may use a set of APIs to query the platform for resource and subsystem assignment data. The system 101 may populate the plurality of different downstream systems, subsystems, applications, interfaces, and components with resource assignment data, subsystem assignment data, and content such as user-selectable interface elements and corresponding options for resource allocation, and/or the like features disclosed further herein.

The transformative integration engine 102 and the control engine 104 may be included in or communicatively coupled to the subsystem 101-2. In various embodiments, the endpoints may communicate with the subsystem 101-2 (e.g., transformative processing engine 102 and the control engine 104) via one or a combination of a specified information format, protocol, encryption technique, language, and/or the like. However, in various embodiments, the endpoints may communicate with the transformative processing engine 102 and the control engine 104 via different information formats, different proprietary protocols, different encryption techniques, different languages, different machine languages, and the like. As discussed with reference to FIG. 2, the transformative processing engine 102 may be configured to receive these many different communications from endpoints, in their native formats and transform them into any of one or more formats. For example, the transformative integration engine 202 may transform, translate, convert, or otherwise adjust assignment data and content provided to the systems, subsystems, interfaces, applications, and components. For example, the transformative integration engine 202 may convert or otherwise adjust the assignment data and content to conform to a plurality of different formats used by the user devices 108, the components 106, the intermediary systems 114, the notification systems 115, the resource-allocation systems 135, the data storage systems 522, and/or the applications 109. In some examples, the transformative processing engine 102 receives data in the HL7 format or conforming to any other suitable format and/or may be configured to transform received data to conform with the HL7 format. The conversion/adjustment from one format to another format may be performed using one or more conversion rules, which may be user-defined or learned, particularized to the respective user device 108, component 106, intermediary system 114, notification system 115, resource-allocation system 135, data storage system 522, and/or application 109. The system 101 may communicate with the respective user device 108, component 106, intermediary system 114, notification system 115, resource-allocation system 135, data storage system 522, and/or application 109 via a specified protocol, where the payload data of the communications may be in a specified format, after the payload data was transformed to the specified format. Such communications may be queue-based. Accordingly, the received and/or transformed communications may be transmitted by the resource orchestration subsystem 101-2 to one or more other devices (e.g., the control engine 104, an entity device, and/or another endpoint) and/or locally or remotely stored.

FIG. 10 depicts another simplified diagram of the network 800-1 for implementing embodiments of the resource orchestration subsystem 101-2 in accordance with the present disclosure. The resource orchestration subsystem 101-2 may be communicatively coupled with the user devices 108, the components 106, the intermediary systems 114, the notification systems 115, the resource-allocation systems 135, and/or the applications 109 via one or more networks 120, which may correspond to one or more networks 810 and/or 820. The user devices 108, the components 106, the intermediary systems 114, the notification systems 115, and/or the resource-allocation systems 135 may be configured to execute and operate via various applications 109 and/or other interfaces 107 in order to interface with the system 101 and subsystem 101-2. The connections between the user devices 108, the components 106, the intermediary systems 114, the notification systems 115, and/or the resource-allocation systems 135 and the subsystem 101-2 (which may include engine 102 and engine 104) may include any suitable network connection.

In various embodiments, the one or more networks 120 may include one or a combination of any type of network that may support data communications using any of a variety of available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, HTTP and Secure HTTPS, Zigbee, Bluetooth®, Bluetooth Low Energy, Near Field Communication (NFC), and the like. Merely by way of example, network(s) 120 may be local area networks (LAN), such as one based on Ethernet, Token-Ring, and/or the like. Network(s) 120 also may be wide-area networks, such as the Internet. Networks 120 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 120. In various embodiments, the applications 109 and other interfaces 107 may include one or a combination of applications such as web browsers, direct messaging applications, email applications, short message service (SMS) applications, multimedia message service (MMS) applications, instant messaging applications, fax applications, voice applications, video applications, proprietary client messaging applications such as iMobile and LoadKeeper, and/or other suitable messaging service applications or other interfaces.

In the illustrated simplified example, the subsystem 101-2 may include a server system 101A and a data storage system 101B. In various embodiments, the server system 101A may be adapted to run one or more services or software applications. In some embodiments, these services may be provided as web-based or cloud services or under a Software as a Service (SaaS) model to the user devices 108, the components 106, the intermediary systems 114, the notification systems 115, and/or the resource-allocation systems 135. The user devices 108, the components 106, the intermediary systems 114, the notification systems 115, and/or the resource-allocation systems 135 may in turn utilize one or more client applications 109 and/or other interfaces 107 to interact with the server system 101A to utilize the services provided by these components. The server system 101A may run any suitable operating system and may also run any of a variety of additional server applications and/or mid-tier applications, such that server system 101A may include one or a combination of web servers, HTTP servers, Internet Information Services servers, FTP (file transfer protocol) servers, CGI (common gateway interface) servers, JAVA® servers, database servers, and/or the like. Exemplary database servers include without limitation those available from Oracle, Microsoft, Sybase, IBM, and the like. In the illustrated example, the server system 101A may include one or more web and/or application servers 101A-1, one or more messaging gateways 101A-2, one or more email gateways 101A-3, one or more telephony gateways 101A-4, one or more other gateways and/or other types of servers 101A-N, such as an application gateway to interface with different servers.

The data storage system 101B may include one or more databases that may reside in a variety of locations. By way of example, one or more databases may reside on a non-transitory storage medium local to (and/or resident in) the server system 101A. Alternatively, databases may be remote from the resource orchestration subsystem 101-2 and in communication with the resource orchestration subsystem 101-2 via a network-based or dedicated connection. In one set of embodiments, databases may reside in a storage-area network (SAN). Similarly, any necessary files for performing the functions attributed to the resource orchestration subsystem 101-2 may be stored locally on the resource orchestration subsystem 101-2 and/or remotely, as appropriate. In one set of embodiments, the databases of the data storage system 101B may include relational databases that are adapted to store, update, and retrieve data in response to SQL-formatted commands. In various embodiments, the data storage system 101B may correspond to one or a combination of data storages 226, data storages 508, and/or data storage servers 808(1)-808(N).

As disclosed further herein, the resource orchestration subsystem 101-2 may be configured to have a service-oriented architecture and may be configured to provide service-oriented web services to endpoint devices (e.g., the user devices 108, the components 106, the intermediary systems 114, the notification systems 115, and/or the resource-allocation systems 135). For example, the resource orchestration subsystem 101-2 may provide web-based services that facilitate the sending and receiving of messages and/or other communications to endpoints on behalf of client applications 109 and interfaces 107. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server system 101A and the user devices 108 and/or the components 106. With various embodiments, the client applications 109 and interfaces 107 may be any application or interface that supports HTTP. SSL or TLS may use HTTP or HTTPS to provide authentication and confidentiality. In other examples, web services may be implemented using REST over HTTPS with the OAuth open standard for authentication, or using the WS-Security standard which provides for secure SOAP (e.g., Simple Object Access Protocol) messages using Extensible Markup Language (XML) encryption. The server system 101A may include specialized hardware for providing secure web services. For example, the hardware may include secure network appliances having built-in features such as hardware-accelerated SSL and HTTPS, WS-Security, and firewalls. Such specialized hardware may be installed and configured in front of web servers of the server system 101A so that any external devices may communicate directly with the specialized hardware.

Endpoint devices may transmit service requests 134 via the one or more networks 120. The application 109 and/or interface 107 of a given endpoint device may be configured to send the service requests 134, which, for example, may be application programming interface (API) calls to the web service to pass payloads for sending with messages. The service requests 134 may be HTTP calls that may or may not be made via web interface. For example, with some embodiments, as long as the endpoint device has a command line interface, the endpoint device make the HTTP calls corresponding to the service requests 134.

FIG. 11 illustrates a block diagram further elaborating on aspects of the system 101-1 of the interaction system 100, in accordance with disclosed embodiments of the present disclosure. The system 101-1 corresponds to a number of technological improvements disclosed herein. The system 101-1 may monitor and track data indicative of resource allocation, data indicative of process performance by one or more resources with respect to loads, and/or data indicative of locations of resources and loads. The data monitored and tracked by the system 101-1 may include one or a combination of usage data corresponding to usage of components 106; sensor data corresponding to sensors detecting component usage, resources, resource actions, resource locations, load states and characteristics, and/or the like; and/or input provided by resources via devices 108 and/or monitoring devices 132. The data monitored by the system 101-1 may be aggregated, unified, deduped, and organized, and analyzed by the system 101-1 to derive the process performance data. To derive the process performance data, the system 101-1 may further retrieve load-specific data for correlation with the monitored data in order to map the monitored data specific loads. The system 101-1 may update one or more performance data storages 134 with derived performance data. The system 101-1 may further enforce subsystem operational conformance with respect to process protocols with respect to one or more subsystems of resources. The protocols may be, include, or otherwise correspond to process specifications and/or test specifications. Further, the protocols may correspond to programs that may be load-specific and/or particular to certain types of loads and/or certain load conditions.

Generally, in the system 101-1, data may be generated and/or collected at one or more of the system components 106, the devices 108, sensors 130, and/or resource allocation subsystems 135. The depicted instance shows two premises 110a, 110b. Other embodiments may include any different number of premises. Each premises 110 can include one or more units 112. In the depicted instance, a first premises 110a includes two units 112a and 112b, and a second premises 110b includes one unit 112c, but various other premises may include different numbers of units. Each unit 112 may correspond to a particular space. Units within a given premises (e.g., 112a and 112b) may be geographically separated from each other. In some instances, each of at least some units 112 within a premises may be of a same or similar type; may be configured for a same or similar type of use and/or may have one or more same or similar specifications or characteristics (e.g., dimensions, sizes, or intra-unit components). In some instances, each of at least some units 112 within a premises may be of different types, may be configured for different types of use and/or may have one or more different specifications or characteristics.

The subsystem 101-2 may be configured to communicate with multiple different sensors 130. Such communication may use various communication standards or protocols. In various embodiments, for example, the sensors 130 can be communicatively connected to and controllable by the subsystem 101-2. Sensors and control units may be coupled and the sensors 130 may be connected in a serial, parallel, star, hierarchical, and/or the like topologies and may communicate to the subsystem 101-2 via one or more serial, bus, or wireless protocols and technologies which may include, for example, WiFi, CAN bus, Bluetooth, I2C bus, ZigBee, Z-Wave, and/or the like. For instance, one or more sensors 130 may use a ZigBee® communication protocol while one or more other sensors 130 communicate with the subsystem 101-2 using a Z-Wave® communication protocol. Other forms of wireless communication may be used by sensors 130 and the subsystem 101-2. For instance, one or more sensors 130 and the subsystem 101-2 may be configured to communicate using a wireless local area network, which may use a communication protocol such as 802.11.

Within each unit may be one or more components 106 and/or one or more sensors 130. In various embodiments, a given component 106 and/or sensor 130 may, or may not, be fixed in place (i.e., stationary), restrained to limit mobility or fully movable. In various instances, a component 106 may, for example, correspond to equipment that may be configured to be used by an operator or user. In various embodiments, one or more components 106 and/or one or more sensors 130 may be configured to facilitate detection and tracking of process performance and, hence, overall process performance by resources. Sensor data may be transmitted to the resource orchestration subsystem 101-2 to facilitate the collection of sensor data and the derivation of performance data. For example, a sensor 130 may detect when a resource is proximate to a load location. To be more specific, such sensor data may be used by the system 101-1 to detect and confirm whether a resource is processing a load, in transition between loads, and/or the like in conjunction with other sensor data indicating resource locations (e.g., that the system 101-1 may match to a pattern that corresponds to routines). As another example, a sensor 130 may detect a characteristic of a load such as whether a load has been moved.

One or more of a sensor 130 and/or a component 102 communicatively coupled thereto may be configured to transmit electronic communications to one or more other electronic devices, which may include transmitting sensor input to the subsystem 101-2 upon trigger events as disclosed herein. The electronic communications may be transmitted to the subsystem 101-2, for example, upon detecting a new type of signal; continuously; at regular times or intervals; upon receiving a request; and/or upon detecting that a communication condition has been satisfied. The electronic communication may include, for example, sensor-collected data, inputs received at a component, an indication that an event has been detected, an indication that a communication condition has been satisfied, an identifier of the component or sensor, and/or a location of the component or sensor.

A sensor 130 may include, for example, a sensor configured to monitor a characteristic of an ambient environment (e.g., motion, light, infrared, temperature). As another example, a sensor 130 may be included within an electronic tag reader component so as to detect electronic tag signals (e.g., a RFID signal, RuBee signal) from the electronic tag/transponder, which may be excited by signal emitted from an antenna of the electronic tag reader component. As yet another example, a sensor 130 may be included within an equipment-tracking component so as to detect equipment tags. As still another example, a sensor 130 may include a receiver to receive signals from one or more signal sources (e.g., GPS satellites or Wi-Fi access points) to enable identifying a location of a device coupled to or including the sensor.

One or more sensors 130 may include a fingerprint scanner and/or a different type of biometric scanner for biometric identification, such as a retina scanner that may be used for optical identification. Further, the one or more sensors 130 may include, for example, one or more cameras. The camera can be any device configured to generate image and/or audio data including, for example, still image data, video image data, and/or any sound data, corresponding to detected phenomena. The one or more sensors 130 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. Thus, a multiplicity of integrated and/or non-integrated sensors may be configured to capture phenomena in the facilities in order to identify aspects of the proximate environment, to facilitate any one or combination of facial recognition, optical recognition, infrared profiles, voice recognition, heat profiles, gestures, and/or the like.

The various types of sensors 130 (e.g., cameras, audio sensors/microphones, biometric sensors) may provide sensor data to the subsystem 101-2 to facilitate recognition of particular resources when the resources are in particular areas, operating particular components 106, and/or the like. Again, such sensor data may be used by the subsystem 101-2 to derive performance data. The subsystem 101-2 may analyze the sensor data to develop baseline activity profiles and then detect aberrations with respect to the baselines. Any one or a combination of the detected sensor data, sensed patterns/baselines, detected inconsistencies/nonconformities, and/or composites based thereon can be exposed via one or more client devices and/or the control interface disclosed herein. Moreover, the subsystem 101-2 may use such sensor data to provide customized training for a particular resource in accordance with embodiments disclosed herein.

In some instances, a sensor 130 may be a sensor coupled to a component 106. For example, a sensor 130 may be configured to detect whether an added weight has been placed on part of a component, whether an amount of weight has been removed, and/or whether there has otherwise been a weight change. By way of further example, bed sensors indicating that a load is being processed may be used by the subsystem 101-2, in conjunction with other sensor data, to infer an indication of specific process (e.g., which may correspond to one or a sequence of tasks) performance at a certain time with respect with specific load.

A component 106 and/or sensor 130 may be configured to transmit electronic communications to one or more other electronic devices. The electronic communications may be transmitted, for example, upon detecting a new type of signal (e.g., detecting a presence of a new device); at regular times or intervals; upon receiving a request; and/or upon detecting that a communication condition has been satisfied. The electronic communication may be transmitted to a device that may be near or remote from the component and/or sensor. The electronic communication may include (for example) sensor-collected data, inputs received at a component, an indication that an event has been detected, an indication that a communication condition has been satisfied, an identifier of the component or sensor, and/or a location of the component or sensor. The electronic communication may be transmitted, for example, over a wireless network, Wi-Fi network, short-range network, Bluetooth network, local area network, and so on.

A premises 110 may also include a monitoring device 132 that may track and collect data indicative of use characteristics of one or more components 106, which data may include sensor data from sensors 130. Such data may not only indicate use characteristics but also may be correlated to process performance in order to indicate process performance. A use characteristic may include, for example, when, how, and/or by whom a component 106 may be being used. In various instances, a monitoring device 132 may or may not be located within a unit 112 and/or premises 110. In some instances, a monitoring device 132 may be included in a resource orchestration subsystem 101-2.

A monitoring device 132 may be configured to receive input, which may indicate use characteristics (e.g., that a scheduled or unscheduled use may be beginning or has ended, a time that a use has started or completed, an entity engaged in a use, and so on). The monitoring device 132 may include or otherwise provide an interface, such as any one or a combination of the interfaces disclosed herein. Thus, for example, the interface may allow for the monitoring device 132 to receive the input indicative of use characteristics from an authorized user and/or from a component 106. In some embodiments, one or more monitoring device 132 may correspond to or be communicatively couplable to devices 108 such that interfaces provided via the devices 108 may facilitate the input.

In some instances, the monitoring device 132 may be (e.g., via a wireless or wired connection) connected to one or more components 106 and/or one or more sensors 130. Such connections may enable monitoring device 132 to estimate a usage characteristic. For example, one or more intensity values (or a processed version thereof) from a light sensor or motion sensor may be compared to a threshold, and it may be determined that a unit may be not being used if the value(s) are below a threshold. As another example, it may be estimated that a unit may be in use so long as a particular type of component may be detected as being within the unit. As yet another example, it may be estimated that a unit may be in use when signals from a badge reader indicate that a particular person remains in the unit.

The monitoring device 132 may control and update a performance data storage 134. A performance data storage 134 may include data indicative of process performance for, e.g., particular resources, particular resource-allocation systems, resource types, components, units, premises, and/or use types. Again, the data indicative of process performance may include one or combination of usage data corresponding to usage of components 106; sensor data corresponding to sensors detecting component usage, resources, resource actions, resource locations, load states and characteristics, and/or like; and/or input provided by resources via devices 108 and/or monitoring devices 132. The data may indicate day, time, use type, duration, transitions times, task descriptions, resource identifiers, load identifiers, location identifiers, and/or the like. Additional examples are disclosed further herein. A performance data storage 134 may, but need not, be part of monitoring device 132. In some instances, a performance data storage 134 may be remote from monitoring device 132, one or more units, one or more components and/or one or more premises to which it pertains. In some instances, a performance data storage 134 may be in the cloud.

The system 101-1 can include and/or be communicatively coupled to one or more resource-allocation subsystems 135. In some embodiments, a resource orchestration subsystem 101-2 may include one or more of the resource-allocation subsystems 135. In some embodiments, one or more of the resource-allocation subsystems 135 may include one or more resource controlling devices 136. A resource controlling device 136 may control and update resource allocation specifications for many different resources. The resource allocation specifications may include digital identifiers for particular resources (e.g., names, identification numbers and alphanumeric strings, usernames, user IDs, contact information, and/or the like), specifications and descriptions for attributes mapped to the resources (e.g., experience, roles of the resources, assignments of the resources, activities of the resources, task specifications for the resources, and/or the like), assignments of the resources to particular loads, timetables for the resources and corresponding load assignments, and/or the like, which may be stored in the resource allocation and programs data storage 138. The timetable or other temporal specification stored in resource allocation and programs data storage 138 may indicate that particular blocks of times have been assigned to particular resources with particular roles, load assignments, activities, tasks, etc. The resource controlling device 136 may update a resource allocation and programs data storage 138 (e.g., which may be included within and/or remote from controlling device 136) so as to reflect current resource allocation specifications.

The resource orchestration subsystem 101-2 may correspond to a number of technological improvements as disclosed herein. To facilitate the technological improvements, the resource orchestration subsystem 101-2 may communicate with one or more: components 106, client devices 108, sensors 130, monitoring devices 132 and/or controlling devices 136. The resource orchestration subsystem 101-2 may itself control and/or update a performance data storage 134 and/or resource allocation and programs data storage 138. In some instances, part or all of one or both of these data storages may mirror other corresponding data storages (e.g., located at and/or controlled by devices at one or more premises). For example, the resource orchestration subsystem 101-2 may receive periodic communications (e.g., that may, but need not, be responsive to requests for such) from one or more controlling devices 136 and/or monitoring devices 132 that identify an update of an allocation and/or program associated with a particular set of one or more resources, and/or an update of performance data associated with a particular set of one or more resources, use type, premises, and/or the like. The resource orchestration subsystem 101-2 may update a corresponding data structure in a mirrored resource allocation and/or program data structure and/or performance data structure.

In various embodiments, the resource orchestration subsystem 101-2 may include or otherwise communicate with a server or device that manages resource allocations and/or programs (e.g., by receiving communications from a plurality of controlling devices controlling individual resource allocations and/or programs and by updating an aggregated data structure to reflect current assignments, availabilities, and/or performance attributes). Such management may enable the resource orchestration subsystem 101-2 to efficiently query multiple resource allocations and/or programs and/or identify assignments, availabilities, and/or performance attributes.

FIG. 12 illustrates a diagram of aspects of the resource orchestration subsystem 101-2 according to disclosed embodiments of the present disclosure. The diagram may correspond to various portions of the architecture stack 300 with the resource orchestration subsystem 101-2 including a server system comprising one or combination of the servers disclosed above, such as those described with respect to the internal system 822. The server system may interface with the external network 820 and various components of the internal network 810. The server system may run any suitable operating system and may also run any of a variety of additional server applications and/or mid-tier applications, such that server system may include one or a combination of web servers, application servers, HTTP servers, Internet Information Services servers, FTP (file transfer protocol) servers, messaging gateways, CGI (common gateway interface) servers, email gateways, JAVA® servers, database servers, telephony gateways, and/or the like. Exemplary database servers include without limitation those available from Oracle, Microsoft, Sybase, IBM, and/or the like. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The server system may include and be configured to provide the resource orchestration subsystem 101-2. The transceiving equipment and/or the server system may be at least partially located in one or more of the one or more facilities 110 or may be located remotely from the one or more facilities 110. The transceiving equipment and/or the server system may be connected to a plurality of distribution components of the one or more facilities 110. The system 830-2 may include a plurality of various network interfaces 810A to communicate with the client devices 108, components 106, monitoring devices 132, and sensors 130. The network interfaces 810A may include one or more component interfaces 810B, client and/or monitoring device interfaces 810C, and/or sensor interfaces 810D to transmit to and/or receive communications from one or a combination of the client devices 108, components 106, monitoring devices 132, and sensors 130. In various embodiments, one or more of the interfaces may include or otherwise correspond to API interfaces to transmit to and/or receive communications from one or a combination of the client devices 108, components 106, monitoring devices 132, and sensors 130 using APIs.

The client devices 108 may correspond to one or a combination of the user devices 706-714. In various embodiments, the subsystem 101-2 may provide the applications 716-724 to the user devices 706-714, communicate with the user devices 706-714 via the applications 716-724, and/or otherwise facilitate a resource control interface via the client device interfaces 810C to expose features of the control interface to the user devices 706-714. In some embodiments, the client device interfaces 810C may include the control interfaces. In some embodiments, the control interfaces may include an API to interact with the server system. In various embodiments, the subsystem 101-2 may include, provide, and/or be configured for operation with the control interfaces, for example, by making available and/or communicating with one or more of a website, a web page, a web portal, a web application, a mobile application, enterprise software, and/or any suitable application software to facilitate the control interface. In some embodiments, the control interface may cause a web page to be displayed on a browser of a user device. The web page(s) may display output and receive input from a user (e.g., by using Web-based forms, via hyperlinks, electronic buttons, etc.). The subsystem 101-2 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the subsystem 101-2 may provide rich-client applications to a user device; and the rich-client applications may be programmed in traditional programming languages to have full access to functions of the operating system running on the user device. In some embodiments, the control interface may include or work with a mobile application.

The subsystem 101-2 may include one or more adaptive processing and control devices 1002. The one or more adaptive processing and control devices 1002 may, in some embodiments, be included in the access management engine 602. The one or more adaptive processing and control devices 1002 may include one or more aggregation and transformation engines 1004, one or more modeling engines 1006, and/or one or more adaptation engines 1008, which may be separate or integrated in various embodiments. In some embodiments, the processing and control devices 1002 may include the aggregation engine 420. In various embodiments, the adaptive processing and control devices 1002 may correspond to a single, integral engine or separate engines working in conjunction. The adaptive processing and control devices 1002 may transform, translate, or otherwise adjust data collected. In various embodiments, the adaptive processing and control devices 1002 may correspond to executable code stored in one or more memories communicatively coupled with one or more processors, such as those of the subsystem 101-2. In some embodiments, the adaptive processing and control devices 1002 may correspond to one or more servers of the server system with one or more of the servers configured to perform one or more of the orchestration features in accordance with embodiments disclosed herein.

FIG. 13 shows a functional diagram of aspects of the resource orchestration subsystem 101-2, in accordance with embodiments of the present disclosure. The subsystem 101-2 may be configured to provide a number of adaptive controls 1131 with one or a combination of the control interface, the client devices 108, the components 106, the monitoring devices 132, and/or the sensors 130 as disclosed herein. As elaborated herein, the adaptive controls 1131 may include creating and updating resource composites 1131-1, creating and updating load composites 1131-2, resource modeling 1131-3, load modeling 1131-4, deriving effectiveness data 1131-5, resource-load allocation modeling 1131-6, determining and specifying allocation configuration 1131-7, adaptive allocation 1131-8, allocation interface adaptation 1131-9, allocation-intelligent metrics 1131-10, allocation-intelligent alerting 1131-11, and/or the like.

The one or more adaptive processing devices 1002 may be communicatively coupled with interface components and communication channels (which may take various forms in various embodiments as disclosed herein) configured to receive components input 811. For example, the one or more interface components may receive a set of electronic communications via the one or more network 120 from a plurality of electronic devices. The components input 811 may include input from a plurality of different data sources. For example, the components input 811 may include endpoint input 811-1, component data 811-2, monitoring data 811-3, and/or sensor data 811-4 from one or a combination of the client devices 108, components 106, monitoring devices 132, and sensors 130. The set of electronic communications may include one or more of: signals of device interactions or data changes that correspond to process and/or process performances by process-performing resources; signals of conditions of loads; and/or signals of processes associated with the process-performing resources and the loads. The one or more adaptive processing devices 1002 may form a plurality of data composites (e.g., resource composites 1131-1 and/or load composites 1131-2) from the set of electronic communications at least in part by, for each electronic communication of the set of electronic communications, processing the electronic communication to identify one or more digital identifiers mapped to one or more of the process-performing resources and/or loads; and extracting and caching a data portion from the electronic communication. The one or more adaptive processing devices 1002 may collect the data portions and map the collected data portions to one or more resource profile records and/or one or more load profile records that are stored in one or more resource data storages 808B-1 and/or one or more load data storages 808B-4. The one or more adaptive processing devices 1002 may update the one or more resource profile records and/or one or more load profile records with the collected data portions. For each load, the one or more adaptive processing devices 1002 may use at least one of the one or more resource profile records and/or the one or more load profile records to map a subset of one or more of the process-performing resources to the particular load. Further, based at least in part on the mapping, the one or more adaptive processing devices 1002 may link content nodes in a network of content nodes where each content node of the network of content nodes comprises respective linked content. The respective linked content may include a subset of resource specifications and/or a subset of load specifications corresponding to at least one of the one or more resource profile records and/or the one or more load profile records. The one or more adaptive processing devices 1002 may allow access, by at least one of the one or more electronic devices, to a plurality of subsets of resource specifications and a plurality of subsets of load specifications of the network of content nodes via a control interface.

The technical improvements provided by the subsystem 101-2 over prior technologies include improvements in orchestration accuracy, adaptability, and control at least in part by machine-intelligent handling of input from multiple different sources, including the client interface, the client devices 108, the components 106, the monitoring devices 132, and/or the sensors 130 in order to adapt to various particular changes in the interaction system 100, as is disclosed further herein. In various embodiments, the control interface may facilitate the gathering of input from one or a combination of such devices. Advantageously, disclosed embodiments of the system 101 may provide for a multi-tier source of truth regarding resource subsystem members to facilitate resource subsystem control, including assignment of resources to loads and resource subsystems, and assignment of resource subsystems to loads. Resource specifications and metrics, load specifications and metrics, resource-load allocation specifications and metrics, and like data may be provided via the control interface by way of control signals including control instructions, alerts, notifications, reports, and/or the like as disclosed further herein. As disclosed herein, embodiments according to the present disclosure may provide technological improvements for tracking metrics of resource-control systems, including metrics pertaining to resource specifications, resource control and allocations, load specifications, subsystem specifications, resource-load couplings, and/or the like.

The system 101, which may include a process performance control system, may allow role-based access to users via the control interface with respect to such metrics and specifications with respect to various subsystems of resources, resources, and loads. The role-based access may provide visibility into the metrics of particular resources and into subsystem-level metrics of particular resource subsystems (e.g., subsets and sets of federated resources). Further, the role-based access with the control interface and a client device 108 may provide various user-selectable interface elements that allow for a user to identify resources and create or develop resource specifications, identify loads and create or develop load specifications, determine assignments of resources to particular loads, determine resource subsystems (e.g., resource subsystems) assigned to particular loads, assign resources to particular loads and modify existing assignments of resources to particular loads, build or modify resource subsystems assigned to particular loads, and/or the like. For example, resource subsystem data may be surfaced via the control interface with user-selectable interface options that enable a user having role-based access to assign resources to loads. As disclosed herein, the pool or directory of potential resource subsystem members may be smartly formed to enable more efficient assignments. The directory may, for example, be populated with just subsystem members in a particular location, those that are on standby, with an option for assigning all, and/or the like. The inputs from the control interface may be used to generate a resource subsystem directory data structure associated with a load that can be passed to and ingested by other systems.

The resource orchestration subsystem 101-2 provides a number of technological improvements disclosed herein with one or more aggregation and/or transformation engines 1004. The aggregation and transformation engine 1004 may be configured to monitor the components input 811 for any suitable aspects to facilitate improvements with individualization adaptation features disclosed herein. For example, aggregation and transformation engine 1004 may be configured to consolidate resource data 1131-1, consolidate performance data 1131-2, and consolidate load data 1131-3. The aggregation and transformation engine 1004 may gather and process components input 811 to facilitate creation, development, and/or use of resource profiles 808B-1, which may include resource specifications, performance data 808B-2, which may include pattern data, and allocation data and programs 808B-3. Further embodiments and details are disclosed in U.S. patent application Ser. No. 17/141,414, filed Jan. 5, 2021; and U.S. Provisional Application No. 62/958,794, filed Jan. 9, 2020; U.S. patent application Ser. No. 17/475,647, filed Sep. 15, 2021; U.S. patent application Ser. No. 16/849,193, filed Apr. 15, 2020; U.S. patent application Ser. No. 16/545,998, filed Aug. 20, 2019; U.S. Provisional Application No. 62/720,022, filed Aug. 20, 2018; the disclosures of each of which applications are incorporated by reference herein in their entireties for all purposes, as if fully set forth herein.

FIG. 14 illustrates a diagram that depicts a portion of the resource orchestration subsystem 101-2 including further aspects of the aggregation and transformation engine 1004 and modeling engine 1006 according to disclosed embodiments of the present disclosure. In various embodiments, the aggregation and/or transformation engines 1004 may correspond to a single, integral engine or separate engines working in conjunction. The aggregation/transformation engines 1004 may transform, translate, or otherwise adjust data collected, such as data indicative of performance metrics.

The aggregation/transformation engines 1004 may utilize any one or combination of the interfaces disclosed above as one or more content acquisition interfaces configured to allow the aggregation/transformation engines 1004 to gather data 811 from data sources corresponding to any one or combination of the sources of data indicative of performance data, resource-related data, sensor data, load-related data, location data, and/or the like disclosed herein to facilitate the load orchestration features disclosed herein. The data 811, which may include multiple data packets and/or data streams, may be received via one or more networks, such as a local area network, a Wi-Fi network, or the Internet, from multiple sources (e.g., from a single premises or multiple premises), such as a component or user device that collects at least some of the data included in each data element based at least in part on inputs detected at the component or user device, measurements made by a sensor, and/or data monitored by a monitoring device, as disclosed herein. The data 811 may correspond to electronic communications that may include one or more of: signals of device interactions or data changes that correspond to process and/or process performances by process-performing resources; signals of conditions of loads; and/or signals of processes associated with the process-performing resources and the loads. In some instances, the data may be collected immediately, or with some delay (e.g., so as to be at an end of a data-collection effort) appended to a data stream or other data packets transmitted directly or indirectly to the engines 1004. In some instances, collected data can be locally or remotely stored and subsequently retrieved (e.g., by a same or different device) to append to a stream or other data packets. A managing server may then, at a defined time or upon detecting a defined type of event (e.g., receiving a data request or detecting a threshold size of a data stream), retrieve the stored data and append the data (e.g., in raw or processed form) to a stream or other data packets. Thus, a source of a stream or other data packets may be a single component or user device or an intermediate monitoring device or system that collects data from multiple components, sensors, and/or user devices.

The engines 1004, 1006, and/or 1008 may form a plurality of data composites 1040 and/or 1045 from the electronic communications at least in part by, for each electronic communication, processing the electronic communication to identify one or more digital identifiers mapped to one or more of the process-performing resources and/or loads; and extracting and caching a data portion from the electronic communication. The engines 1004, 1006, and/or 1008 may collect the data portions and map the collected data portions to one or more resource profile records and/or one or more load profile records that are stored in one or more resource data storages 808B-1 and/or one or more load data storages 808B-4. The engines 1004, 1006, and/or 1008 may update the one or more resource profile records and/or one or more load profile records with the collected data portions. For each load, the engines 1004, 1006, and/or 1008 may use at least one of the one or more resource profile records and/or the one or more load profile records to map a subset of one or more of the process-performing resources to the particular load. Further, based at least in part on the mapping, the engines 1004, 1006, and/or 1008 link content nodes in a network of content nodes where each content node of the network of content nodes comprises respective linked content. The respective linked content may include a subset of resource specifications and/or a subset of load specifications corresponding to at least one of the one or more resource profile records and/or the one or more load profile records.

The received data 811 may include individual data elements, which may correspond to data collected with respect to one or a combination of: usage data corresponding to usage of components 106; sensor data corresponding to sensors detecting component usage, resources, resource actions, resource locations, load states and characteristics, and/or like; and/or input provided by resources via devices 108 and/or monitoring devices 132; data indicating day, time, use type, duration, transitions times, task descriptions, resource identifiers, load identifiers, location identifiers, and/or the like; requests to perform one or more processes and tasks; requests for resources to perform one or more processes and tasks; corresponding resources mapped to one or more processes and tasks; corresponding loads mapped to one or more processes and tasks; task start times; task completion times; process and process performance statuses; resource statuses, availabilities, and assignments; load statuses, conditions, locations, and resource assignments; time data corresponding to resource availabilities; location data and time data corresponding to locations of resources at particular times; location data and time data corresponding to locations of loads at particular times; time data corresponding to load availabilities and needs, load specifications, process and task specifications, and/or the like to facilitate various features of load orchestration disclosed herein. In various embodiments, the data 1004 may correspond to any one or combination of raw data, unstructured data, structured data, information, and/or content which may include media content, text, documents, files, instructions, code, executable files, images, video, audio, and/or any other suitable content suitable for embodiments of the present disclosure. In various instances, data from 10, 100, 1,000 or any number of different sources may be merged together with data generated internally, data previously received, data from third parties, etc. The aggregation/transformation engines 1004 and/or the modeling engines 1006 may identify which data and records are about the same resource, load, and/or the like, and may merge attributes from different sources into preliminary composites 1040 and particularized composites corresponding to resource profiles 808B-1 and/or performance data 808B-2 that can be used by the resource orchestration subsystem 101-2 as one or more bases for other controls 1131 features disclosed herein.

The aggregation/transformation engines 1004, the modeling engines 1006, and/or the adaptation engines 1008 may recognize identifiers of the above aspects from the data 811 by code mapping, keyword recognition, and/or another suitable method of recognition. For example, the aggregation/transformation engines 1004 and/or the modeling engines 1006 may identify keywords and/or codes as distinctive markings, collect and arrange them, and correlate them with recognition criteria (e.g., keyword criteria and/or code system) for the purposes of characterizing each set of data 811 and generating correlation results. For example, this may include recognizing trigger events disclosed herein. Such recognition processing may be performed in real time.

The recognition criteria may include keywords identified by any one or combination of words, word stems, phrase, word mappings, and/or like keyword information. The recognition criteria may include weighting assigned to words, word stems, phrase, word mappings, and/or the like. For example, a keyword may be assigned a weight according to its significance. Increased word weights may be mapped to increasing probability of criticality. The recognition criteria may correspond to one or more keyword schemas that are correlated to various criticalities. The recognition criteria may correspond to any other suitable means of linking, for example, via a code system, that may be used to associate recognized codes to specific criticalities. Thus, for example, each trigger event may be scored (e.g., with numerical expressions) according to any one or combination of the various factors disclosed herein and a weight for each trigger event may be determined as a function of a criticality score assigned to the trigger event and comparison to one or more thresholds corresponding to one or more categories of criticality (e.g., low criticality, medium criticality, high criticality, and/or the like).

The resource orchestration subsystem 101-2 may, in some embodiments, include a multi-server system that may include specialized data-pulling engines and stream processing engines (e.g., each engine being a server or processing core). According to disclosed embodiments, with data-pulling engines, at least some of the data may be actively gathered and/or pulled from one or more data sources, for example, by accessing a third-party repository and/or by "crawling" various repositories. A stream processing engine may be specialized so as to include, for example, stream processors and fast memory buses. In some embodiments, data elements of the received data 811 may be separated, for example, within a stream via a particular (or one of multiple particular) characters or strings, or data elements may begin or end with a particular (or one of multiple particular) characters or strings. In some embodiments, the one or more content acquisition interfaces may include one or more APIs that define protocols and routines for interfacing with the data sources via an API interface. The APIs may specify API calls to/from data source systems. In some embodiments, the APIs may include a plug-in to integrate with an application of a data source system. The one or more data acquisition interfaces, in some embodiments, could use a number of API translation profiles configured to allow interface with the one or more additional applications of the data sources to access data (e.g., a database or other data storage) of the data sources. The API translation profiles may translate the protocols and routines of the data source system to integrate at least temporarily with the system and allow communication with the system by way of API calls.

In some embodiments, the data 811 acquired may be in different formats, according to different data standards, in different document structures, including different types of data, etc. The data 1004 can then be transformed, translated, or otherwise adjusted by the engines 1004. For example, acquired data may be converted from a first format to a second format using one or more conversion rules, which may be user-defined, heuristic, and/or machine-learned. In some embodiments, the engines 1004 may perform similar operations with respect to other data generated by elements of the architecture. In some embodiments, the aggregation and/or transformation engines 1004 may correspond at least in part to one or more of transformative integration engine 108, control engine 106, aggregation engine 218, 420, third-party aggregation engine 422, and/or interoperability engine 502.

In some embodiments, the aggregation and/or transformation engines 1004 may include one or more transformative adaptors 1032. In some embodiments, one or more transformative adaptors 1032 may be associated with the content acquisition interfaces to effect the transformations. The transformative adaptors 1032 may be implemented, in various embodiments, in hardware and/or software. In some embodiments, a transformative adaptor 1032 may include a hardware device and/or software component that transforms, translates, converts, or otherwise adjusts the acquired data 811. In some embodiments, the one or more transformative adaptors 1032 may correspond at least in part to one or more of adaptors 424, 426, 428.

In some embodiments, various processors and/or layers within the resource orchestration subsystem 101-2 may can be specialized to perform various types of processes. For example, a first set of processors may be configured to transform the data 811 within a stream in real-time (e.g., to produce data in a standard format and/or one that corresponds to an alert, notification, and/or report protocol) and detect (e.g., based at least in part on data included in a header of a data element) whether the transformed data includes one or more particular types of data. In various embodiments, the first set of processors may utilize the transformative adaptors 1032 to effect the transformation and/or may further transform the data beyond first-stage transformations by the transformative adaptors 1032.

The aggregation/transformation engines 1004 may process manifold data sets that may, for instance, come from different sources or the same source, for example, by way of one or more updates to data previously provided by a particular source, and the consolidator 1035 may consolidate the data sets to form a preliminary composite 1040. This may include applying one or more filtering techniques (or one or more filters) to the data sets, organizing, categorizing, qualifying, and/or comparing the sets of information; detecting, identifying, and/or handling errors/mismatches; identifying redundancies; removing redundancies; discarding data irrelevant to composite package building for particular resources, loads, and operations corresponding to resource profiles 808B-1, performance data 808B-2, and/or allocation data and programs 808B-3; and/or otherwise processing the data sets. The consolidator 1035 may determine whether each element includes a data pattern that may be consistent with one or more defined protocols. Such a protocol may define a data pattern as one that includes, for example, one or more particular data elements and/or types of data elements. The consolidator 1035 may identify one or more applicable protocols (e.g., based at least in part on source identifier, metadata, a current time, a stream identifier, etc.).

The aggregation and transformation engine 1004 and/or the modeling engine 1006 may include a reasoning module to make logical inferences from a set of the detected and differentiated data to infer one or more patterns corresponding to the resource profiles 808B-1, performance data 808B-2, and/or allocation data and programs 808B-3. For instance, the pattern data may include information about any one or combination of identification histories, action and performance histories, location histories, allocation histories, and/or the like, any set of which may be used to derive one or more patterns of performance data for particular resources and sets of resources. Performance metrics may include process metrics, operational efficiency metrics, overtime metrics, location infection metrics, and/or the like, rates of changes in performance metrics, rankings of resources and resources sets, and/or the like. The system 101 may track and model resource process performance as process tasks are completed to facilitate feedback loop features and employ an ongoing learning mode to confirm, correct, and/or refine determinations made regarding resource profiles 808B-1, performance data 808B-2, and/or allocation data and programs 808B-3. As disclosed herein, the system 101 may use the performance metrics in allocating resources. With ongoing monitoring and learning, the system 101 may gather additional performance data 808B-2 particular to the resources allocated and continue to update and adjust the resource profiles 808B-1, performance data 808B-2, and/or allocation data and programs 808B-3 on a continual basis, heuristically adapting the determinations with the feedback to, over time, learn to make the determinations more effectively.

A pattern-based reasoner may be employed to use various statistical techniques in analyzing the data, both current and historical, in order to infer particularized pattern data from the data 811 and preliminary composites 1040. A transitive reasoner may be employed to infer relationships from a set of relationships to form the performance data. In various embodiments, the system automatically establishes and develops the particularized pattern data. In some embodiments, the modeling engine 1006 may be configured to employ deep learning to process the data 827A and derive the particularized pattern data corresponding to the resource profiles 808B-1, performance data 808B-2, and/or allocation data and programs 808B-3. Accordingly, the modeling engine 1006 may facilitate machine learning or, more specifically, deep learning, to facilitate creation, development, and/or use of particularized pattern data that may include performance metrics.

The consolidation and/or modeling may be performed upon detection of one or more events, which may correspond to detection of one or more particular data elements 811, one or more device interaction, and/or data changes that correspond to a defined event. For example, the data 811 may indicate that one or more process tasks are completed by one or more resources. The aggregation/transformation engine 1004 may process the data 811 for consolidation as process tasks are completed by one or more resources, and the modeling engine 1006 may model resource process performance as process tasks are completed by one or more resources. Consequent to the aggregation and transformation engine 1004 collecting, consolidating, and transforming the data 1004 as disclosed herein, the modeling engine 1006 may model the corresponding performance data with respect to the particular resource and/or set of resources to which the one or more process tasks pertain.

One or more first-stage processors of the engines 1004, which may correspond to the consolidator 1035, may form one or more preliminary composites 1040 from unified, deduped, and organized data. The one or more first-stage processors may transmit the one or more preliminary composites 1040 (or replicated versions thereof) to one or more second-stage processors, which may correspond to the modeling engine(s) 1006. The modeling engine 1006 may include or otherwise correspond to a learning engine that may employ an ongoing learning mode to create, confirm, correct, and/or refine resource profiles 808B-1 and/or performance data 808B-2. The modeling engine 1006 may be an analysis and matching engine that employs machine learning to process the components input 811 (e.g., endpoint input 811-1, component data 811-2, monitoring data 811-3, and/or sensor data 811-4) and derive the particularized resource profiles 808B-1 and/or performance data 808B-2. The modeling engine 1006 may be configured to perform any one or combination of features directed to matching or otherwise correlating endpoint input 811-1, component data 811-2, monitoring data 811-3, and/or sensor data 811-4.

For example, the modeling engine(s) 1006 may be configured as a composite builder that may build particularized composite packages corresponding to resource profiles 808B-1, performance data 808B-2, allocation data and programs 808B-3, and/or load profiles 808B-4. Further, in some embodiments, the modeling engine 1006 may include a classification engine and a matching engine configured to facilitate classifying and matching features disclosed herein. The modeling engine 1006 may be configured to perform extraction, apply a rule to process the extracted data element, request, and/or retrieve supplemental data from a remote data source, and/or develop composite packages corresponding to resource profiles 808B-1, performance data 808B-2, allocation data and programs 808B-3, and/or load profiles 808B-4. with the supplemental data. For example, the modeling engine 1006 may compare detected, aggregated, unified, deduped, and organized, and differentiated process performance data (which may include, for example, time-stamped recorded data stored by the subsystem 101-2) with load record data.

The modeling engine 1006 may pull from the data storages stored resource profiles 808B-1, performance data 808B-2, allocation data and programs 808B-3, and/or load profiles 808B-4, previously created, to update the stored profiles based at least in part on data 1004 newly received and processed. The modeling engine 1006 may pull from the data storages (e.g., 226, 508) data pertinent to the resource profiles 808B-1, performance data 808B-2, and/or allocation data and programs 808B-3 to incorporate data 1004 newly received and processed in order to create and/or update the resource profiles 808B-1, performance data 808B-2, allocation data and programs 808B-3, and/or load profiles 808B-4. The modeling engine 1006 may update one or more of the manifold composites, and, hence, the composite packages corresponding to resource profiles 808B-1, performance data 808B-2, allocation data and programs 808B-3, and/or load profiles 808B-4, in real time, periodically, or when triggered by certain events with respect to the particular resources.

The modeling engine 1006 may transform the preliminary composites 1040 into translated data, information, and/or content so that the resource profiles 808B-1, performance data 808B-2, allocation data and programs 808B-3, and/or load profiles 808B-4 contain the transformed data for surfacing to one or more end users via one or more client devices 108 (e.g., administratory users via administratory devices) via the control interface. The modeling engine 1006 and/or the adaptation engine 1008 may identify rules for alerts, notifications, and/or reports. The various rules may include one or more general conditions, such as ones that specify for which resource, type of resource, type of load, time periods, premises, locations, data sources, and/or client devices for which the rules are to apply. The various rules may include a flag definition that may specify what types of data indicate that information corresponding to a data element is to be reported. For example, a flag definition may include an identification of each of one or more composites and/or one or more values associated with each of the one or more composites. The one or more values may include, for example, a numeric, textual or categorical value. The one or more values may include a threshold and/or define a bound for a closed or open range. Thus, for example, a corresponding value included in a data element may be determined to be consistent with the one or more values if it may be within a range (or outside the range—depending on how the protocol may be defined) or exceeds the threshold in a particular direction (e.g., may be above or may be below the threshold). As another example, a corresponding value included in a data element may be determined to be consistent with the one or more values if it may be the same as one (or all) of the one or more values. Further embodiments and details are disclosed in U.S. patent application Ser. No. 17/159,700, filed Jan. 27, 2021; U.S. Provisional Application No. 62/966,727, filed Jan. 28, 2020.

U.S. patent application Ser. No. 17/683,496, filed Mar. 1, 2022; U.S. Provisional Application No. 63/157,555, filed Mar. 5, 2021; U.S. patent application Ser. No. 16/564,767, filed Sep. 9, 2019; U.S. Provisional Application No. 62/729, 242, filed Sep. 10, 2018; U.S. patent application Ser. No. 15/652,494, filed Jul. 18, 2017; U.S. Provisional Application No. 62/363,615, filed Jul. 18, 2016; U.S. patent application Ser. No. 16/883,858, filed May 26, 2020; U.S. Provisional Application No. 62/853,500, filed May 28, 2019; Ser. No. 17/178,995, filed Feb. 18, 2021; U.S. Provisional Application No. 62/978,155, filed Feb. 18, 2020; U.S. patent application Ser. No. 17/137,055, filed Dec. 29, 2020; and U.S. Provisional Application No. 62/955,146, filed Dec. 30, 2019; the disclosures of each of which applications are incorporated by reference herein in their entireties for all purposes, as if fully set forth herein.

As disclosed herein, the adaptive controls 1131 may include creating and updating resource composites 1131-1 and creating load composites 1131-2, deriving load metrics 1131-3, and updating load composites 1131-2 with the load metrics. FIG. 15 illustrates a diagram that depicts a portion of the resource orchestration subsystem 101-2 including further aspects of composite 1045 generation according to disclosed embodiments of the present disclosure. The composites 1045 may include or otherwise facilitate one or a combination of mapping of resources to locations, mapping of resources to loads, loads to locations, correlating performance and resources, correlating load metrics to resources, and/or the like. The composites 1045 may include, for example, one or a combination of process specifications 1045($a$), resource specifications 1045($b$), load specifications 1045($c$), time specifications 1045($d$), and/or performance specifications 1045($e$). The process specifications 1045($a$) may include process definitions and/or the like. The process specifications 1045($a$) may specify one or more role-based tasks for performance in accordance with the protocol. The resource specifications 1045($b$) may specify one or more particular resources, particular resource types/roles designations, experience metrics, training attributes, resource locations, current allocation designations, historical allocation designations, and/or the like (e.g., using digital identifiers, descriptors, etc.). The load specifications 1045($c$) may specify one or more particular loads, particular load types, load conditions and metrics, load locations, and/or the like (e.g., using digital identifiers, descriptors, etc.) to which the one or more particular resources and one or more particular resource types may be allocated in accordance with the protocol. The time specifications 1045($d$) may include temporal specifications for the program(s) and/or allocation(s) of the particular resource, and may include one or more of indications of times (e.g., start times, end times, durations, recurrence, etc.) governing allocation of the one or more resources and/or resource types to the one or more particular loads and/or particular load types, times of availability, times mapped to particular aspects of resource specifications 1045($b$), times mapped to particular aspects of load specifications 1045($c$), and/or the like. The performance specifications 1045($e$) may specify performance metrics of the resources, for example, with respect to programs, current, past, and target times, frequencies, orders, efficiencies, and/or the like.

As the adaptation engine 1008 creates and/or otherwise develops one or more composites 1045, the adaptation engine 1008 may update the resource profiles 808B-1, performance data 808B-2, allocation data and programs 808B-3, and/or load profiles 808B-4 so as to reflect current allocation specifications, programs, assignments, availabilities, performance attributes and metrics, and/or the like. Accordingly, the adaptation engine 1008 may correspond to a server or other processing device that manages resource profile and performance data, allocations, programs, and/or the like. The adaptation engine 1008 may do so at least in part by receiving communications from a plurality of controlling devices 136 controlling individual resource allocations and/or programs. Such management may enable the resource orchestration subsystem 101-2 to efficiently query, identify, instruct, and guide multiple resources regarding allocations, programs, assignments, availabilities, performance attributes, and/or the like. Accordingly, the resource orchestration subsystem 101-2 may generate programs in real-time or near real-time, significant faster than may be conventionally done.

The system 101 may track and model resource allocations, as allocations are completed, and network node transitions as the transitions occur. As part of such tracking and modeling, the system 101 may correlate detected, aggregated, unified, deduped, and organized, and differentiated effectiveness data (which may include, for example, time-stamped recorded data stored by the application) with load record data and may include guided decision support for defining effective allocations for like resource sets. Disclosed embodiments may further provide for effectiveness analytics and resource control. The system 101 may analyze the effectiveness metrics, load metrics, and resource profiles in view of the node network 1400. The machine learning may recognize and adapt to evolving standards of effectiveness for various nodes 1445 and identify the effectiveness metrics needed for each node 1445. A resource's profile, including effectiveness profile, may be compared to those of other resources in similar nodes/roles. Deficiencies, solutions, proficiencies, and next progressions can be identified for each resource for each node 1445 (i.e., the resource's current node 1445 and other nodes 1445 along a prospective path) and can be reported to the resource with resource control specifications for an program including next steps.

Such features may facilitate construction by the resource orchestration subsystem 101 of a node network 1400, development of the node network 1400, and surfacing aspects of the node network 1400 for user access via the control interface. The system 101 may create graphical representations formatted to represent at least portions of the node network 1400. The system 101 may communicate visualization data corresponding to the graphical representations client devices to facilitate the control interface. The control interface may include one or more interface elements that are user-selectable to allow the access to subsets of resource specifications and subsets of load specifications of the node network 1400. The access may correspond to read access, write access (e.g., changing resource and/or load specifications), and/or other control access (e.g., instructing resources and subsystem to process loads, perform particular processes and action plans with respect to loads and/or the like disclosed herein) to portions of the node network 1400, depending on access specifications of the resource user.

By way of example, FIG. 16 illustrates a node network 1400, in accordance with disclosed embodiments of the present disclosure. Disclosed embodiments of the system 101 may implement adaptive creation and progression of a network of nodes 1400 corresponding to the interaction system 100 with a number of customization and progression features disclosed herein. In various embodiments, each network node 1445 may correspond to one or a combination of one or more resources and/or loads, and corresponding resource assignments, roles, titles, positions, units, locations, facilities, resource/load metrics, and/or the like. By way of example, FIG. 16 illustrates a number of network nodes 1445 of one type that are resource nodes 1445-2, 1445-3, 1445-4, 1445-10, 1445-11, 1445-12, 1445-13 that may correspond to particular resources; and a number of network nodes 1445 of another type that are load nodes 1445-5, 1445-6, 1445-7, 1445-8, 1445-9, 1445-14, 1445-15 that may correspond to particular loads. Disclosed embodiments may provide for learning, modeling, and matching resource nodes 1445 and corresponding resources to load nodes 1145 and corresponding loads in the interaction system 100.

The system 101 may facilitate accurate identification, consolidation, and translation from different standards of resource data and specifications from many different sources and standards to map resources across subsystems, floors, facilities, classes, attribute descriptors, role descriptors, task descriptors. The system 101 may harvest data 811 to derive and develop signals of node specifications from many different sites, to learn the different nodes 1445 and corresponding specifications and how to match at least some of the different node specifications to one or more network nodes 1445, consolidate the node specifications, and use the unified, deduped, and organized node specifications to create, augment, and/or evolve the network node specifications linked to each network node 1445. Disclosed embodiments of the system 101 may adaptively map the different positions, roles, specialties, etc. to nodes 1445 of the network 1400 in order to facilitate other features of the platform. The mapping may include harvesting and cleaning up data from data feeds from multiple sources, matching and consolidating the data to network nodes 1445, augmenting the data with other types of data to facilitate other features disclosed herein, and evolving the data nodes 1445 over time to adapt to real-world changes. The mapping may provide for normalization and standardized criteria to differentiate titles, roles, specialties, locations, and/or the like. Thus, although some substantially similar or equivalent jobs and roles may differ in titles and descriptions, the system 101 may match the jobs and roles and link the jobs and roles to common nodes 1445 based at least in part on detecting commonalities in one or a combination of roles, allocations, tasks, skills, specialties, positions, and/or the like. The system 101 may harvest and clean up data from data feeds from the multiple sources and consolidate the data in order to learn and model resources, loads, and resource-load pairings. The modeling may include developing resource profiles 808B-1 that include chronicles of individual histories, characterizations and classifications, and resource metrics.

Disclosed embodiments may further provide for resource performance and development tracking and modeling. For example, the system 101 may track components input 811 in order to track resource performance of tasks that bear on resource effectiveness. The system 101 may track process performance from resource self-reporting input and by gathering usage data regarding usage of equipment, sensor data regarding equipment usage and resource locations, load record data, auto-tracking of education/training, etc. The system 101 may be integrated with certifying bodies and receive updates regarding training, and education. Likewise, the system 101 may also track load metrics for comparison. All this data may be collected, aggregated, unified, deduped, and organized, transformed, and/or modeled by the system 101 in order to identify meaningful patterns and relationships of resource tasks, resource performance, load conditions, and the like.

Tagging schema may be employed to facilitate the learning and modeling. As part of learning and modeling individual resources, the system 101 may map each resource to a particular node in the network as a basis for providing other features. The system 101 may include feedback loops to allow for correction by each individual resource and/or others in an administrative role, and, based on the feedback, the learning algorithms may adapt and improve over time.

The node network 1400 may include a plurality of composites 1045 corresponding to nodes 1445 of the node network 1400, with one or more composites 1045 corresponding to each node 1445. In various embodiments, the composites 1045 may include content object aggregations and node specifications (e.g., resource specifications and metrics, load specifications and metrics, resource-load allocation specifications and metrics, and/or the like). The content aggregation may include a grouping of content including one or more presentation portions that can be provided to a user, e.g., via the control interface. The content aggregation may include linked and/or unified, deduped, and organized data from a plurality of data sources, which data may be used for analysis and other features disclosed herein. As disclosed herein, in order to link the data, data elements of a data record may be examined for characteristics that may be shared with data elements of other data records.

Each the composites 1045 may correspond to a containerized data structure that may be stored in the data storage system 808B and that containerizes the content object aggregations and node specifications with a data structure that can be passed to and ingested by other systems and components. Composites 1045 may be linked to other composites by way of one or a combination of specifications of addressing, links (which may include hyperlinks), and/or pointers or other references. For example, a particular composite 1045 for a particular load may contain specifications, links, and/or pointers or other references, which may be in an array or index, to one or more particular resources, one or more composites 1045 corresponding to the one or more particular resources, and/or one or more resource nodes 1445 corresponding to the one or more particular resources. Accordingly, transmitting the particular composite 1045 to one or more other systems, apps, etc. may effectively pass load specifications and a directory for a resource subsystem associated with that load.

Similarly, a particular composite 1045 for a particular resource may contain specifications, links, and/or pointers or other references to one or more particular loads, one or more composites 1045 corresponding to the one or more particular loads, and/or one or more load nodes 1445 corresponding to the one or more particular loads. Additionally, the particular composite 1045 for the particular resource may contain specifications, links, and/or pointers or other references, which may be in an array or index, to one or more other particular resources, one or more composites 1045 corresponding to the one or more other particular resources, and/or one or more load nodes 1445 corresponding to the one or more other particular resources. Such other particular resources may correspond to others on one or more resource subsystems of which the particular resource is a part.

The adaptation engine 1008 may include or otherwise be configured to provide a notification engine that modifies and transmits composites 1045 at least partially as a function of detected trigger events. Various sets of rules 808B-5 may provide for various types of specifications and/or restrictions on modifying and/or provisioning content composites 1045 that may be at least partially a function of trigger event criteria, resource specifications, and load specifications. Transmitting the particular composite 1045 to one or more other systems, apps, etc. may effectively pass resource specifications and a directory for all load allocations (e.g., load identifiers, etc.), all roles, all resource subsystems, and/or the like associated with that particular resource. However, role-based access to such information may be restricted in accordance with embodiments disclosed herein such that a user of the control interface may not have full access. In such cases, the system 101 may filter the particular composite 1045 to create a filtered composite 1045 that only contains information for which the user has a read access. Then, the filtered composite 1045 may transmitted to provide only the read-accessible information accorded to the user and the user role.

In some embodiments, the composites 1045 may be arranged and linked according to a hierarchical tree network. For example, composites 1045 mapped to a particular set of one or more facilities, floors, units, sections, wards, etc. may be arranged and linked according to a hierarchical tree network. In some embodiments, the load nodes 1445 may correspond to leaf nodes of the hierarchical tree network, and the resource nodes 1445 may correspond to non-leaf nodes of the hierarchical tree network.

Content objects having data elements with similar or shared characteristics may be stored in one or more composite data structures and linked together in the network of nodes 1400. For example, clusters of resource nodes 1445 may be linked to particular load nodes. A cluster of nodes 1445 linked to a particular load node 1445 may correspond to a resource subsystem assigned to a particular load. The composites 1045 for the cluster may contain specifications, links, and/or pointers or other references, which may be in an array or index, to the particular load and/or the composite 1045 corresponding to the particular load. Additionally or alternatively, the cluster of nodes 1445 may include the load node 1445 for the particular load. Accordingly, transmitting the cluster of composites 1045 to one or more other systems, apps, etc. may effectively pass resource specifications, load specifications, and a directory for load allocations (e.g., load identifiers, facility identifiers, floor identifiers, room identifiers, etc.), roles, and/or the like associated with that particular resource subsystem.

In various embodiments, the node network 1400, one or more of the nodes 1445, and/or one or more of the linked composites 1045 may be exposed via the control interface to users as the network of nodes 1400 for access/use by the users. The nodes 1445 may be accessible in different forms. For example, the network 1400 could be presented in graphical form, using user-selectable interface options. The control interface may include any text, image, and/or device that can be displayed on a display screen for providing information to a user and/or for receiving user input, and may include one or more widgets, windows, dashboards, text, text boxes, text fields, tables, grids, hyperlinks, buttons, lists, combo boxes, checkboxes, radio buttons, and/or the like. The selectable interface options, such as hyperlinks, may be provided at each illustrated node 1445 in order to access the underlying options, content, and data of the composite 1045 at that node 1445. Such access may include options to specify and modify assignments of resources and corresponding resource nodes to load and corresponding load nodes. Further embodiments and details are disclosed in U.S. patent application Ser. No. 17/523,190, filed Nov. 10, 2021; and U.S. Provisional Application No. 63/113,025, filed Nov. 12, 2020; U.S. patent application Ser. No. 17/194, 138, filed Mar. 5, 2021; and U.S. Provisional Application No. 62/985,497, filed Mar. 5, 2020; the disclosures of each of which applications are incorporated by reference herein in their entireties for all purposes, as if fully set forth herein.

Accordingly, FIG. 16 may correspond to one possible exemplary interface that may be used as part of the control interface, in accordance with embodiments of the present disclosure. The interface may be used in presenting resource, load, and resource-load allocation visualizations. The depicted example interface 1400 may be merely one example of the control interface out of many possible examples according to disclosed embodiments. With the control interface, user-selectable interface options may be presented to select particular sets of one or more resources (e.g., units, resource subsystems, etc.) for visualizations with respect to those selected sets of one or more resources. Further, user-selectable options may be presented to allow for drill-down to more specific specifications and metrics. With the control interface, user-selectable interface options may be presented to allow for control of resources, to instruct and cause particular resources to perform processes (e.g., one or a series of tasks) with respect to particular loads in accordance with one or a combination of the control features disclosed herein.

The control interface corresponding to the node network 1400 may allow user selection of interface elements corresponding to nodes 1445. By way of example, a resource user may select a resource node 1445-2, and the control interface may consequently transition to present an adapted interface with content presented from the composite 1045-2 corresponding to the resource node 1445-2 adapted to the resource specifications of the resource user. In some instances, such a transition may include filtering operations to isolate assignments of the particular resource corresponding to the resource node 1445-2 selected. Filtering operations may be executed with such transitions or may be executed pursuant to user selection of one or more interface elements of the control interface. In similar manner, selectable filtering operations may be executed to isolate resource subsystem members in a particular location, those that are currently available for processing loads, etc.

The control interface may visually represent aspects of the node network 1400, such as resource specifications and metrics, load specifications and metrics, resource-load allocation specifications and metrics, and/or the like. For example, the control interface may provide user-selectable interface options corresponding to current assignments to loads on location-by-location bases, which may be depicted in list views as depicted and in map views. As disclosed further herein, the system 101 may perform load location mapping to locations to develop the corresponding load specifications with the location specifications. Such load specifications may be used by the system 101 to facilitate the development of the node network 1400 and the visualizations presented with the control interfaces. By way of further example, the interface 1500 may provide user-selectable drill-down interface options for read access, write access, and modify access to: load specifications, including load-to-location assignments, for the particular loads, and locations represented; and resource specifications, including resource-to-load assignments, resource process instructions with respect to the particular load, for the particular resources represented. Additionally, disclosed embodiments may provide for other features with respect to current, past, and future states of the node network 1400. For example, with respect to current and future states of the node network 1400, user-selectable options may be presented to allow for drill-down to more specific resource and load specifications and metrics. By way of example, the interface 1400 may allow for visualizations of pattern data about any one or combination of identification histories, action and performance histories, location histories, allocation histories, and/ or the like. Further, the interface 1400 may allow for visualizations of one or more patterns of performance data for particular resources and sets of resources (e.g., units) that may be derived by the tracking and modeling disclosed herein.

In various embodiments, exemplary interfaces used as part of the control interface may include a mobile device interface and/or a full interface configured for other computing devices (e.g., laptop computers, desktop computers, and/or the like). In various embodiments, the interfaces may be automatically adaptable to various resources having various roles and needs, which, in turn, may require different features. The system 101 may automatically adapt the control interface as a function of one or more resource specifications mapped to a user. The adapting may be performed at least in part by authenticating the user of a client device, identifying and mapping the one or more resource specifications to the user, and creating the graphical representation and the visualization data as a function of the one or more resource specifications mapped to the user. The adaptation of the interfaces may be a function of the role of the particular resource after login and authentication of the particular resource. For example, with some lower-level roles, the interfaces may provide visibility into information pertaining to the assignment of the resource, while not providing visibility into assignments of other resources and while not providing control features to instruct another resource to perform processes. With some roles, the interfaces may provide resources with visibility into allocations for entire resource subsystems, while either providing control features to instruct another resource to perform processes or not providing such features, notification of control features being a function of the specifications of the particular resource use. Accordingly, in addition to the visibility adaptations, the interface adaptations may include adapting the user-selectable interface options presented to a particular user that allow for control of resources, to instruct and cause particular resources to perform processes (e.g., one or a series of tasks) with respect to particular loads in accordance with one or a combination of the control features disclosed herein. The read, accept/reject, and/or modification access may be restricted as a function of the role-based access, with different roles have different access specifications. For example, an administratory role may have read, accept/ reject, and/or modification access, whereas the resource may only have accept/reject access, and others in an affected subsystem may only have read access. Some roles may be provided with abilities to self-assign, accept, reject, or modify assignments on the fly. Accordingly, the extent of exposure to the network of resources and the abilities to make changes with regard to allocations may be a function of the role of the resource, and the interface may graphically and functionally adapt to the resource to only present that which is needed by the resource.

The interface adaptations, such as the visibility adaptations, may include providing summaries of content from the node network 1400 as a function of the resource specifications of the particular resource user. For example, a summary of network node content may be provided by way of the adaptive control interface. The summary of network node content may correspond to summary information from load specifications selected by and/or assigned to the resource user. The summary could correspond to a synopsis of load specifications (e.g., load metric values) for the particular load corresponding to the network node. As disclosed above, the adaptive system 101 may qualify load specifications according to a gradated scale, qualify load specifications according to a category scheme, score load specifications according to a load specifications scoring scheme, and/or the like in order to identify indicators of load conditions. The load specifications detection operations may identify potential conditions corresponding to trigger events that trigger execution of one or more particular adaptive controls 1131. The synopsis may include indicators/descriptions of such conditions. For example, the synopsis may include recent load metric values (e.g., load vitals, current contraction intensities, metric values of previous load metric values, such as indicators of averages, standard deviations, maximum levels, minimum levels, and so forth of previous contraction intensities, etc.) metric values generated by particular load monitoring devices currently monitoring the load. Such load metric values may be selected by the adaptive system 101 based at least in part on application of a time filter (e.g., since the resource's last control interface access and/or metric viewing). In some embodiments, the synopsis may include one or more user-selectable options for each type of load-coupled device that was used to gather load-coupled device data for the load. For example, along with the synopsis, a user-selectable option to link and transition to a full chart, table, file, etc. of data for the load metric values may be provided so that the resource may inspect the full data set.

The synopsis of node content may also include one or more indications of one or more system-identified processes particularized to the resource. As disclosed herein, the adaptive system 101 may map a condition of a particular load to a particular process to be performed for the load having that condition and may further map the particular process to a particular resource to perform the particular process with respect to the particular load. Upon one or more selections of interface options corresponding to the node, an abbreviated indication of the resource's need to perform one or more process steps may be presented along with one or more various interactive elements of the particular process steps. The abbreviated indication may also indicate a process status with any suitable indicator of the resource process progress, such as not started, in progress, next step of process to be completed, etc. The abbreviated indication may also be provided with a user-selectable option that links to a full presentation of one or more interface elements of the corresponding process so that the resource may launch the process and proceed through the process instructions. In various embodiments, the node content provided by way of the control interface may be adapted for presentation to the resource in various ways. The control interface could visually change the summary of node content and/or relatively heavily weighted items flagged for the particular user's attention to add emphasis by way of content and window positioning, modal windows, graphical characteristics, and the like. For example, the adaptive control interface could visually change to emphasize processes and steps specified for the resource user by way of content and window positioning, modal windows, graphical characteristics, and the like that need to be performed (e.g., with respect to a series of tasks corresponding to the process for, say, discharge preparation). For further example, as part of hierarchically scaled notification features, the synopsis, indicators/descriptions of detected conditions, and/or tasks that the resource needs to complete may be presented with a modal window such that the resource must click through the modal window in order to access other aspects of the control interface.

As disclosed herein, the adaptive controls 1131 may include inter-node analytics 1131-4 of the resource-load allocations. The system 101 may perform inter-node analytics and intra-node analytics based on analysis of millions of resource-load allocations and attributes thereof. With the system 101 having gathered and used information about resource subsystem assignments to determine allocations to loads, efficiencies, which types of loads the resource subsystem members are processing, and other such analytics, the modeling engine 1006 may use resource subsystem information and load outcome information to recognize and learn patterns to identify effective pairings of resource subsystem members and loads, which pairings may be qualified with effectiveness metrics such as an effectiveness score. The identification of effective pairings of resource subsystem members and loads may be on a micro-level and on a macro-level. With respect to the micro-level, the modeling engine 1006 may determine whether a resource having certain attributes was a good pairing for a load that had a particular condition, outcome, etc. As disclosed herein, such resource attributes may correspond to resource specifications 1045(*b*) of resource titles, resource roles, training attributes, resource locations, current allocation designations, historical allocation designations, experience metrics, assignments of the resources, activities of resources, task specifications for the resources, resource profiles, specialties, locations, and/or the like.

The modeling engine 1006 may correlate resource specifications 1045(*b*) and performance specifications 1045(*e*) of the particular resource with load specifications 1045(*c*) of the particular load to which the resource has been allocated, along with the corresponding process specifications 1045(*a*) and time specifications 1045(*d*) for the allocation. Having correlated such specifications of the particular load to the specifications of the particular resource, the modeling engine 1006 may identify data points that the modeling engine 1006 may take as signals of how effective the pairing was.

The modeling engine 1006 may score one or more of the factors of the particular load according to a gradated scale, for example, with a numerical expression. The scale may include a range of scores from −1000, −10, or 0 to 10, 100, or 1,000, with the high end of the scale indicating more positivity. By way of example, a positive load outcome may be assigned a higher score than a negative load outcome. A positive load event (e.g., transition from high priority processing to a lower level of processing, discharge, and/or the like) may be assigned a higher score than a negative load event (e.g., development of an error, destabilization of metrics to elevated levels, transition to high priority processing from a lower level of processing, and/or the like). A shorter length of load processing may be assigned a higher score than a longer length of load processing. The modeling engine 1006 may consolidate individual scores of the individual factors to yield an effectiveness score that may indicate the effectiveness of the pairing.

The modeling engine 1006 may accumulate such metrics for the particular resource with respect to all the loads to which the resource has processed over time. Accordingly, the modeling engine 1006 may collect and arrange overall resource metrics for the particular resource. By way of example, the overall metrics may indicate an overall effectiveness of the resource and effectiveness of the resource as a function of time. Flags, notifications, and the like corresponding to resource may be based on the metrics and could be generated for surfacing to the control interface contingent on one or more thresholds. For example, a minimum threshold could be employed, where a score not meeting the minimum threshold could result in flag or other notification regarding the condition.

As disclosed herein, the adaptive controls 1131 may include resource-load allocation modeling 1131-5. Having correlated the specifications of the particular resource to the specifications of loads, the modeling engine 1006 may identify patterns of determined performance metrics of the particular resource with the pattern recognition of performance metrics mapped to loads having common specifications and attributes. For instance, the modeling engine 1006 may identify the resource's more effective and less effective resource-load pairings patterns, where the resource, having certain specifications and attributes as a function of time (e.g., particular resource types/roles designations, experience metrics, training attributes, resource locations, and/or the like), was allocated to loads having specifications and attributes in common (e.g., conditions, criticalities of conditions, types of procedures administered, operation-performing equipment used with the load, and/or the like) that had relatively better or worse load metrics. Accordingly, the modeling engine 1006 may identify patterns where the resource was more or less effective with certain types of loads (i.e., loads having common specifications and attributes). For example, the modeling engine 1006 may recognize from the patterns that the resource is more effective (e.g., having higher effectiveness scores relative to the resource's other effectiveness scores and/or relative to other resources' effectiveness scores) with loads' having a certain condition, a certain criticality of condition (e.g., relatively more severe), a certain biometrics, where the resource administered a certain treatment, and used or discontinued use of particular operation-performing device. Further, the modeling engine 1006 may determine the states of the resource's specifications and attributes as a function of time, correlated to the pattern of effectiveness for that load type. For example, the modeling engine 1006 may recognize an upward trend of the resource's effectiveness after the resource acquiring a certain training attribute, the resource accumulating a certain experience metric (e.g., having accumulated a threshold time value in a particular role), having been assigned to a particular role, when the resource has another resource or type of resource likewise assigned to the load, and/or the like.

With respect to the macro-level, having correlated specifications of a plurality of resources to specifications of a plurality of loads, the modeling engine 1006 may identify patterns of determined performance metrics of the plurality of resources with the pattern recognition of performance metrics mapped to a plurality of loads having common specifications and attributes. From a macro perspective, the modeling engine 1006 may identify the more effective and less effective resource-load pairings patterns for the plurality of resources. Such patterns may be identified for particular sets of resources (e.g., units, etc.). The modeling engine 1006 may recognize patterns of relatively better or worse load metrics mapped to particular sets of resources and specifications of those resources. To identify effective resource-load pairings patterns, the modeling engine 1006 may rank all or a subset of the historical resource-load pairings according to load metrics (e.g., outcomes, more recoveries, fewer adverse events, shorter lengths of processing, lower infection rates, etc.). The system 101 may perform composite analytics of millions of composites 1045, pairings of resource nodes 1445 and load nodes 1445, and/or the corresponding data, which may be associated with allocated resource histories, load histories, facility histories, and attributes thereof. The modeling engine 1006 may recognize and learn patterns where the resources and sets of resources were more or less effective with certain types of loads having common specifications and attributes, and consequently recognize and learn patterns of attributes of the resource (e.g., particular resource types/roles designations, experience metrics, training attributes, resource locations, and/or the like) that the modeling engine 1006 links to relatively better or worse load metrics.

The modeling engine 1006 may determine conformities and nonconformities of the macro patterns respect to the micro patterns. For example, the macro patterns may confirm the recognized resource-specific patterns to indicate which resources are relatively more effective with loads having a certain condition, a certain criticality of condition, a certain biometric, a certain treatment, a use or discontinued use of a particular operation-performing device, and/or the like. In some cases, the macro patterns may not confirm the recognized resource-specific patterns, but may allow the modeling engine 1006 to identify where the recognized resource-specific patterns may correspond to outliers. Further, as the modeling engine 1006 may determine the states of individual resource specifications and attributes as a function of time, effectiveness, and load type, the modeling engine 1006 may likewise determine states of resource subsystems' aggregated specifications and attributes as a function of time. Accordingly, the modeling engine 1006 may recognize trends of subsystem effectiveness as a function of states of the subsystem, such as numbers and types of resources in the subsystem, changes to the subsystem membership, numbers and types of loads to which the subsystem was allocated, shift lengths and transition times, accumulated active time, etc.

Using the identified patterns for the relatively more effective allocations, the modeling engine 1006 may develop models of effective resource-load allocations. Such a model may correspond to a data structure that defines resource specifications and load specifications for one or more effective resource-load allocations. For example, the model may define and link particular resource specifications (which may include, for example, a type and/or role designation, an experience metric, a training attribute, a resource location, and/or the like) to certain load specifications and attributes (which may include, for example, a certain condition, a certain criticality of condition, a certain biometric, a certain treatment, a use or discontinued use of a particular operation-performing device, and/or the like). The model may define and link resource specifications for subsystems (e.g., numbers and types of resources in a subsystem on a per-shift basis, shift lengths, and/or the like). The model may, for example, indicate a model subsystem for the particular type of load. Such subsystem-based models may be derived from a multiplicity of data domains that describe the interactions between one or more resources, one or more loads, and one or more operating environments. For subsystem allocation, the model subsystem may include specifications for resources. The subsystem-based model may include resource specifications of resources for effective pairing to load specifications of loads, where, as disclosed herein, such resource specifications may include specifications of resource titles, resource roles, training attributes, education attributes, resource locations, current allocation designations, historical allocation designations, experience metrics, assignments of the resources, activities of resources, task specifications for the resources, resource biometric data, resource personality profiles, skills, specialties, locations, and/or the like.

The system 101 may automatically generate allocations of individual resources to individual loads and/or otherwise provide guidance for allocation of individual resources to individual loads based at least in part on the resource and load models and profiles. In some embodiments, the automatically generated allocations may be provisional allocations that may be accepted, rejected, or modified, e.g., via input received via the control interface, a controlling device 136, and/or client device 108. In some instances, such an allocation may be generated responsive to an electronic request from a client device 108 to generate one or more allocations. For example, the electronic request may indicate a particular load with one or more load specifications that may include a unique digital identifier for the particular load. In various embodiments, the electronic request may include load specifications of load identifiers, load metrics, load characteristics, a pertinent history feature, resource needs, a load condition, a diagnosis, a date, a time, a test, test result, and/or the like. In some embodiments, the electronic request may be generated with a user selection of a load node 1445 corresponding to the particular load of the node network 1400.

However, in some instances, such an allocation may be generated without such an electronic request. The system 101 can listen for data (e.g., HL7, X12N, ASTM, HL2, HCPDP), other data, and data changes relating to the load in one or more data streams. The system 101 may monitor load metrics detected regarding the load that can be collected via devices associated with load. The system 101 may determine when load metrics and/or other load data satisfy certain criteria. In various embodiments, the aggregation engine 1004 may be configured to initiate agents configured to detect messages that may be transferred between elements of the network 100 (e.g., via network 236, 810, 820, via messaging bus 430, and/or the like) to detect one or more data changes that may be mapped to one or more particular load identifiers of one or more loads. The agents may be specific to message type, destination entity, and/or any other suitable characteristic. An agent may, in various embodiments, correspond to a bot, a listener, and/or the like, and may conform to ITI-41, HL7 v.2, HL7 v.3, C-CDA, NEM-SIS, FHIR, XDs.b, XDR, or other suitable protocols. The agents can be used to detect and evaluate messages based on data included with the messages or otherwise related to the messages. The messages may include any suitable transfer of data corresponding to the network 100, including messages transmitting data, document operations (e.g., saving, modifying, creating, sending, sharing, versioning, etc.), and the like which may be monitored for specifications and changes in types of data such as, for example, names of loads, assigned resources, assigned rooms, services ordered, when tests are received, commencement of procedures, conclusion of procedures, orders for tests, and/or the like. In various embodiments, the messages may include sensor data from the sensors 130 and/or load-coupled device output from load-coupled devices 106.

Accordingly, the listeners may be employed to detect trigger events corresponding to the sensors 130 detecting phenomena, the load-coupled devices 106 outputting load-specific data, and/or the transfer of sensor data and load-coupled device output data directly to the adaptive system 101 and/or indirectly to the adaptive system 101 (e.g., via a monitoring device). The system 101 may generate one or more allocations upon system 101 detection of components input 811 that the system 101 detects as a trigger event to initiate resource allocation and/or reallocation and to instruct and cause particular resources to perform processes (e.g., one or a series of tasks) with respect to particular loads. To that end, the system 101 may apply rules 808B-5 that may include trigger event criteria. The trigger event criteria may specify various types of trigger events. The trigger events may include, for example, a load data set adjustment event; admission of the load, transitioning and/or assigning of the load to particular section (e.g., ER), different units and/or facilities for particular treatments and/or tests; an order event; transitioning and/or assigning of the load to a room; certain load metrics and/or load conditions; and/or the like. In some examples, the trigger events may be defined by criteria for when one or more detected data changes constitute one or more state changes of a particular load or a particular resource that correspond to one or more trigger events. In some embodiments, detecting a trigger event may trigger initiating one or more listeners to detect messages based on a set of message criteria included in the trigger event criteria. The message criteria may indicate the message as a type of message to be intercepted. In some examples, the aggregation engine 1004 may parse the message to determine details about the message that fulfill the message criteria. Thus, the system 101 may determine when load metrics and/or other load data satisfy certain criteria by detecting one or more signals satisfy one or more thresholds for one or more corresponding conditions. The system 101 may consequently generate one or more allocations and/or instructions for one or more particular resources to perform one or more processes as function of the state changes. For example, this may include detecting when sensor readings of vital signs (e.g., temperature, pulse rate, etc.) of the load indicate sepsis, and analyzing currently allocations of resources to the load to determine whether the resource include a sepsis coordinator. If not, the system 101 may initiate allocation processes to assign a sepsis coordinator to the load.

Accordingly, as part of the allocation processes, the system 101 may determine current allocation states of the resource subsystem assigned to a load. Following identifying the particular load per the electronic request or per the trigger event, the system 101 may identify further load specifications for the load. This may include load specifications attendant with the request. Additionally or alternatively, this may include gathering load specifications from the components input 811 as disclosed herein. Additionally or alternatively, this may include the system 101 may query the load specifications 1045(c) (e.g., corresponding to the load node 1145 of the particular load). When new load data is gathered with the request and/or the components input 811, the system 101 may augment, consolidate, and/or otherwise update the load specifications 1045(c) with the new load data. Having identified the load specifications for the particular load, the system 101 may query the resource allocation data storage 808B-3 to identify a model of effective resource-load allocations linked to certain load specifications and attributes of the particular load, such as a certain condition, a certain criticality of condition, a certain biometric, a certain treatment, a use or discontinued use of a particular operation-performing device, and/or the like. With a matching model identified, the system 101 may determine the current resource allocation for the load in view of the model specifications for a resource subsystem. Such specifications may indicate numbers and types of resources for a load having the load's specifications and attributes. This may be on a per-shift basis and may further indicate effective shift lengths. The determination may include identifying conformities, variances, inconsistencies, deviations, and/or nonconformities of the current resource allocation with respect to the model specifications that satisfy one or more thresholds, and, consequently, may map one or more deficiencies of the current allocation to available or potentially available resources from the allocation specifications in the resource allocation data storage 808B-3 that may be newly allocated to the load in order to remedy the deficiencies. For example, with a newly identified load that has not been allocated any resources, the determination may identify an entirely new resource subsystem for the load.

Continuing with that example, some embodiments of the system 101 may monitor messages and data to identify resources that have already processed the load in order to formally assign the resources to the load. For instance, the system 101 may detect a load that has processed a particular load within a proximate time period and is not already allocated to the subsystem corresponding to the load. Consequently, the system 101 may automatically assign the load to the subsystem corresponding to the load. In some embodiments, such automatic allocation may be provisional, and one or more notifications may be transmitted with options to allow for confirmation, declination, or modification as disclosed herein.

In addition or alternative, embodiments of the system 101 may locate resources in a particular facility, floor, section, room, etc. to facilitate various auto-allocation features as a function of the detected locations. In some cases, the detected locations of the resources may be utilized to identify and assign resources that have already processed one or more loads in those detected locations prior to allocation to the loads. In some cases, the detected locations of the resources may be utilized to identify and assign resources that have not yet processed one or more loads in those detected locations.

The system 101 may monitor messages and data to identify locations of resources. A resource may have self-assigned to a particular location (e.g., a zone corresponding to a particular facility, floor, section, and/or set of one or more rooms) via user-selectable interface elements of the control interface. Consequently, the system 101 may use the self-identified location to instruct the resource based at least in part on proximity to the location (e.g., within and/or within a certain distance, such as a number of feet on the same floor, of the location) in combination with other factors disclosed herein.

Additionally or alternatively, the system 101 may monitor sensor data to identify resources tending to a load (e.g., based on location data, ambient smart speaker, voice capture, etc.) and may auto-assign the resources to the load's resource subsystem when not already assigned. For example, a trigger event may correspond to one or a combination of one or more sensors 130 detecting phenomena with respect to the resource such as a location of the resource, where the sensor data may be used by the system 101 to determine the location of the resource and to match the detected resource location to the location of the load (which may be assigned and/or likewise detected). The location detection may be based at least in part on one or a combination of GPS, Wi-Fi access points, cellular triangulation, equipment sensors, RFID device signals, and/or the like of one or more devices mapped to the resource, and/or other techniques for determining a current location of a resource.

Additionally or alternatively, the detecting phenomena with respect to the resource may include user-provided and/or automatically collected biometric data (e.g., voice recognition, facial recognition, fingerprint scanning, retina scanning, etc.) and/or the like. By way of example, in some embodiments, the system 101 may perform audio analysis of audio data captured with the audio sensors/microphones 130 to facilitate targeted training content presentation responsive to audio input of the identified resource. One or more of the engines of the system 101 may include an audio analyzer and handling module to facilitate that detection. By way of analyzing audio, acoustic spectrum analysis, and/or the like, the modeling engine 1006 may, for example, learn patterns of sensor-based data metrics corresponding to audio characteristics, such as tonal, pitch, and volume characteristics; keywords and corresponding language used; cadence, pauses, and accents; ambient noise; and/or the like as distinctive markings of particular resources. For example, an acoustic analysis may include analyzing and identifying the sample for acoustic characteristics such as frequencies, intensities, pitches, and/or the like audio metrics over time and mapping distinctive characteristics to particular individuals. The different audio metric types may be bases for various audio metric categories. Ranges of audio metric values for the different audio metric types may be mapped to audio metric categories. The modeling engine 1006, for example, may select values of one or a combination of the acoustic metrics as distinctive markings and may collect and arrange the values as an acoustic profile for the purposes of characterizing an individual. In various embodiments, the correlation may be based at least in part on matching selected values of the acoustic metrics (e.g., distinctive values such as peaks, baselines, averages, etc.) to acoustic metric ranges of values specified for certain audio metric categories.

In a similar manner, with some embodiments, the system 101 may perform image analysis of image data captured with cameras to determine one or more image baselines for individuals and particular locations. Captured facial image data may be correlated to reference images using any suitable facial trait metrics for correlation. The modeling engine 1006, for example, may link particular image data to resource specifications with image data associated with resources to uniquely identify each resource. The reference image data, which may be stored in the resource profiles, may be refined over time as an image baseline(s) for a particular resource is developed with additional data captures. Likewise, the orchestration subsystem 101-2 may unique identifier resources with the other forms of biometric identification.

The system 101 may further analyze locations of the resources with respect to particular loads to facilitate mapping of one or more of the above-described types of input regarding the resources to particular load rooms. For example, when sensor input is received via one or more sensors 130, the adaptation engine 1008, for example, may map the input to a location based at least in part on location assignment information for the one or more sensors 130 and/or location detection and load room/section assignment information from the load profile data for a particular load.

Further, trigger events may include one or more sensors 130 and/or components 106 detecting phenomena that corresponds to a change in a location and/or a condition of a load. The system 101 may monitor for changes in load locations (transfers to a different unit, ward, floor, room, section, facility, etc.) and adjust resource subsystem allocations accordingly as a function of the load specifications (which may include effectiveness metrics), in addition to proximity of detected and/or assigned locations of the resources to the assigned and/or detected location of a load. Likewise, the system 101 may track load metrics to identify when load conditions change, identify when resource subsystem adjustments are needed, and adapt allocations to the changing conditions. So, with a load that has already been identified and allocated one or more resources, the determination may identify whether the current allocation matches the model specifications and whether there are any nonconformities of the current allocation with respect to the model specifications. Thus, with the example above regarding detection of sensor readings of vital signs that satisfy thresholds which the system 101 matches to a sepsis condition, the system 101 may query the resource allocation data storage 808B-3 to identify a model of effective resource-load allocations linked to the sepsis condition of the particular load (which may be additionally linked to one or more other load specifications/attributes of the load) and to identify the current allocations of resources to the load. Pursuant to comparing the model with the current allocations, the system 101 may identify one or more deficiencies (e.g., the lack of a sepsis coordinator or other specialist being currently allocated to the load) and may consequently facilitate one or more allocations to remedy the one or more deficiencies.

Additionally or alternatively, the system 101 may perform auto-adaptation of resource allocation based at least in part on recognition of current resource statuses, allocations, and changes (e.g., which resources are available for process execution, under capacity, at maximum bandwidth, over capacity, and/or the like, and rankings corresponding to such factors). This may include resource allocation determination to identify asymmetries for the system 101 to correct. Such asymmetries may correspond to allocation states where too many resources of a certain resource type are allocated to a particular load. For example, the system 101 may periodically determine resource allocations of the resource allocation data storage 808B-3 to identify asymmetries where a particular resource is allocated to too many loads. With such determinations, the system 101 may determine the availabilities and potentially availabilities of other resources to identify one or more alternative resources having resource specifications corresponding to the resource specifications of the particular resource, where the one or more alternative resources may be allocated to alleviate the allocation of the resource that is overloaded.

Further, trigger events may include one or more messages and/or data from sensors 130 and/or components 106 indicating a change in a location and/or a status of a resource. For example, the system 101 may monitor messages and/or data from sensors 130 and/or components 106 to identify state changes such that a previously allocated resource is not currently online (i.e., available) and/or is anticipated to be offline (i.e., unavailable) at an assigned time. In some cases, a resource may self-report such changes via user-selectable interface elements of the control interface. In some cases, another resource may report such changes via user-selectable interface elements of the control interface. The system

101 may likewise monitor for a previously unallocated resource is currently online (i.e., available) and/or is anticipated to be online.

As disclosed herein, in generating allocations, the adaptation engine 1008 may identify availabilities in a resource timetable in the resource allocation data storage 808B-3. In various embodiments, the adaptation engine 1008 may include, or otherwise be configured to provide functionalities of, a scheduler. The adaptation engine 1008 may, for example, query one or more directory data structures of the resource allocation data storage 808B-3 to identify one or more resources having the targeted resource specifications and availabilities of the one or more resources having the targeted resource specifications in one or more timetables of the resource allocation data storage 808B-3. When a plurality of candidate resources are identified as having the targeted resource specifications, the candidate resources may be ranked according to fit for the load. For example, in some embodiments, the adaptation engine 1008 may select between similar resources based at least in part on one or more respective metrics of each of the resources that may be used to bias the selection. If multiple corresponding available resources are identified, the adaptation engine 1008 may in some instances select one or more of the resources based at least in part on a selection technique that biases the selection toward resources having better effectiveness metrics as a function of the load specifications, in addition to proximity of the resources to the assigned and/or detected location of a load (e.g., unit, section, etc.) and temporal proximity of the resources to perform one or more system-determined processes with respect to the load (e.g., to bias or select based at least in part on how soon the availability may be, how geographically close the resource may be to the location, and/or the like).

In some embodiments, the biasing may be contingent on the criticality level of a condition of the load. For example, the higher the criticality level of the condition is, the greater the biasing may be (e.g., factors such as effectiveness scores and more experience with the condition may be weighted more heavily). Thus, with a high criticality level, the resource with the highest effectiveness score and most experience with the condition may be selected. Conversely, with a low criticality level, the resource with the least effectiveness score and least experience with the condition may be selected. In some embodiments, biasing may only be applied with certain criticality levels (e.g., high criticality, medium criticality) and may not applied with certain criticality levels (e.g., low criticality).

In some cases, the adaptation engine 1008 may identify when a fully allocated resource is likely to be a more effective match to the load according to the targeted resource specifications, though lacking availability according to one or more timetables of the resource allocation data storage 808B-3. In various embodiments, the adaptation engine 1008 may perform the determination to identify effective matches from fully allocated resources after no resources having the targeted resource specifications and availabilities are identified per the querying, when one or more resources having the targeted resource specifications and availabilities are identified but have effectiveness metrics that fail to satisfy one or more thresholds, or regardless of whether one or more resources having the targeted resource specifications and availabilities are identified. To evaluate whether the allocation of a particular fully allocated resource is advisable, the adaptation engine 1008 may determine the effectiveness scores of the resource's current allocations. Such effectiveness scores may be compared to the potential effectiveness score associated with the possible new allocation of the resource to the load. When one or more of the current allocations has a score that is less than the score of the potential new allocation, the one or more current allocations may be flagged. The current allocation with the least effectiveness score may be identified for a provisional reallocation such that the resource may be reallocated from that current allocation to a new allocation to the load. Such reallocation may be identified as a suggestion or may be automatically reallocated in accordance with various embodiments (e.g., with a provisional reallocation that may be accepted, rejected, or modified). In some embodiments, for example, a reallocation of a fully allocated resource may be merely suggested or may be provisionally allocated pending acknowledgement, declination, or modification; whereas an allocation of a partially allocated resource may be provisionally allocated and/or automatically allocation such that acknowledgement is not necessary.

When a single availability or multiple availabilities are identified, the adaptation engine 1008 may transmit one or more communications to the control interface, a controlling device 136, and/or client device 108 that identify information associated with the allocation. Such communications may be provided only upon authentication of role-based access. For example, in various embodiments, the authentication may be of a user as having an administratory role, a unit leader role, and/or the like as being one of the resources allocated or otherwise affected by the allocation. In various embodiments, the allocations may be automatically generated and/or may be provisional allocations that may be accepted, rejected, or modified, e.g., via input received via one or more selections of one or more interface elements of the control interface, a controlling device 136, and/or client device 108.

The read, accept/reject, and/or modification access may be restricted as a function of the role-based access, with different roles have different access specifications. For example, an administratory role may have read, accept/reject, and/or modification access, whereas the resource may only have accept/reject access, and others in an affected subsystem may only have read access. To facilitate handling of allocation requests, timetable management, and/or resource allocations, the one or more communications may indicate parameters such as availabilities, allocation time slots and time periods (e.g., date range, date and time of day, durations, etc.), resource identifiers, resource locations, resource specifications, load identifiers, load locations, load specifications, etc. The allocations may include assigning a resource-associated task to a given resource such as, reserving a space and/or resource usage.

As disclosed herein, the selection of candidate resources may be biased based at least in part on one or more metrics that are a function of the load, which may include effectiveness metrics and/or proximity of the candidate resources to the assigned and/or detected location of the load. When a plurality of candidate resources are identified, the plurality of candidate resources may be ranked according to the one or more metrics. The allocation suggestions and/or provisional allocations may be queued according to the ranking to be contingent on responses to the one or more communications that accept, reject, or modify the allocation suggestions and/or provisional allocations. Thus, for example, the highest ranked candidate may be selected for allocation first, and one or more communications may be transmitted to the control interface, controlling device 136, and/or client device 108 to indicate the allocation and prompt one or more user-selectable options for acknowledgement, declination, and/or modification of the allocation.

The adaptation engine 1008 may spin up an agent to monitor for one or more responses from the receiver of the one or more communications. The agent may correspond to a bot, a listener, and/or the like configured to wait for a certain time having a time limit to detect and receive the requested response. If a response is not received before the expiration of the time limit, the agent may alert the adaptation engine 1008, and a notification of the lack of response may be transmitted to another device (e.g., an administratory device). In some embodiments, the modeling engine 1006 may determine that particular receivers have a pattern of responding within a certain time period and may automatically adjust the initial default time threshold to include one or more of the previously observed response times for a particular receiver, and may, in some embodiments, further include a buffer time. When a response is received from the receiver endpoint device, the agent may alert the adaptation engine 1008.

Following selection of the one or more user-selectable options, communication of signals of the selection may be received from the control interface, controlling device 136, and/or client device 108. When the communication indicates acknowledgement of the allocation, that candidate may be allocated accordingly. However, when the communication indicates declination of the allocation, the next highest candidate may be then selected for allocation, and one or more communications may be transmitted to the same or different control interface, controlling device 136, and/or client device 108 to indicate the allocation.

If no communication of signals of the selection is be received within a set period of time, the suggestion/provisional allocation may be canceled and rescinded, the next highest candidate may be then selected for allocation, and one or more communications may be transmitted to the same or different control interface, controlling device 136, and/or client device 108 to indicate the allocation. The adaptation engine 1008 may again spin up an agent to monitor for one or more responses. Accordingly, the suggested/provisional allocations may continue in this manner until an allocation is accepted or until the set of potential resources has been exhausted without an allocation acknowledgement, in which case, the adaptation engine 1008 may relax the constraints (e.g., select fewer constraints) to identify another set of candidate resources having a subset of the targeted specifications and repeat the above process and/or send an alert notification to an administratory device (e.g., push notifications to the endpoint device requiring user input, pop-up or modal windows requiring user input with the control interface, and/or the like).

In various embodiments, the adaptation engine 1008 may respond to one or more of the trigger events disclosed herein related to a particular load at least partially by transmitting alert notifications to one or more client devices 108 associated with one or more resources of the resource subsystem allocated to the particular load. Thus, for example, the system 101 may bias alerts to allocated resources responsive to detecting changes in load conditions, events relating to the particular load, changes relating to resources allocated to the load, requests from a client device 108 associated with the load, and/or the like. A trigger event may correspond to one or a combination of different types of endpoint input 811-1, sensor data 811-4, and/or other components input 811. Such trigger events may, by way of example, correspond to compliance alerts with respect to system-instructed processes to be performed by particular resources with respect to particular loads (e.g., identifying a gap in coverage or process tasks, and alerting the appropriate resource and/or escalating to a secondary resource), providing real-time metrics to map a load condition to the appropriate resource at the time, getting load signals to proximate resource in real time, sepsis alerting, glycemic optimization, critical lab alerts, blood expiration notifications (e.g., alerting before blood expires when blood has been ordered and has not been hung yet), and/or the like.

In various instances, a trigger event may include user selection and/or request via an interface of a client device 108 and/or a component 106. In various instances, the user may correspond to a resource or a load. In various instances, user selections and/or interface requests may correspond to selections of user-selectable interface options, voice activations/requests, other user actions which may include gestures such as waving hand in front of a piece of operation-performing equipment, scanning tags or badges, and/or the like. Additionally or alternatively, user selections and/or interface requests may include user entry of information (e.g., login information, codes, identifiers, etc.).

The adaptation engine 1008 may use data from the components input 811 relating to the trigger event to identify the load and other details about the trigger event (e.g., load condition details, event details, resource change details, types of services requested, etc.). Having identified the load, the adaptation engine 1008 may identify the appropriate resources of the resource subsystem allocated to the particular load from the load's resource subsystem directory data structure (e.g., one or more composites 1045 corresponding to the load node 1445 mapped to the load) to alert. Having the resource subsystem allocated to the particular load, the adaptation engine 1008 may identify the currently available resources of the subsystem from one or more timetables.

The adaptation engine 1008 may select one or more of the currently available resources using escalating rules. The rules may provide for hierarchically scaled notifications, which the adaptation engine 1008 may use to alerting resources. The selection may be a function of one or more metrics of the resources, proximity of the candidate resources to the assigned, and/or detected location of the load. The one or more metrics of the resources may include role and/or effectiveness metrics, and the currently available resources may be ranked according to the one or more metrics in order to bias alerts to more effective resource-load pairings. In addition or in alternative, the currently available resources may be ranked according to proximity to the load. As with the selection techniques disclosed herein, various embodiments may accord various weights to proximity and resource metrics such that the rankings are used to form a hierarchically scaled tree that specifies an order of recipients for serially alerting the selected resources until confirmation of the alert is received. The highest ranked resource may be selected for alerting first, and one or more communications may be transmitted to the control interface, controlling device 136, and/or client device 108 associated with the resource with signals of the alert condition (e.g., load identifier, load location, load condition details, event details, resource change details, types of services requested, etc.).

As disclosed herein, the adaptation engine 1008 may spin up an agent to monitor for one or more responses from the receiver of the one or more communications. The agent may be configured to wait for a certain time having a time limit to detect and receive the requested response. Following selection of the one or more user-selectable options, communication of signals of the selection may be received from the control interface, controlling device 136, and/or client device 108. When a response is received from the receiver endpoint device, the agent may alert the adaptation engine 1008.

However, if a response is not received before the expiration of a time limit, the agent may alert the adaptation engine 1008. A notification of the lack of response may be transmitted to another device (e.g., an administratory device), and the next highest-ranked resource may be then selected for notification, and one or more communications may be transmitted to the same or different control interface, controlling device 136, and/or client device 108 to indicate the allocation. The adaptation engine 1008 may again spin up an agent to monitor for one or more responses. The serial alert process may continue in this manner until an acknowledgement is received, with alert notifications also sent to an administratory device to ensure acknowledgement.

In some embodiments, when a response is not received before the expiration of a time limit, the adaptation engine 1008 may cause one or more additional notifications to be transmitted to the resource through other media channels different from the media channel used previously to cause a response from the resource (e.g., other proprietary communication applications such as iMobile, SMS, MMS, email, fax, phone, an instant messaging service, text-to-voice, text-to-chat, and/or the like) via medium-specific controllers. In some embodiments, such hierarchically scaled notification may be performed serially with similar application of time limits to detect requested responses before escalating to another notification method for the particular resource subsystem member. With sufficiently high scores of criticality regarding the trigger event and the detected condition that satisfy one or more thresholds, multiple notification messages may be utilized simultaneously and/or different resource subsystem members may be notified with escalated notifications when the requested response from the particular resource subsystem member is not received within the time limit.

Over time, some embodiments of the modeling engine 1006 may determine that particular receivers have a pattern of responding with greater relative frequency to notifications transmitted via one or more particular media channels than to notifications transmitted via other media channels. Accordingly, the modeling engine 1006 may identify more effective media channels as a function of the resource that have a higher probability of causing a response from the resource. Responsive to such learning that particular resources have a pattern of responding to notifications sent via particular media channels, the adaptation engine 1008 may cause one or more additional notifications to be transmitted to the more effective media channel(s) for a particular resource initially as a default, and in addition or alternative to using other media channels to alert the resource.

As disclosed herein, in some embodiments, the modeling engine 1006 may determine that particular receivers have a pattern of responding within a certain time period and may automatically adjust the initial default time threshold to include one or more of the previously observed response times for a particular receiver, and may, in some embodiments, further include a buffer time. However, such adjustment time may only be employed when the adaptation engine 1008 determines that the trigger event has a low priority. In other cases, the time period may be a function of the system-determined criticality of the trigger event and the amount of time that has passed since the occurrence of the trigger event. Thus, for example, a subsequent attempt to cause a response from a second, third, or fourth resource may be allotted less time for a response than the initial attempt to cause a response from a first resource (i.e., the highest-ranked resource). Further, the environments, systems, networks, models, and the like of the figures disclosed herein may be used to implement the techniques described herein and embodiments and details disclosed in U.S. patent application Ser. No. 17/487,934, filed Sep. 28, 2021; U.S. patent application Ser. No. 16/782,042, filed Feb. 4, 2020; U.S. Provisional Application No. 62/800,990, filed Feb. 4, 2019; U.S. patent application Ser. No. 16/586,376, filed Sep. 27, 2019; and U.S. Provisional Application No. 62/737,482, filed Sep. 27, 2018; U.S. Ser. No. 17/181,025, filed on Feb. 22, 2021; U.S. patent application Ser. No. 16/580,114, filed on Sep. 24, 2019; U.S. patent application Ser. No. 16/170, 379, filed on Oct. 25, 2018; U.S. Provisional Application No. 62/576,931, filed on Oct. 25, 2017; U.S. Provisional Application No. 62/589,069, filed on Nov. 21, 2017; U.S. Provisional Application No. 62/581,343, filed on Nov. 3, 2017; U.S. patent application Ser. No. 17/959,116, filed on Oct. 3, 2022; U.S. patent application Ser. No. 16/700,010, filed on Dec. 2, 2019; and U.S. Provisional Application No. 62/776,786, filed on Dec. 7, 2018; the disclosures of each of which applications are incorporated by reference herein in their entireties for all purposes, as if fully set forth herein.

It will also be appreciated that presentations disclosed and/or illustrated herein can be configured to provide various types of interaction capabilities and/or presentation types. For example, presentations can identify whether and/or an extent to which a variable exceeds or misses a target threshold and/or how the variable may be changing over time. Presentations can be presented in a manner such that entities associated with particular data are identified, obscured and/or conditionally identified (e.g., depending on a reviewer). Presentations can be dynamic such that new data may be routinely reflected in the presentation and/or interactive such that a variable selection, constraint identification, degree of summarization and entity representation can be modified in response to particular user input.

Specific details are given in the above description to provide a thorough understanding of the embodiments. However, it may be understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, the embodiments can be described as a process which may be depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process may be terminated when its operations are completed but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary processes can be stored in a machine-readable medium such as a storage medium.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and may be not to be limited to any particular type of memory or number of memories, or type of media upon which memory may be stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but may be not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it may be be to be clearly understood that this description may be made only by way of example and not as limitation on the scope of the disclosure.

What is claimed:

1. A system to control process-performing resources with respect to particular loads, the system comprising:
   one or more interfaces that receive a set of electronic communications via a network from a plurality of electronic devices, the electronic devices correspond to one or more client devices, one or more operation-performing devices, and/or one or more sensors couplable to the one or more interfaces, the set of electronic communications comprising one or more of:
   signals of device interactions or data changes that correspond to process and/or process performances by process-performing resources;
   signals of conditions of loads; and/or
   signals of processes associated with the process-performing resources and the loads;
   one or more processors; and
   one or more non-transitory, computer-readable storage media containing instructions which, when executed on the one or more processors, cause the one or more processors to perform operations comprising:
   for each electronic communication of the set of electronic communications:

processing the electronic communication to identify one or more digital identifiers mapped to one or more of the process-performing resources and/or loads; and extracting and caching a data portion from the electronic communication;

collecting the data portions and mapping the collected data portions to one or more resource profile records and/or one or more load profile records that are stored in one or more resource data storages and/or one or more load data storages;

updating the one or more resource profile records and/or one or more load profile records with the collected data portions;

for each load, using at least one of the one or more resource profile records and/or the one or more load profile records to map a subset of one or more of the process-performing resources to the load;

based at least in part on the mapping, linking content nodes in a network of content nodes where each content node of the network of content nodes comprises respective linked content, the respective linked content comprising a subset of resource specifications and/or a subset of load specifications corresponding to at least one of the one or more resource profile records and/or the one or more load profile records; and allowing access, to at least one of the one or more electronic devices, to a plurality of subsets of resource specifications and a plurality of subsets of load specifications of the network of content nodes via a control interface.

2. The system to control process-performing resources with respect to particular loads as recited in claim 1, wherein the load specification specifies one or more particular loads, one or more particular load types, one or more particular load conditions, one or more particular load condition metrics, and/or one or more particular load locations.

3. The system to control process-performing resources with respect to particular loads as recited in claim 2, the operations further comprise:

creating a graphical representation formatted to represent at least a portion of the network of content nodes; and communicating visualization data corresponding to the graphical representation to the at least one of the one or more client devices to facilitate the control interface.

4. The system to control process-performing resources with respect to particular loads as recited in claim 3, where the mapping corresponds to assignment of the subset of one or more of the process-performing resources to the load.

5. The system to control process-performing resources with respect to particular loads as recited in claim 4, where the control interface comprises one or more interface elements that are user-selectable to allow the access to the plurality of subsets of resource specifications and the plurality of subsets of load specifications of the network of content nodes.

6. The system to control process-performing resources with respect to particular loads as recited in claim 5, where the operations further comprise:

processing a communication received from the at least one of the one or more client devices that corresponds to a selection of a particular interface element of the one or more interface elements of the control interface; and responsive to the communication, allowing access to at least a subset of the plurality of subsets of resource specifications and/or the plurality of subsets of load specifications.

7. The system to control process-performing resources with respect to particular loads as recited in claim 5, where the operations further comprise:

processing a communication received from the at least one of the one or more client devices that corresponds to a selection of a particular interface element of the one or more interface elements of the control interface; and responsive to the communication, changing at least part of the plurality of subsets of resource specifications and/or the plurality of subsets of load specifications.

8. One or more non-transitory, machine-readable media storing executable instructions that, when executed by one or more processing devices, cause the one or more processing devices to perform operations comprising:

processing a set of electronic communications received via a network from a plurality of electronic devices, the electronic devices correspond to one or more client devices, one or more operation-performing devices, and/or one or more sensors couplable to one or more interfaces, the set of electronic communications comprising one or more of:

signals of device interactions or data changes that correspond to process and/or process performances by process-performing resources;

signals of conditions of loads; and/or signals of processes associated with the process-performing resources and the loads;

for each electronic communication of the set of electronic communications:

processing the electronic communication to identify one or more digital identifiers mapped to one or more of the process-performing resources and/or loads; and extracting and caching a data portion from the electronic communication;

collecting the data portions and mapping the collected data portions to one or more resource profile records and/or one or more load profile records that are stored in one or more resource data storages and/or one or more load data storages;

updating the one or more resource profile records and/or one or more load profile records with the collected data portions;

for each load, using at least one of the one or more resource profile records and/or the one or more load profile records to map a subset of one or more of the process-performing resources to the load;

based at least in part on the mapping, linking content nodes in a network of content nodes where each content node of the network of content nodes comprises respective linked content, the respective linked content comprising a subset of resource specifications and/or a subset of load specifications corresponding to at least one of the one or more resource profile records and/or the one or more load profile records; and allowing access, to at least one of the one or more electronic devices, to a plurality of subsets of resource specifications and a plurality of subsets of load specifications of the network of content nodes via a control interface.

9. The one or more non-transitory, machine-readable media as recited in claim 8, wherein the load specification specifies one or more particular loads, one or more particular load types, one or more particular load conditions, one or more particular load condition metrics, and/or one or more particular load locations.

10. The one or more non-transitory, machine-readable media as recited in claim 9, the operations further comprising:

creating a graphical representation formatted to represent at least a portion of the network of content nodes; and communicating visualization data corresponding to the graphical representation to the at least one of the one or more client devices to facilitate the control interface.

11. The one or more non-transitory, machine-readable media as recited in claim 10, where the mapping corresponds to assignment of the subset of one or more of the process-performing resources to the load.

12. The one or more non-transitory, machine-readable media as recited in claim 11, where the control interface comprises one or more interface elements that are user-selectable to allow the access to the plurality of subsets of resource specifications and the plurality of subsets of load specifications of the network of content nodes.

13. The one or more non-transitory, machine-readable media as recited in claim 12, the operations further comprising:

processing a communication received from the at least one of the one or more client devices that corresponds to a selection of a particular interface element of the one or more interface elements of the control interface; and responsive to the communication, allowing access to at least a subset of the plurality of subsets of resource specifications and/or the plurality of subsets of load specifications.

14. The one or more non-transitory, machine-readable media as recited in claim 12, where the operations further comprise:

processing a communication received from the at least one of the one or more client devices that corresponds to a selection of a particular interface element of the one or more interface elements of the control interface; and responsive to the communication, changing at least part of the plurality of subsets of resource specifications and/or the plurality of subsets of load specifications.

15. A method to control process-performing resources with respect to particular loads, the method comprising:

processing a set of electronic communications received via a network from a plurality of electronic devices, the electronic devices correspond to one or more client devices, one or more operation-performing devices, and/or one or more sensors couplable to one or more interfaces, the set of electronic communications comprising one or more of:

signals of device interactions or data changes that correspond to process and/or process performances by process-performing resources;

signals of conditions of loads; and/or signals of processes associated with the process-performing resources and the loads;

for each electronic communication of the set of electronic communications:

processing the electronic communication to identify one or more digital identifiers mapped to one or more of the process-performing resources and/or loads; and extracting and caching a data portion from the electronic communication;

collecting the data portions and mapping the collected data portions to one or more resource profile records and/or one or more load profile records that are stored in one or more resource data storages and/or one or more load data storages;

updating the one or more resource profile records and/or one or more load profile records with the collected data portions;

for each load, using at least one of the one or more resource profile records and/or the one or more load profile records to map a subset of one or more of the process-performing resources to the load;

based at least in part on the mapping, linking content nodes in a network of content nodes where each content node of the network of content nodes comprises respective linked content, the respective linked content comprising a subset of resource specifications and/or a subset of load specifications corresponding to at least one of the one or more resource profile records and/or the one or more load profile records; and allowing access, to at least one of the one or more electronic devices, to a plurality of subsets of resource specifications and a plurality of subsets of load specifications of the network of content nodes via a control interface.

16. The method to control process-performing resources with respect to particular loads as recited in claim 15, wherein the load specification specifies one or more particular loads, one or more particular load types, one or more particular load conditions, one or more particular load condition metrics, and/or one or more particular load locations.

17. The method to control process-performing resources with respect to particular loads as recited in claim 16, the method further comprising:

creating a graphical representation formatted to represent at least a portion of the network of content nodes; and communicating visualization data corresponding to the graphical representation to the at least one of the one or more client devices to facilitate the control interface.

18. The method to control process-performing resources with respect to particular loads as recited in claim 17, where the mapping corresponds to assignment of the subset of one or more of the process-performing resources to the load.

19. The method to control process-performing resources with respect to particular loads as recited in claim 18, where the control interface comprises one or more interface elements that are user-selectable to allow the access to the plurality of subsets of resource specifications and the plurality of subsets of load specifications of the network of content nodes.

20. The method to control process-performing resources with respect to particular loads as recited in claim 19, the method further comprising:

processing a communication received from the at least one of the one or more client devices that corresponds to a selection of a particular interface element of the one or more interface elements of the control interface, and responsive to the communication, allowing access to at least a subset of the plurality of subsets of resource specifications and/or the plurality of subsets of load specifications.

* * * * *